(12) United States Patent
Pickett

(10) Patent No.: US 6,343,074 B1
(45) Date of Patent: *Jan. 29, 2002

(54) SYSTEMS AND METHODS FOR MULTIPLE MODE VOICE AND DATA COMMUNICATIONS USING INTELLIGENTY BRIDGED TDM AND PACKET BUSES AND METHODS FOR PERFORMING TELEPHONY AND DATA FUNCTIONS USING THE SAME

(75) Inventor: Scott K. Pickett, Los Gatos, CA (US)

(73) Assignee: Vertical Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/163,596

(22) Filed: Sep. 29, 1998

(51) Int. Cl.$^7$ ............................................. H04L 12/66

(52) U.S. Cl. ....................................... 370/353; 370/458

(58) Field of Search ............................... 370/465, 466, 370/473, 474, 395, 438, 439, 458, 445, 462, 352, 353; 709/223–6

(56) References Cited

U.S. PATENT DOCUMENTS

| 5,195,086 A | 3/1993 | Baumgartner et al. ....... 370/264 |
| 5,333,266 A | 7/1994 | Boaz et al. .................. 709/206 |
| 5,475,738 A | 12/1995 | Penzias ........................ 379/67 |
| 5,479,411 A | 12/1995 | Klein ........................... 379/88 |
| 5,533,018 A * | 7/1996 | DeJager et al. ............. 370/60.1 |

(List continued on next page.)

OTHER PUBLICATIONS

Black, ATM Foundation For Broadband Networks, pp. 137–152, 170–173, 1995.*

Stallings, William, SNMP, SNMPv2, SNMPv3, and RMON 1 and 2 third edition, pp. 41–43, 76–77, 80–81, 85–86, 99–101, 110, 138–141, 43–144, 150–152, 155–157, 179, 181–183 (1996).

Primary Examiner—David R. Vincent
(74) Attorney, Agent, or Firm—Loudermilk & Associates

(57) ABSTRACT

Systems and methods by which voice/data communications may occur in multiple modes/protocols are disclosed. In particular, systems and methods are provided for multiple native mode/protocol voice and data transmissions and receptions with a computing system having a multi-bus structure, including, for example, a TDM bus and a packet bus, and multi-protocol framing engines. Such systems preferably include subsystem functions such as PBX, voice mail and other telephony functions, LAN hub and data router. In preferred embodiments, a TDM bus and a packet bus are intelligently bridged and managed, thereby enabling such multiple mode/protocol voice and data transmissions to be intelligently managed and controlled with a single, integrated system. A computer or other processor includes a local area network controller, which provides routing and hub(s) for one or more packet networks. The computer also is coupled to a buffer/framer, which serves to frame/deframe data to/from the computer from TDM bus. The buffer/framer includes a plurality of framer/deframer engines, supporting, for example, ATM and HDLC framing/deframing. The buffer/framer is coupled to the TDM bus by way of a switch/multiplexer, which includes the capability to intelligently map data traffic between the buffer/framer and the TDM bus to various slots of the TDM frames. Preferably, a DSP pool is coupled to buffer/framer in a manner to provide various signal processing and telecommunications support, such as dial tone generation, DTMF detection and the like. The TDM bus is coupled to a various line/station cards, serving to interface the TDM bus with telephone, facsimiles and other telecommunication devices, and also with a various digital and/or analog WAN network services.

12 Claims, 36 Drawing Sheets

U.S. PATENT DOCUMENTS

| | | | | |
|---|---|---|---|---|
| 5,533,110 A | | 7/1996 | Pinard et al. | 379/201 |
| 5,541,921 A | | 7/1996 | Swenson et al. | 370/376 |
| 5,568,540 A | | 10/1996 | Greco et al. | 379/89 |
| 5,652,789 A | * | 7/1997 | Miner et al. | 379/201 |
| 5,659,597 A | | 8/1997 | Bareis et al. | 455/563 |
| 5,689,553 A | | 11/1997 | Ahuja et al. | 379/202 |
| 5,761,201 A | | 6/1998 | Vaudreuil | 370/392 |
| 5,778,058 A | | 7/1998 | Gavin | 379/225 |
| 5,809,021 A | * | 9/1998 | Diaz et al. | 370/364 |
| 5,809,493 A | | 9/1998 | Ahamed et al. | 706/52 |
| 5,812,795 A | | 9/1998 | Horovitz et al. | 709/245 |
| 5,821,937 A | | 10/1998 | Tonelli et al. | 345/356 |
| 5,838,664 A | | 11/1998 | Polomski | 370/263 |
| 5,838,923 A | | 11/1998 | Lee et al. | 709/236 |
| 5,841,763 A | | 11/1998 | Leondires et al. | 370/260 |
| 5,862,136 A | | 1/1999 | Irwin | 370/395 |
| 5,864,560 A | | 1/1999 | Li et al. | 370/465 |
| 5,887,139 A | | 3/1999 | Madison, Jr. et al. | 709/223 |
| 5,898,830 A | * | 4/1999 | Wesinger, Jr. et al. | 713/201 |
| 5,912,888 A | | 6/1999 | Walsh et al. | 370/355 |
| 5,923,737 A | | 7/1999 | Weishut et al. | 379/93.17 |
| 5,940,488 A | | 8/1999 | DeGrazia et al. | 379/201 |
| 5,944,786 A | | 8/1999 | Quinn | 709/206 |
| 5,950,167 A | | 9/1999 | Yaker | 704/275 |
| 5,978,672 A | | 11/1999 | Hartmaier et al. | 455/413 |
| 5,978,835 A | | 11/1999 | Ludwig et al. | |
| 5,982,767 A | * | 11/1999 | McIntosh | 370/352 |
| 5,991,723 A | | 11/1999 | Duffin | 704/260 |
| 5,996,010 A | | 11/1999 | Leong et al. | 709/223 |
| 5,999,179 A | | 12/1999 | Kekic et al. | 345/349 |
| 6,003,077 A | | 12/1999 | Bawden et al. | 709/223 |
| 6,012,088 A | * | 1/2000 | Li et al. | 709/219 |
| 6,018,567 A | | 1/2000 | Dulman | 379/34 |
| 6,040,834 A | | 3/2000 | Jain et al. | 345/356 |
| 6,041,306 A | | 3/2000 | Du et al. | 705/8 |
| 6,043,816 A | | 3/2000 | Williams et al. | 345/340 |
| 6,044,107 A | | 3/2000 | Gatherer et al. | 375/222 |
| 6,044,403 A | | 3/2000 | Gerszberg et al. | 709/225 |
| 6,047,053 A | | 4/2000 | Miner et al. | 379/201 |
| 6,047,054 A | | 4/2000 | Bayless et al. | 379/202 |
| 6,049,531 A | | 4/2000 | Roy | 370/260 |
| 6,054,987 A | | 4/2000 | Richardson | 345/348 |
| 6,055,574 A | * | 4/2000 | Smorodinsky et al. | 709/226 |
| 5,926,463 A | | 7/2000 | Ahearn et al. | 370/254 |

* cited by examiner

InstantOffice Remote Management Console

Log Off        Diagnostics     Help

General Administration

- Chassis View
- Password Administration
- Access Permissions
- General Settings
- SNMP Configuration
- SNMP Alarms
- Software Versions
- System Backup/Restore
- Software Upgrade
- Call Detail Report
- RAID-1 Configuration
- Date and Time
- Restart InstantOffice

PBX, Voice Mail, and CTI Administration

- Extension Configuration
- Hunt Groups
- Local TAPI Configuration
- AutoAttendant & Voice Mail
- Station Ports
- CTI Speed Dial No.
- First Digit Table

Data Administration

- IP Network Settings
- Microsoft RRAS
- IPX Configuration
- Network Services & Adapters

Trunk Administration

- Trunk Groups
- Trunk Access Profiles
- Frame Relay
- T-1 Trunks
- Analog Trunks

FIG. 15

T-1 Trunks

Card/Module: (Slot 14) T-1 Module, 2-Port

| Port 1 | Port 2 |

Trunk Settings

☐ Trunk in Service

Trunk Type: T-1

ISDN Switch Variant: AT&T

System Clock Reference: Not Used

Framing: ESF

Line Coding: B8ZS

Line Build Out: 7.5db

● Courtesy Reset  ○ Force Reset

Channel Settings

ISDN | None

| | Enabled | Signaling | Trunk Groups |
|---|---|---|---|
| -1- | Yes | Wink Start | DID Digital |
| -2- | Yes | Wink Start | Modems |
| -3- | Yes | Ground Start | Voice Analog |
| -4- | Yes | Wink Start | Voice Digital |
| -5- | No | Wink Start | DID Analog |
| -6- | No | Wink Start | WAN Data |
| -7- | No | Wink Start | None |
| -8- | No | Wink Start | None |
| -9- | No | Wink Start | None |
| -10- | No | Wink Start | None |
| -11- | No | Wink Start | None |
| -12- | No | Wink Start | None |
| -13- | No | Wink Start | None |
| -14- | No | Wink Start | None |
| -15- | No | Wink Start | None |
| -16- | No | Wink Start | None |
| -17- | No | Wink Start | None |
| -18- | No | Wink Start | None |
| -19- | No | Wink Start | None |
| -20- | No | Wink Start | None |
| -21- | No | Wink Start | None |
| -22- | No | Wink Start | None |
| -23- | No | Wink Start | None |
| -24- | No | Wink Start | None |

Frame Relay Configuration

Virtual Port: [ ] ▼   ☐ Removed        [ Add ]

┌─ Port Settings ─────────────────┐

Name: [                    ]

DLCI (16-991)  [ 100 ] ▲▼

LMI Mode:      [ User         ] ▼

LMI Type:      [ T1.617 Annex D ] ▼

Encapsulation: [ RFC1490      ] ▼

[ Restore ]  [ Apply ]  [ Done ]  [ Help ]

| Trunk Monitor | | | | | |
|---|---|---|---|---|---|
| \_ □ X | | | | | |
| ○ Use Periodic Polling  Polling Intervals (in secs): [1] | | | | | |
| ● Refresh On Demand  Refresh | | | | | |
| Slot | Board | Port | State | Called Party | Calling Party |
| 14 | T1 Card | 3 | Incoming Call | | 300 |
| 14 | T1 Card | 3 | Incoming Call | | 301 |
| 14 | T1 Card | 3 | Incoming Call | | 302 |
| 14 | T1 Card | 3 | Incoming Call | | 303 |
| 14 | T1 Card | 3 | Incoming Call | | 304 |
| 14 | T1 Card | 3 | Incoming Call | | 305 |
| 14 | T1 Card | 3 | Incoming Call | | 306 |
| 14 | T1 Card | 3 | Outbound Call | | 8481307 |
| 14 | T1 Card | 3 | Outbound Call | | 8481308 |
| 14 | T1 Card | 3 | Outbound Call | | 8481309 |
| 14 | T1 Card | 3 | Outbound Call | | 8481310 |
| 14 | T1 Card | 3 | Outbound Call | | 8481311 |
| 14 | T1 Card | 3 | Outbound Call | | 8481312 |
| 14 | T1 Card | 3 | Outbound Call | | 8481313 |
| 14 | T1 Card | 3 | Outbound Call | | 8481314 |
| 14 | T1 Card | 3 | Outbound Call | | 8481314 |
| 14 | T1 Card | 3 | Outbound Call | | 8481314 |
| 14 | T1 Card | 3 | Outbound Call | | 8481314 |
| 14 | T1 Card | 3 | Outbound Call | | 8481314 |
| 14 | T1 Card | 3 | Outbound Call | | 8481314 |
| 14 | T1 Card | 3 | Outbound Call | | 8481314 |
| 14 | T1 Card | 3 | Outbound Call | | 8481314 |

Done

Link Monitor

○ Use Periodic Polling    Polling Intervals (in secs): [1]
● Refresh on Demand    [Refresh]

| Slot | Board | Port | Admin | Auto Partition | Link |
|---|---|---|---|---|---|
| 7 | Ethernet Hub Card | 15 | Enabled | No | No Link |
| 7 | Ethernet Hub Card | 16 | Enabled | No | No Link |
| 7 | Ethernet Hub Card | 17 | Enabled | No | No Link |
| 7 | Ethernet Hub Card | 18 | Enabled | No | No Link |
| 7 | Ethernet Hub Card | 19 | Enabled | No | No Link |
| 7 | Ethernet Hub Card | 20 | Enabled | No | No Link |
| 7 | Ethernet Hub Card | 21 | Enabled | No | No Link |
| 7 | Ethernet Hub Card | 22 | Enabled | No | No Link |
| 7 | Ethernet Hub Card | 23 | Enabled | No | No Link |
| 7 | Ethernet Hub Card | 24 | Enabled | No | No Link |
| 5 | Resource Switch C... | 1 | Enabled | No | No Link |
| 5 | Resource Switch C... | 2 | Enabled | No | No Link |
| 5 | Resource Switch C... | 3 | Enabled | No | No Link |
| 5 | Resource Switch C... | 4 | Enabled | No | Link |
| 5 | Resource Switch C... | 5 | Enabled | No | No Link |
| 5 | Resource Switch C... | 6 | Enabled | No | No Link |
| 5 | Resource Switch C... | 7 | Enabled | No | No Link |
| 5 | Resource Switch C... | 8 | Enabled | No | No Link |
| 5 | Resource Switch C... | 9 | Enabled | No | No Link |
| 5 | Resource Switch C... | 10 | Enabled | No | No Link |
| 5 | Resource Switch C... | 11 | Enabled | No | No Link |
| 5 | Resource Switch C... | 12 | Enabled | No | No Link |

[Done]    [Help]

Link Monitor

○ Use Periodic Polling     Polling Intervals (in secs): 1

⦿ Refresh on Demand    [Refresh]

| Extension | State | Other Party | Display Name | Card | Port |
|---|---|---|---|---|---|
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| | Offhook Active | | Default | 0 | 0 |
| 571 | Phone is not op... | | Default | 0 | 0 |
| 572 | Phone is not op... | | Default | 0 | 0 |
| 100 | Idle | | Default | 0 | 0 |
| 101 | Idle | | Default | 0 | 0 |
| 102 | Idle | | Default | 0 | 0 |
| 103 | Idle | | Default | 0 | 0 |
| 104 | Idle | | Default | 0 | 0 |
| 105 | Idle | | Default | 0 | 0 |
| 106 | Idle | | Default | 0 | 0 |
| 107 | Idle | | Default | 0 | 0 |
| 108 | Idle | | Default | 0 | 0 |
| 109 | Idle | | Default | 0 | 0 |

Warning: Applet Window                    [Done]  [Help]

SYSTEMS AND METHODS FOR MULTIPLE MODE VOICE AND DATA COMMUNICATIONS USING INTELLIGENTY BRIDGED TDM AND PACKET BUSES AND METHODS FOR PERFORMING TELEPHONY AND DATA FUNCTIONS USING THE SAME

FIELD OF THE INVENTION

The present invention relates to systems and methods for transmitting and receiving voice and data in multiple modes, and more particularly to systems and methods for multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router, and methods for performing telephony and data functions using the same.

BACKGROUND OF THE INVENTION

Businesses, particularly small to medium size offices, typically have a need for a variety of voice and data communications. For example, a typical office might have a dedicated fax machine, using a dedicated or shared telephone line, one or more telephone lines for voice communications, perhaps coupled to a central or distributed voice mail system(s), and one or more computers or computer networks, often coupled to telephone lines via one or more modems. Many offices now use the Internet in some form for business communications or research or the like, often by way of a modem or modem pool coupled to individual computers.

Typically, such business communication needs have been fulfilled with piecemeal technical solutions, typically from separate equipment and service vendors, and with separate hardware, software and design considerations.

FIG. 1 illustrates a conventional small office communication configuration. Voice communication system 1 typically is implemented by way of multiple analog trunks 16 from wide area network ("WAN") 18. WAN 18 often consists of a telecommunication network by way of a local telephone company or other telecommunications service provider. Analog trunks 16 may be directed through switching system 10, which may be a conventional PBX or similar telephone switch. Telephones 12 and voice mail system 14 are coupled to switching system 10. Often, dedicated analog line 16A is coupled to facsimile 44 for facsimile communications.

Data system 2 typically is implemented with a plurality of computers (or workstations, etc.) 24 interconnected by way of packet network 26, which may be a standard Ethernet compliant network or other office network. Network 26 often is coupled to remote access server 32, which is connected to one or more analog trunks 40, and which may include one or more modems in a modem pool. Computers 24 may communicate with remote systems via the modem pool of remote access server 32 over analog lines 40 and WAN 42. Network 26 typically includes a connection to printer 22 and file server 20. In more sophisticated systems, network 26 may be coupled to switching hub 28 and router 30, which is coupled to WAN 42 over digital trunks 38. Data system 2 also may include a connection between one or more of computers 24 to modem 36, which in term is coupled to WAN 42 over dedicated analog trunk 40A.

Such a conventional system often is characterized by piecemeal equipment and network solutions, limited or non-existent coordination and management between voice system 1 and data system 2, non-optimized or non-integrated equipment, and inefficient use of costly network services (telephone lines, data lines, etc.), such as duplicate and often idle phone and data network lines, often provided from multiple equipment/service providers. In general, such conventional systems are neither constructed nor operated in a manner to provide efficient and integrated voice/data communications.

SUMMARY OF THE INVENTION

The present invention is intended to address various disadvantages of such conventional communication systems. The present invention provides various systems and methods, perhaps more succinctly a platform, by which voice and data communications may occur in multiple modes and various protocols, and more particularly systems and methods for multiple native mode voice and data transmissions and receptions with a communications/computing system having a multi-bus structure, including, for example, a TDM bus, a packet bus and a control bus, and multi-protocol framing engines, preferably including subsystem functions such as PBX, voice mail and other telephony functions, email and/or file server, Internet server, LAN hub and data router. With the present invention, a platform and various processes are provided in which a TDM bus and a packet bus are intelligently bridged and managed, thereby enabling such multiple mode/protocol voice and data transmissions to be intelligently managed and controlled with a single, integrated system.

In preferred embodiments, a computer or other processor includes a local area network controller, which provides routing and hubs and/or switches for one or more packet networks. The computer also is coupled to a multiple buffer/framer, which serves to frame/deframe data to/from the computer from a TDM bus. The buffer/framer includes a plurality of framer/deframer engines, supporting, for example, ATM and HDLC framing/deframing, and raw buffering of voice data or the like. The buffer/framer is coupled to the TDM bus by way of a multiple port or multiport switch/multiplexer, which includes the capability to intelligently map data traffic between the buffer/framer and the TDM bus to various slots of the TDM frames. Preferably, a DSP pool is coupled to one or more the switch/multiplexer ports and/or the buffer/framer in a manner to provide various signal processing and telecommunications support, such as dial tone generation, DTMF detection and the like. The TDM bus is coupled to various line/station cards, serving to interface the TDM bus with telephone, facsimiles and other telecommunication devices, and also with various digital and/or analog WAN network services. The present invention provides a platform by which processing functions may be switched in to provide support for a wide range of network, vendor and application services.

With the present invention, a full PBX-type telecommunication system may be provided by way of the computer/processor and associated telephony hardware and software. Functions such as voice mail, automated attendant, call forwarding, hold, transfer, caller ID, conferencing and other telephony functions may be similarly provided. While supporting such telephony functions in their native mode primarily by way of the TDM bus, the computer/processor also supports concurrent packet data transmissions over the LAN subsystem and packet bus(es). As needed to efficiently support various voice/data communications in the particular office/work environment, the buffer/framer and switch/multiplexer provide a multi-protocol router functionality, enabling the TDM bus traffic and the packet bus traffic to be intelligently bridged and managed without degradation of each other, and without requiring translation or transcoding. With the present invention, the same WAN services may be intelligently managed and controlled for simultaneous voice, video and data traffic.

The computer/processor supports a variety of applications, such as remote configuration, management and back-up, bandwidth allocation and control, least cost routing, voice over Internet Protocol (or "voice over IP"), as well various telephony related applications. In certain preferred embodiments, audio/video data streams, such as H.320 and H.323 data streams, also are intelligently managed and controlled. In certain preferred embodiments, management applications (such as the SNMP protocol) enable the system to be remotely monitored and configured via a web browser-type access.

In accordance with the present invention, various telephony and data functions useful in offices and other settings may be more conveniently and efficiently performed, and various methods for performing telephony and data functions are provided in accordance with various preferred embodiments of the present invention.

Accordingly, it is an object of the present invention to provide simultaneous voice, video and data communications with a single, integrated system.

It is another object of the present invention to provide an intelligently controlled and managed processor bridge between one or more TDM buses and one or more packet buses.

It is yet another object of the present invention to provide an integrated PBX, router and hub to support such simultaneous voice, video and data communications.

It is still another object of the present invention to provide a multi-protocol buffer/framer and switch/multiplexer in order to provide multi-protocol routing and intelligent time slot mapping to the TDM bus, preferably including DSP resources coupled to the buffer/framer.

It is an object of the present invention to provide systems and methods allowing a broad set of services and functions to co-exist in the same system, and leveraging shared resources while providing a high level interface and intelligence that allows for the shared resources to be dynamically allocated and re-allocated.

Finally, it is an object of the present invention to provide various methods of performing telephony and data functions in novel and more efficient ways, particularly in combination with the various preferred embodiments of systems in accordance with the present invention.

Other objects, features and advantages of the various embodiments of the present invention described herein will be apparent to those skilled in the art.

BRIEF DESCRIPTION OF THE DRAWINGS

The above objects and other advantages of the present invention will become more apparent by describing in detail the preferred embodiments of the present invention with reference to the attached drawings in which:

FIG. 15 illustrates a window from a remote administration/configuration application/applet in accordance with preferred embodiments of the present invention.

FIG. 16B illustrates a window for configuration of T-1 channels of a particular communications system in accordance with preferred embodiments of the present invention.

FIG. 16C illustrates a window for configuration of station ports of a station card in accordance with preferred embodiments of the present invention.

FIG. 16E illustrates a window for configuration of frame relay type WAN resources in accordance with preferred embodiments of the present invention.

FIG. 17B illustrates a window for providing a trunk monitoring function in accordance with preferred embodiments of the present invention.

FIG. 17C illustrates a window for providing a link monitoring function in accordance with preferred embodiments of the present invention.

FIG. 17D illustrates a window for providing a station monitoring function in accordance with preferred embodiments of the present invention.

DETAILED DESCRIPTION OF THE PREFERRED EMBODIMENTS

Although various preferred embodiments of the present invention will be disclosed for illustrative purposes, those skilled in the art will appreciate that various modifications, additions and/or substitutions are possible without departing from the scope and spirit of the present invention. Specific reference is made to co-pending application Ser. No. 09/055,072 for SYSTEM METHODS FOR MULTIPLE MODE VOICE AND DATA COMMUNICATIONS USING INTELLIGENTLY BRIDGED TDM AND PACKET BUSSES and application Ser. No. 09/055,036 for SYSTEM AND METHOD FOR GENERATING VOLTAGES IN TELEPHONY STATION CARDS, both of which are incorporated herein by reference.

Figure 2:
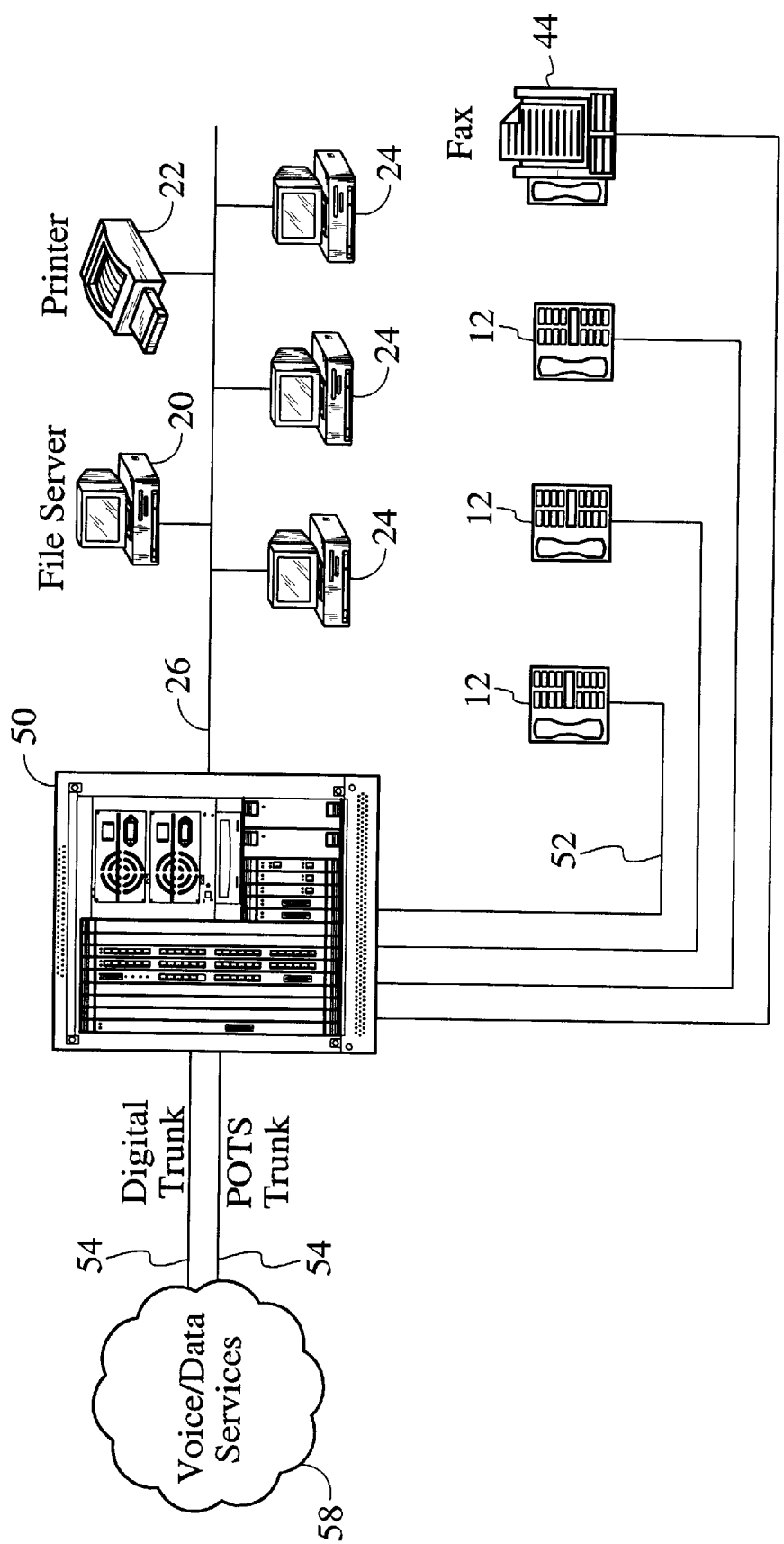
FIG. 2 provides an overview of an office communications system in accordance with preferred embodiments of the present invention.

In accordance with preferred embodiments of the present invention, systems and methods are provided to enable voice, data, video and other communications to occur in an efficient and integrated manner, intelligently allocating and utilizing available communications resources. FIG. 2 provides an overview of such a system in accordance with one preferred embodiment of the present invention.

Communications system 50 provides an integrated system for controlling and managing communications such as in an office. Communications system 50 communicates over ports 26 to file server 20, printer 22 and one or more computers 24. Ports 26 typically includes a packet bus such as Ethernet, "fast" Ethernet, ATM or other LAN technology (in other embodiments, LAN technology, such as token ring, may be coupled to an appropriately configured port). Communications system 50 includes devices for controlling ports 26, including controllers such as what are known as a network interface controller (NIC), which may integrate a media access controller (MAC) for control of and interface to ports 26. Connected to ports 26 may be a variety of devices, such as one or more file servers 20, computers 24, printers 24 and other computing, peripheral or similar devices suitable for interconnection with ports 26. Other network devices, such as routers, switches, bridges and the like also may be connected to ports 26. In one preferred embodiment, ports 26 is an Ethernet-type LAN to which is connected a variety of devices as determined by the needs of the particular office/work environment. The present invention provides effective integration of the packet data LAN and router-type functions with the telephony and server functions, which enables unique operations and the initiation or completion of calls or transactions or the like, without having access to traditional, dedicated devices, peripherals and communications services.

Communications system 50 includes the functionality of what is known as a PBX (as will be described further). In preferred embodiments, communications system 50 is connected to a plurality of telecommunication devices, such as telephones 12, facsimile 44 and other suitable telecommunications devices and access and server functions (such as private voice mail, recording devices, WAN service interface cards, etc.). What is important is that communications system 50 include interfaces for a plurality of telecommunications devices for the particular and complete office/work environment and infrastructure.

Communications system 50 is coupled to WAN voice/data services network(s) 58 through trunks 54. Voice/data services network(s) may include private line, local or long distance carrier networks, Internet, intranet and/or any other current or future WAN-type network services. Trunks 54 may consist of high, medium or low speed digital and/or analog lines, either public or private, and in certain preferred embodiments consist of high speed dedicated resources such as what are known as T-1, PRI (Primary Rate ISDN), ATM, VDSL, HDSL, ADSL, wireless, cascade, proprietary and/or twisted pair analog lines from a local telephone company. What is important is the communications system 50 is coupled to WAN services, trunks and the like in a manner that the user, service provider, administrator and/or algorithm has determined will provide adequate or required resources, on a cost-effective basis, for the particular office/work environment and operating conditions.

Figure 1:
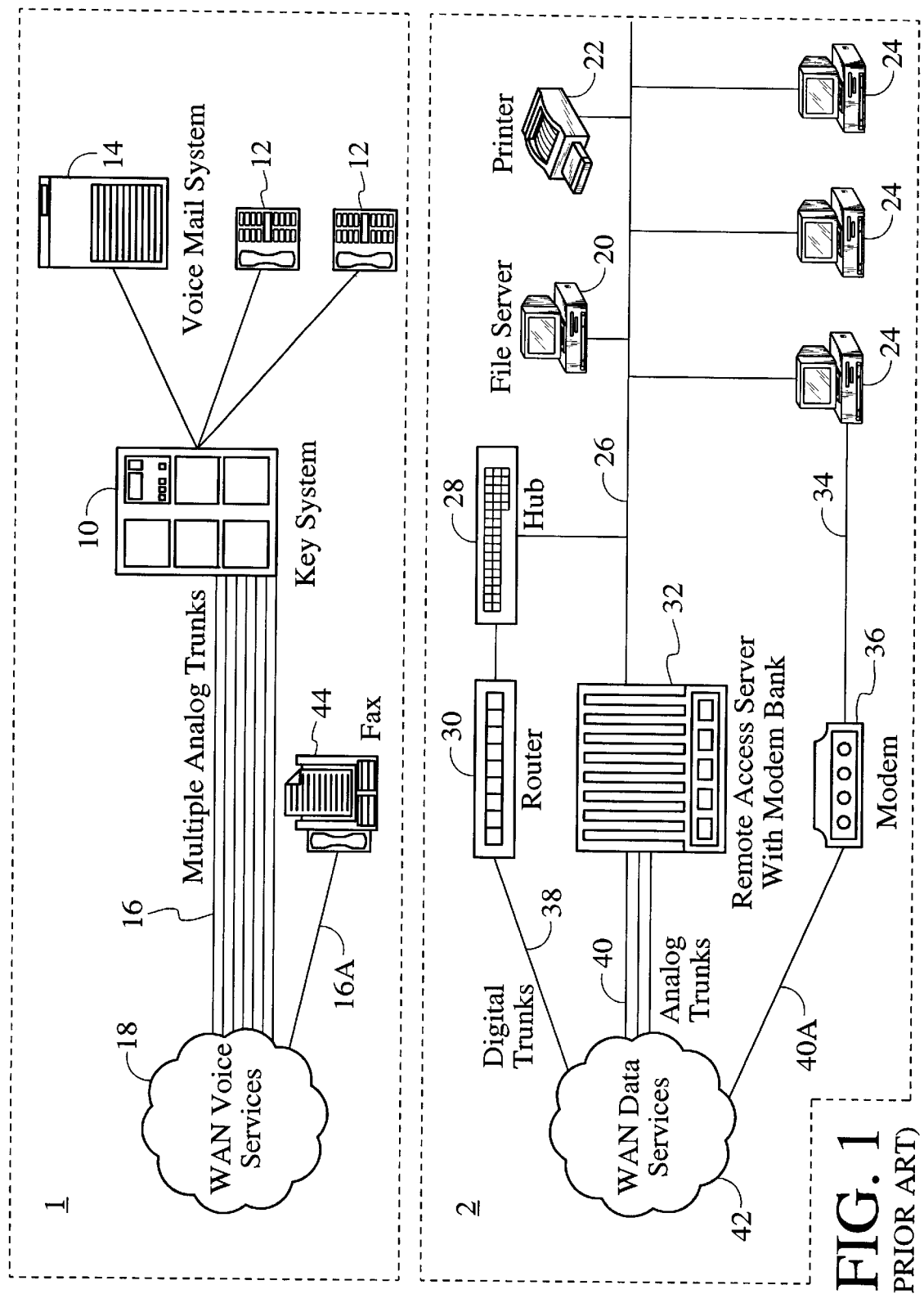
FIG. 1 illustrates a typical, conventional office communications configuration.

In contrast to FIG. 1, the communications system of FIG. 2 provides an integrated solution for voice and data communication services, to which may be connected the WAN network services and telecommunications, computing and other devices as determined by the particular office/work environment.

Figure 3:
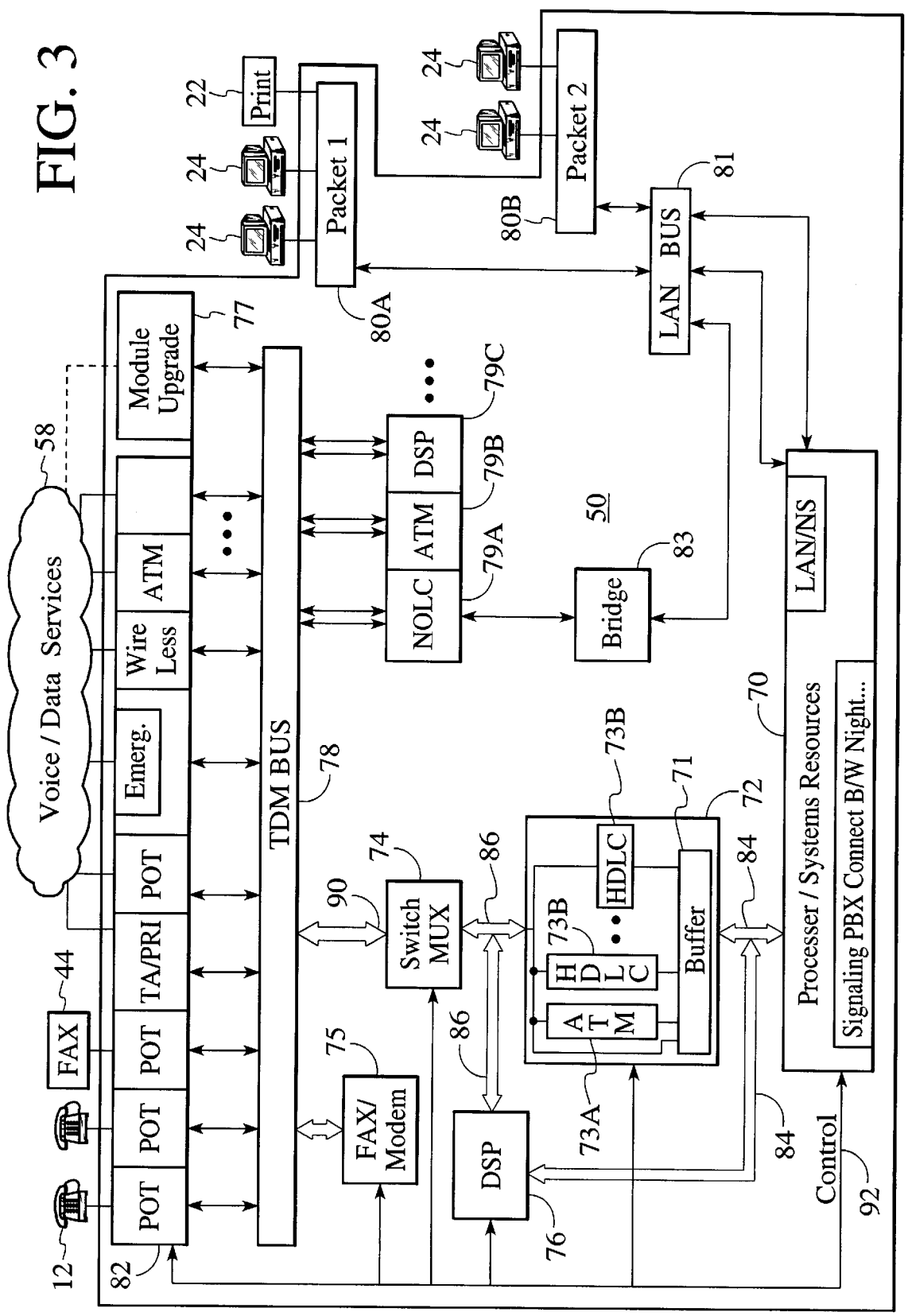
FIG. 3 is a block diagram illustrating preferred embodiments of the present invention.

Referring to FIG. 3, various subsystems, components, buses and the like of preferred embodiments of communications system 50 will be described in greater detail.

Communications system 50 is controlled by host processor/system resources 70, which in preferred embodiments include a computer powered, for example, by a commercially available or other microprocessor and an embedded and/or commercially available operating system. What is important is that processor/system resources 70 provide sufficient processing power, memory and storage resources (RAM, ROM, hard disk, magnetic or other storage, etc.), bus and other resources in order to control the various subsystems and components as will be described. In particular, computer/system resources 70 enables automatic internal negotiation, control and enabling of services and applications. Although not expressly shown, processor/system resources 70 also may include other components of a relatively high-end personal computer, workstation or server, such as a display device, keyboard, serial ports, parallel ports, power supply and the like. The various subsystems and components of communications system 50 are intelligently controlled, managed and monitored by processor/system resources 70. Processor/system resources 70 provides system and server management software and the like, and a platform for various server applications as described herein.

Host processor/system resources 70 is coupled to buffer/framer 72 via bus 84, which in preferred embodiments consists of a computer bus such as what are known as a PCI bus or ISA bus (in other embodiments, other suitable computer-type buses are utilized, which may include proprietary local buses). Buffer/framer 72 includes buffer 71 and preferably includes a plurality of multi-protocol framing/deframing engines, such as for what are known as asynchronous transfer mode (ATM) or high-level data link control (HDLC) protocols, which may be synchronous or asynchronous. In other embodiments, other communication protocol framers/deframers are provided, as may be desired by the particular office/work environment. Buffer/framer 72 in certain preferred embodiments includes, for example, one or more ATM framers/deframers 73A and one or more, and preferably a plurality of, HDLC framers/deframers 73B. Although not expressly shown, buffer/framer 72 includes other controlling circuits (such as a slot mapping memory, multiplexers/demultiplexers, arbitration, control and other circuitry) such as, for example, described in U.S. Pat. No. 5,533,018 to DeJager, et al. for "MULTI-PROTOCOL PACKET FRAMING OVER AN ISOCHRONOUS NETWORK," which is hereby incorporated by reference. As will be described in greater detail, buffer/framer 72 includes the capability to transfer raw or protocol-processed data, which may be mapped to particular slots of TDM bus 78 and made available on different ports. Buffer/framer 72 is controlled by processor/system resources 70 as diagrammatically indicated by control line(s) 92 (control line(s) 92 may be implemented as part of a bus structure, such as bus 84). In preferred embodiments, processor/system resources 70 includes redundant disk or other storage, redundant power supplies and data back-up to magnetic or other media in order to enhance fault tolerance of the system.

Processor/resources 70 also may be connected to DSP 76. DSP 76 preferably consists of a single digital signal processor or multi-digital signal processor resource pool, which serves to provide a variety of functions within communications system 50. In preferred embodiments, DSP 76 generates dial tones (such as for telephones 12) and also performs DTMF digit detection and decoding, echo cancellation, coding/decoding functions, voice conferencing, voice compression, voice recognition and the like. In other embodiments, DSP 76 performs data compression, transcoding, processing for voice communications using an Internet protocol ("IP") or the like. In general, DSP 76 provides a set of processing and memory resources to support the various voice/data services controlled and managed by processor/resources 70. As illustrated by bus connection 84A, DSP 76 alternatively may be coupled directly to TDM bus 78.

Switch/multiplexer 74 communicates bidirectionally with buffer/framer 72 and preferably with DSP 76, as illustrated, over bus 86. Switch/multiplexer 74 also communicates with TDM bus 78, as illustrated, over bus 90. TDM bus 78 preferably is a time division multiplexed bus as is known in the art (such as, for example, what is known as an MVIP or multi-vendor integration protocol type bus), and provides in certain preferred embodiments 256 channels/slots per TDM frame (the present invention is not limited to a single TDM bus; in alternative embodiments, more than one TDM bus or other types of TDM buses are utilized). TDM bus 78 allows communication between devices on the bus by way of circuit switching techniques. This type of switching allows for simple and inexpensive communication of voice through, for example, what are known as pulse code modulation ("PCM") techniques. Switch/multiplexer 74 preferably is implemented with one or more switching/serial time division multiplexing circuits, such as, for example, described in U.S. Pat. No. 5,541,921 to Swenson, et al. for "ISOCHRONOUS SERIAL TIME DIVISION MULTIPLEXER," which is hereby incorporated by reference. Switch/multiplexer 74, under control of processor/system resources 70, provides the capability for various voice/data signals to be controllably switched to desired slots of TDM bus 78.

Coupled to TDM bus 78 are line, station, trunk, or other interface cards 82. Cards 82 provide CODEC, line interface, off-hook detect and other functions as are known in the art to support various telecommunication devices (such as telephones 12 and facsimile 44) and WAN-type network services (such as voice/data services 58) that are communicating with communications system 50 via TDM bus 78. In preferred embodiments cards 82 provide points of termination for a plurality of telephones 12, one or more facsimiles 44, and various T-1, PRI, ATM, analog and/or other WAN-type network services as determined by the particular office/work environment. Cards 82 under control of processor/system resources 70, may include points of termination for emergency or backup telephone services and the like, such as in the event of a power failure or to provide analog services in the event a dedicated resource such as a T-1 is unavailable for some reason.

Communication system 50 also may include fax modem 75, which, under control of processor/system resources 70, may process incoming/outgoing facsimile transmissions. In the preferred embodiment, fax modem 75 is coupled to TDM bus 78 as illustrated, although in other embodiments fax modem 75 may be coupled in alternative arrangements, such as to switch/multiplexer 74 and/or DSP 76.

Communication system 50 also may include available card slots on TDM bus 78 for one or more module upgrades 77. Additional resources and/or functionality may be added to communication system 50 as needed by way of module or line card upgrade(s) 77, or by, for example, the addition of one more cards such as ATM controller 79B and DSP 79C. Through the use of such module upgrades or additional cards, etc., one or more minimal configurations of communication system 50 may be provided, with additional resources and/or functionality added by the insertion of additional cards to TDM bus 78. In accordance with preferred embodiments of the present invention, software upgrades for processor/system resources 70, or for other resources in the communications system, also may be applied.

Processor/system resources 70 also is coupled to one or more packet buses, such as packet buses 80A and 80B, which may be through a bus such as LAN bus 81. Effectively, packet buses 80A and 80B provide multiple hubs or switches to intercommunicate between one or more packet networks, which in preferred embodiments are Ethernet networks. It should be noted that the bus configuration of FIG. 3 may be considered "logical", and in preferred embodiments the physical bus configuration may be such that TDM bus 78 and packet buses 80A and/or 80B are part of the same physical bus. In such embodiments, packet buses 80A and/or 80B also can intercommunicate directly with central resources (such as processor/system resources 70) as well as station cards and WAN cards (or any other cards) coupled to the TDM bus (this is illustrated FIG. 3 by card 79D, which is a card simultaneously inserted into/coupled to both TDM bus 78 and packet bus 80 A and which may comprise, for example, a combined LAN interface/functionality and central office (or other WAN interface) card. Such a combined interface card, which may support both LAN and WAN functions (such as described elsewhere herein), enables substantial advantages over conventional systems.

Coupled to packet buses 80A and/or 80B are a variety of computing-type devices, such as computers 24, printer 22, other computers, file servers, backup or storage resources, other networks and the like. Processor/system resources 70, in software and/or hardware, provides a LAN/network subsystem, which includes routing and other related functions to support data communications to and from packet buses 80A and/or 80B and TDM bus 78, etc., through several paths or methods.

In preferred embodiments, a more direct connection between packet bus 80A and/or 80B may be established by way of embedded router or bridge 83. Router/bridge 83 includes a CPU, TCP/IP controller, router, stack, Ethernet interface or other functionality as may be desired to couple LAN bus 81 to, for example, one or more HDLC controllers 79A. Through the use of router/bridge 83, communications between packet buses 80A and 80B may be accomplished while consuming minimal resources of processor/system resources 70.

Figure 4:
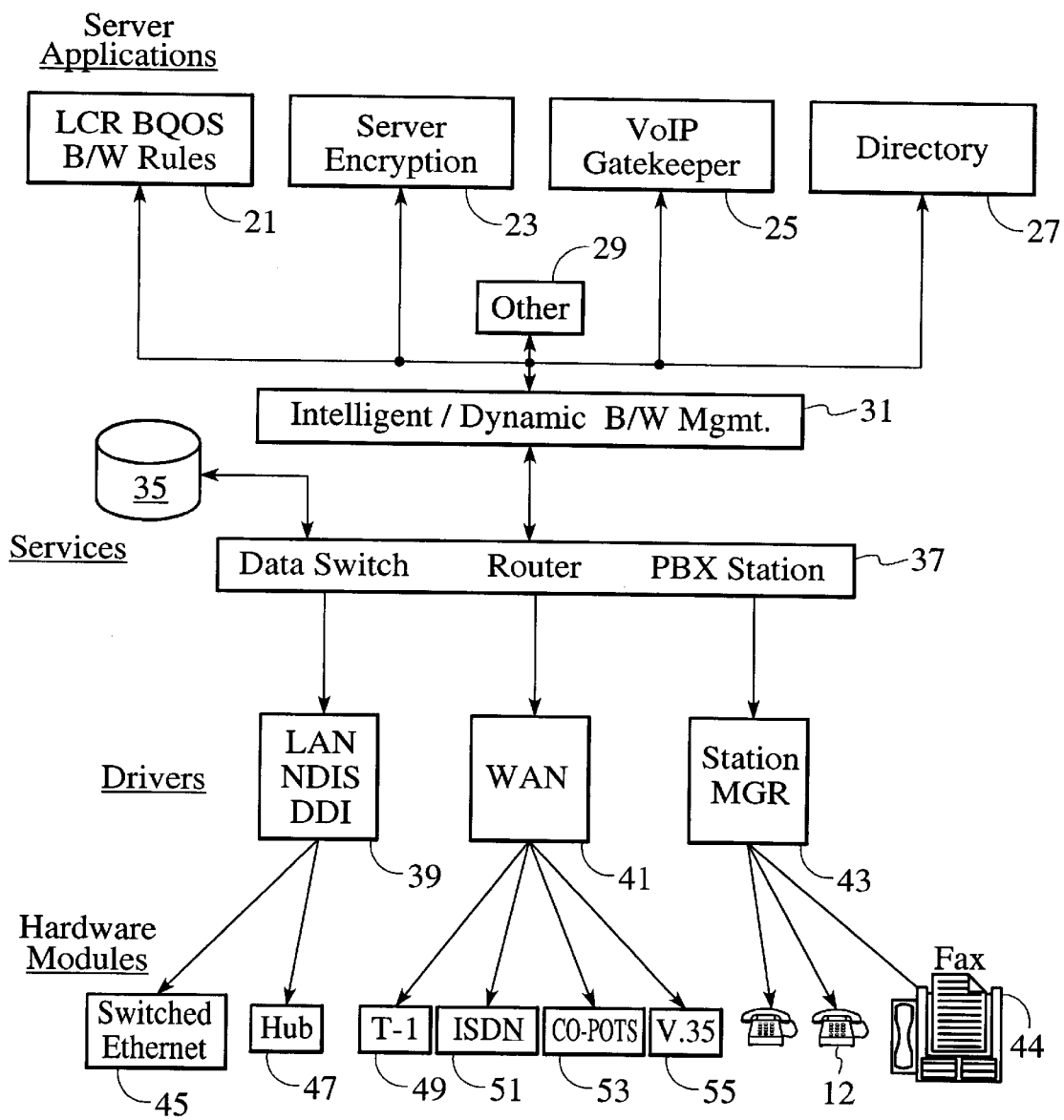
FIG. 4 provides a software/hardware overview of an office communication system in accordance with preferred embodiments of the present invention.

FIG. 4 provides a software/hardware overview of an office communications system in accordance with preferred embodiments of the present invention. It should be noted that the preferred embodiment of FIG. 3, with appropriate software in processor/system resources 70, may provide the software/hardware described in connection with FIG. 4, as will be appreciated by those skilled in the art.

At the server applications level, various software applications may be provided for operation in conjunction with the hardware illustrated, for example, in FIG. 3. Such software applications may include what are known as least cost routing ("LCR"), best quality of service ("BQOS") and bandwidth ("B/W") rules 21. LCR, BQOS and B/W rules 21 provide tables, information, rules and/or algorithms by which data and voice communications may be allocated and/or controlled with respect to, for example, the various types of voice/data network services that are available to communications system 50. Such information may include the current cost of utilizing various resources (based on time of date, amount of usage, integrated amount of usage over some period of time, etc.), and also priority rules for the various types of communications provided by communications system 50. For example, phone calls may be assigned a priority 1, facsimile calls a priority 2, VoIP calls a priority 3, facsimile over IP calls a priority 4, category 1 data communications a priority 5, and other data communications a priority 6. In preferred embodiments, the priority assignments may change by time of day or month, and/or the priority assignments may be different with respect to different network resources and the like.

Server encryption applications 23 may be provided in order to provide encryption or similar coding or processing of voice/data communications processed by communications system 50. VoIP gatekeeper 25 may be provided to service and control voice over Internet protocol ("VoIP") communications. As more specifically described below, various types of VoIP communications may be effectively managed and controlled in accordance with preferred embodiments of the present invention, such as, for example, a determination that acceptable conditions exist on the Internet for such communications. Directory 27 may be provided in order to make various types of directory information available to users of communications system 50. Directory information provided by directory 27 may include names, telephone extensions, address or other personal or work information regarding persons or departments, etc., serviced by communications system 50. Directory 27 also may include similar directory type information for persons or departments, etc. in a remote or other locations, such as may be accessed through voice/data services 58.

In general, with the present invention other applications 29 may be provided to support various types of communications in accordance with preferred embodiments of the present invention.

Intelligent/dynamic B/W, service and resource management 31 is provided to effectively and efficiently control and allocate and de-allocate services and communications resources, such as in accordance with LCR, BQOS, B/W rules 21 (e.g., rules to enable lowest cost, highest quality or otherwise desirable management and control of network or other resources, etc.) or other applications 29 or the like. B/W management 31 also receives as inputs information indicating the total number and types of network resources (of voice/data services 58, for example) that are available to communications system 50, and their status and availability at any given point in time. B/W management 31 may receive as an input, or may generate internally, information indicating how much of a measured usage resource may be available at a given point in time (for example, "frame relay," "private virtual channel" or other network services may be provided on the basis of a predetermined amount of data transmission per fixed time period for a fixed price, with additional charges for usage in excess of the predetermined amount, etc.). As more fully described below, based on the currently available and currently utilized services and resources, B/W management 31 may allocate and de-allocate such services and resources in a desired and/or cost efficient manner.

Services 37, which may be supported by database storage 35 (which may be provided as a part of processor/system resources 70), include data switching services, router services and PBX station services. In general, in accordance with preferred embodiments of the present invention, and utilizing resources such as described in connection with FIG. 3, various communication-related services may be advantageously supplied by communications system 50.

For example, data switching services may be provided such as by LAN/NDIS/DDI drivers 39 (LAN, NDIS and DDI being exemplary) through hardware modules such as switched Ethernet 45 and hub 47. Routing services may be provided such as through WAN drivers (specific network services such as PRI and T-1 being exemplary) through hardware modules such as T-1 module(s) 49, ISDN module(s) 51, central office-plain old telephone service (CO-POTS) module(s) 53, V.35 module(s) (it should be understood that various hardware modules may be utilized in accordance with preferred embodiments of the present invention, as desired to implement the various data switching, routing and other communications connections as may be determined by the needs of the particular office/work environment). PBX station services, such as automated attendant, reception, voice mail and the like, may be provided through station manager 43. Station manager 43 provides hardware for connection to various telecommunications devices, such as phones 12, facsimile 44, etc. In general, station manager 43 provides sufficient interface hardware in order to connect to the various devices that may be determined by the needs of the particular office/work environment.

Figure 5:
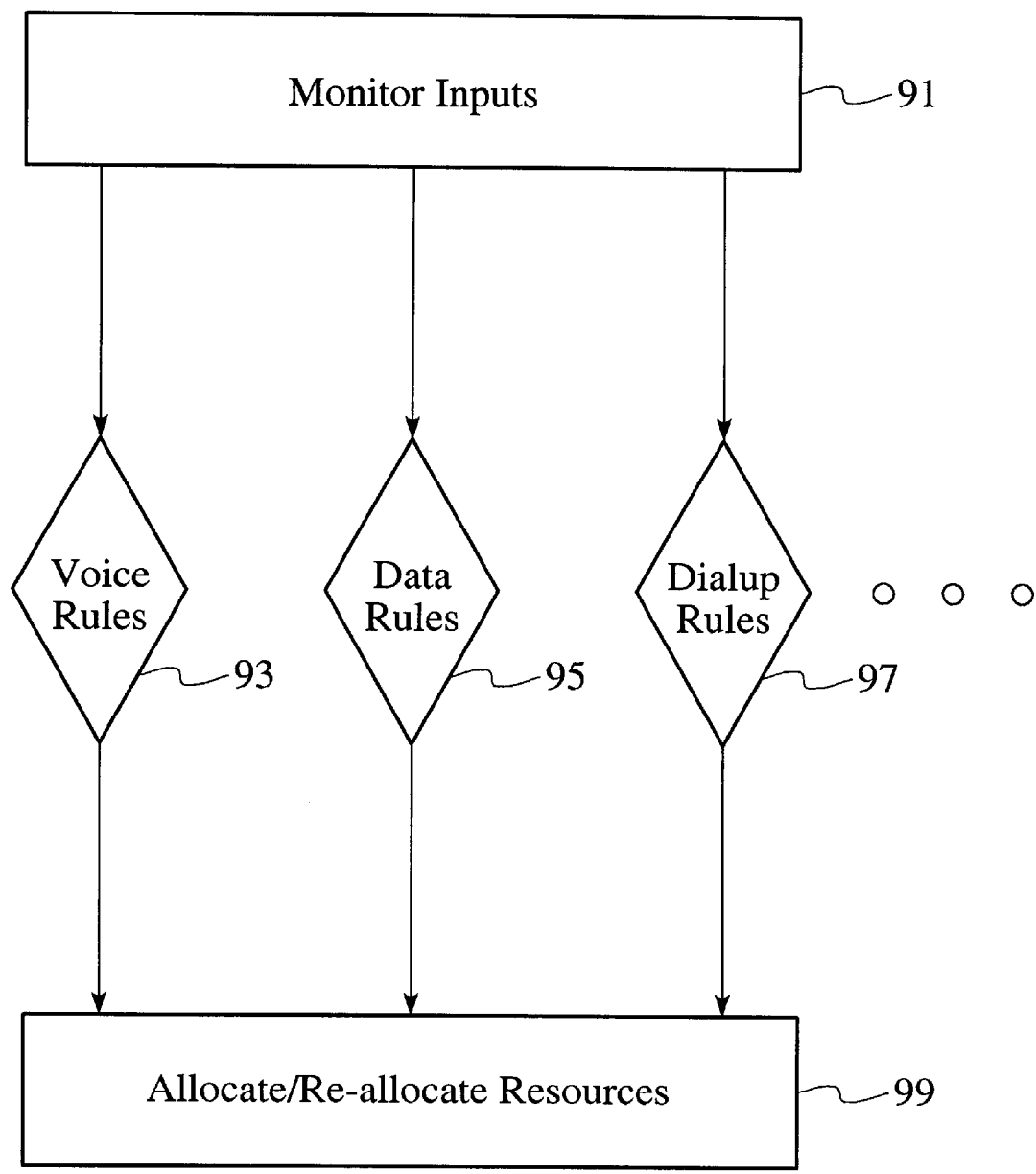
FIG. 5 illustrates the use of services/bandwidth allocation rule table(s) in accordance with preferred embodiments of the present invention.

Referring now to FIG. 5, a general flow chart will be described for illustrating the use of services/bandwidth allocation rules in accordance with preferred embodiments of the present invention.

Server applications, such LCR, BQOS, B/W rules 21, may be considered to have various rule sets, such as voice rules 93, data rules 95 and dial-up rules 97 (other rule sets may be provided). Communications system 50 monitors inputs (illustrated as monitor inputs block 91 of FIG. 5), and based on such inputs and the overall service/network resources available, and in accordance with voice rules 93, data rules 95 and dial-up rules 97, allocates and de-allocates resources (illustrated as allocate/re-allocate resources block 99 of FIG. 5).

Exemplary operations of such preferred embodiments will now be described.

In the event a user picks up one of telephones 12, an off-hook condition is detected by the appropriate card 82, which signals processor/system resources 70 of the off-condition. Processor/system resources 70 controls switch/multiplexer 74 to couple the appropriate card 82 to DSP 76, which generates a dial tone that is coupled to the appropriate telephone 12. The user hears the dial tone and may then proceed to place the desired call. DSP 76 detects the digits of the telephone number of the desired call and provides the detected digits to processor/system resources 70. For an internal call, processor/system resources 70 directs that the called internal telephone receive a ring signal from the appropriate card 82. Upon pick-up of the called internal telephone, the telephone connection between the internal phones is established by way of TDM bus 78 and the appropriate cards 82.

For an external call, processor/system resources 70 attempts to establish the desired connection through the appropriate cards 82 and available voice/data services 58. In attempting to establish such a voice communication connection, processor/system resources preferably follows the general flow illustrated in FIG. 5. Namely, in accordance with available resources (such as of voice/data services 58) and rules such as voice rules 93, data rules 95, dial-up rules 97, etc., an external voice communication may be established by, for example, a POTS line connection, an ISDN B channel, a VoIP connection, etc. In accordance with the present invention, resources may be allocated for the processing of such an external call based on the available resources at the particular time and applicable rules (which may include time of day, priority of call, etc.)

Incoming calls are detected by the appropriate cards 82 and signaled to processor/system resources 70. Connections of voice incoming calls to telephones 12 are established under control of processor/system resources 70 over TDM bus 78.

Still additional operational advantages and features in accordance with still additional preferred embodiments of the present invention will now be described.

PBX and Telephony-Related Functions

With the hardware of preferred embodiments as illustrated in FIG. 3, various novel and/or improved or more efficient communications functions may be obtained. As noted in FIG. 2, with the present invention a plurality of workstations or computers 24 may be connected to communications system 50. Although only a single LAN is illustrated in FIG. 2, as illustrated in FIG. 3 two or more LANs may be coupled to communications system 50, with a plurality of computers coupled to each of the two or more LANs, etc.

In accordance with preferred embodiments of the present invention, one or more of computers 24 may execute a PBX/telephony control application software program. In accordance with the PBX/telephony control application, hereinafter referred to as the "office attendant type" program, control of the telephony and related functions of communications system 50 may be intelligently managed and controlled. With such an arrangement, one or more computers on the LAN may be used to control incoming and outgoing calls of the office using the computer in a natural and intuitive manner. A telephony headset or telephone preferably is associated with the particular computer that will be running the office attendant type program to enable traditional voice communications with incoming callers, etc.

Figure 6:
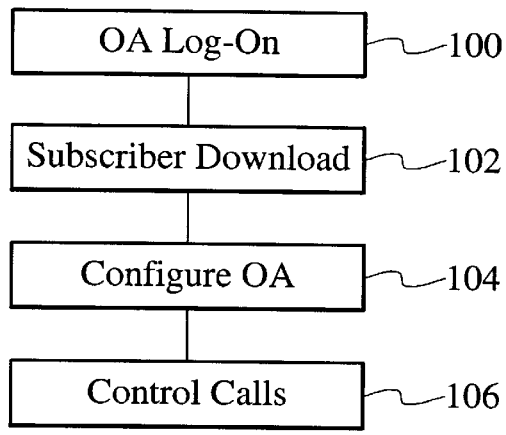
FIG. 6 illustrates a general flow chart for controlling incoming and outgoing calls in accordance with preferred embodiments of the present invention.

As illustrated in FIG. 6, a party desiring to control the incoming and outgoing calls of the office ("attendant 1") may log-on and run the office attendant type program from one of the computers connected to the LAN connected to communications system 50. At step 100, attendant 1 may be required to enter an appropriate user name/ID and password in order to recognize attendant 1 as an appropriate user to assume control of the telephony functions of the office. A network or systems administer may set up password control for parties authorized to run the office attendant type program. At step 102, in preferred embodiments the computer running office attendant type program has downloaded to it the current telephone subscriber directory such as over packet bus 80A or 80B of FIG. 3 (e.g.: a complete listing of the telephone subscribers; extensions; status information such as do not disturb, forward and forwarding information, forward to voice mail, hunt group information, etc.) from communications system 50. In this manner, the computer or computers running the office attendant type program may locally contain current subscriber information for controlling the incoming and outgoing calls of the office. In preferred embodiments, communications system 50 automatically determines when subscriber information changes, e.g., a subscriber has been added to or deleted from the telephone directory, or an extension has changed, or a subscriber's status information has changed, etc. In such embodiments, computers running the office attendant type program may be updated promptly and automatically by communications system 50 so as to contain current subscriber information on an ongoing basis to more efficiently control telephony operations of the office. It also should be noted that in preferred embodiments the subscriber information also may include other information, such as the email address of the particular subscriber and network identification for a computer associated the particular subscriber. With such information, net messages or other communications with particular subscribers may be facilitated as more fully described herein.

In step 104, the computer running the office attendant type program optionally may run a configuration routine to more optimally configure the office attendant type program on the particular computer for control of the telephony operations. At step 106, the computer running the office attendant type program is in a ready condition for processing incoming or outgoing calls or the like.

Figure 7:
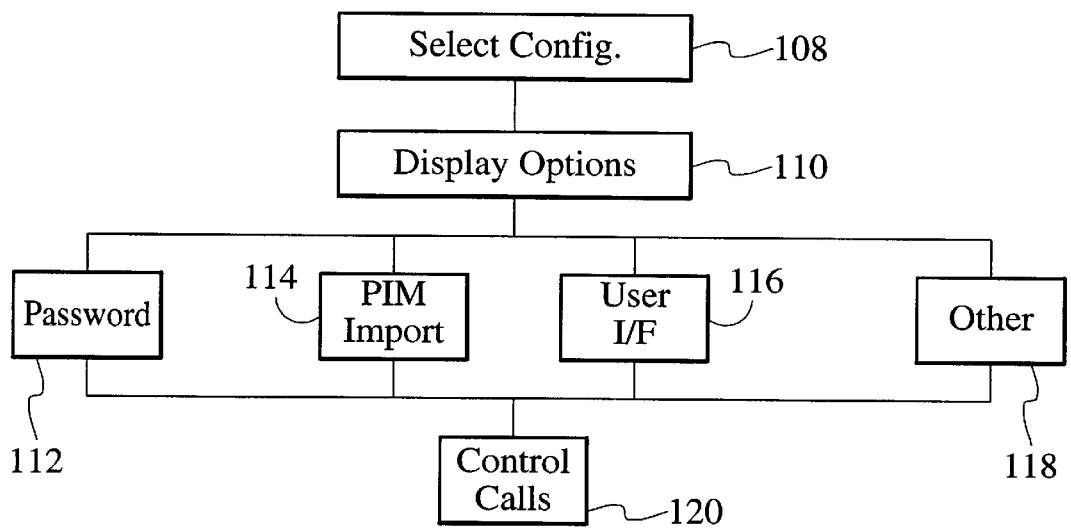
FIG. 7 illustrates an exemplary configuration algorithm for an office attendant type program in accordance with preferred embodiments of the present invention.

Referring to FIG. 7, an exemplary configuration algorithm for an office attendant type program will now be described. At step 108, the user selects a configuration icon or otherwise initiates a configuration command on the computer running the office attendant type program. At step 110, the office attendant type program displays a choice of configuration options. FIG. 7 illustrates options such as password change option 112, contact or personal information manager ("PIM") import option 114, user interface configuration option 116 and other option 118 (other option 118 indicates other configuration options that may be presented to the user to more optimally configure the office attendant-type program for the particular user or operating environment, etc). At step 120, the computer running the office attendant type program has completed the configuration process and is in a ready condition for processing incoming or outgoing calls or the like.

Figure 7A:
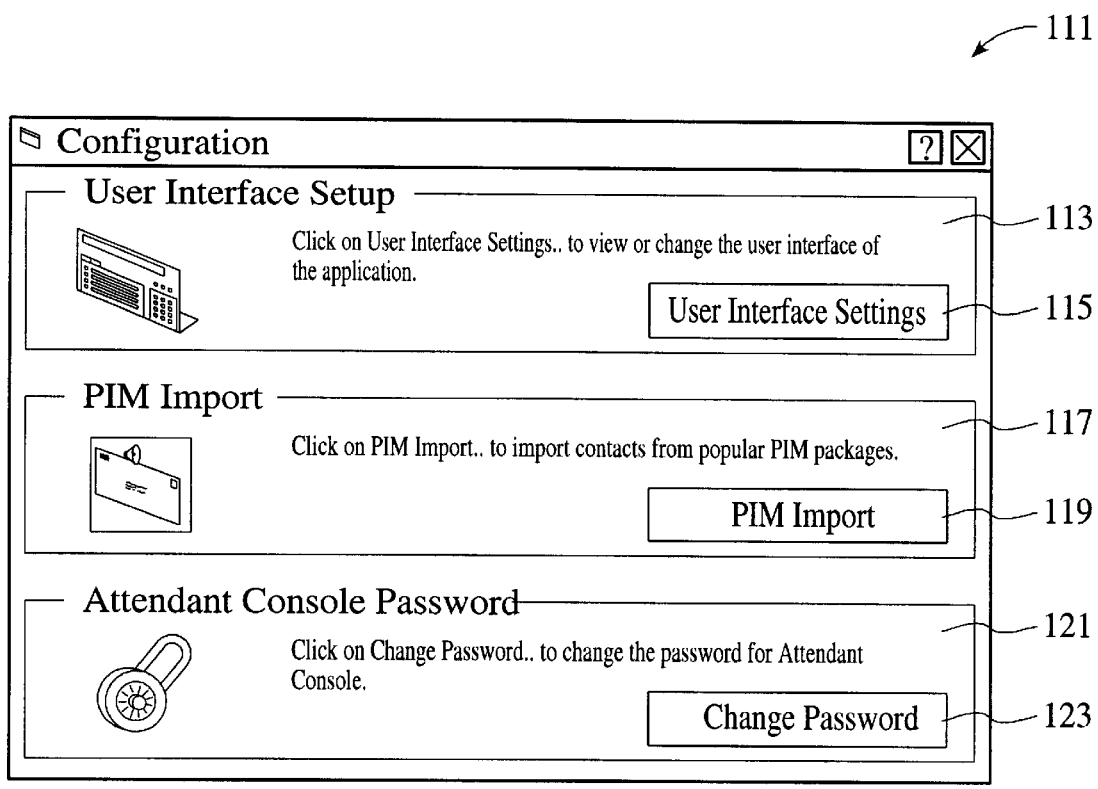
FIG. 7A illustrates an exemplary arrangement of configuration options of the present invention.

An exemplary arrangement of configuration options for such a configuration algorithm is illustrated in FIG. 7A. As illustrated, by configuration window 111, a user may be presented with configuration windows such as user interface configuration window 113, contact or PIM import window 117 or password control window 121. As an illustrative example, user interface window 113 may include icon 115 for displaying menus or windows for tailoring the user interface for the particular user and operational parameters; exemplary user interface options include user selectable tones or volumes for indicate incoming calls, line status conditions, programmable call capacity before routing calls to another computer running an office attendant-type program or to an automated call answering algorithm of communications system 50, visual display options to vary the computer display (such as size, color of icons or background, etc.) of the screens of the particular office attendant type program, etc. What is important is that a particular user running an office attendant-type program on a particular computer may configure user interface-type attributes to more optimally configure the computer that the user will use to control the incoming and outgoing calls of the office, etc. It should be noted that, although other computers coupled to communications system 50 may simultaneously be running an office attendant-type program, each such computer in preferred embodiments may be independently configured to be more optimum for the particular computer users.

Other configuration windows illustrated in FIG. 7A include contact or PIM import window 117 and password control window 121. PIM import window 117 may include icon 119 for displaying menus or windows for importing contact information from a PIM-type software program or database. In accordance with such embodiments, contact information to be used by the user running the office attendant type program may be readily imported from a PIM-type information database or contact list (which may be resident on the particular computer, in communications system 50 or on another computer coupled to a LAN), thus saving the time from entering contacts from a manual or electronic list. Password control window 121 may include icon 123 for displaying menus or windows for enabling the user to change his/her password. In preferred embodiments, the office attendant-type program(s) used to control telephony functions of communications system 50 utilizes password protection to prevent database tampering and the like and also to prevent unauthorized use of the office-attendant-type program(s).

Figure 8A:
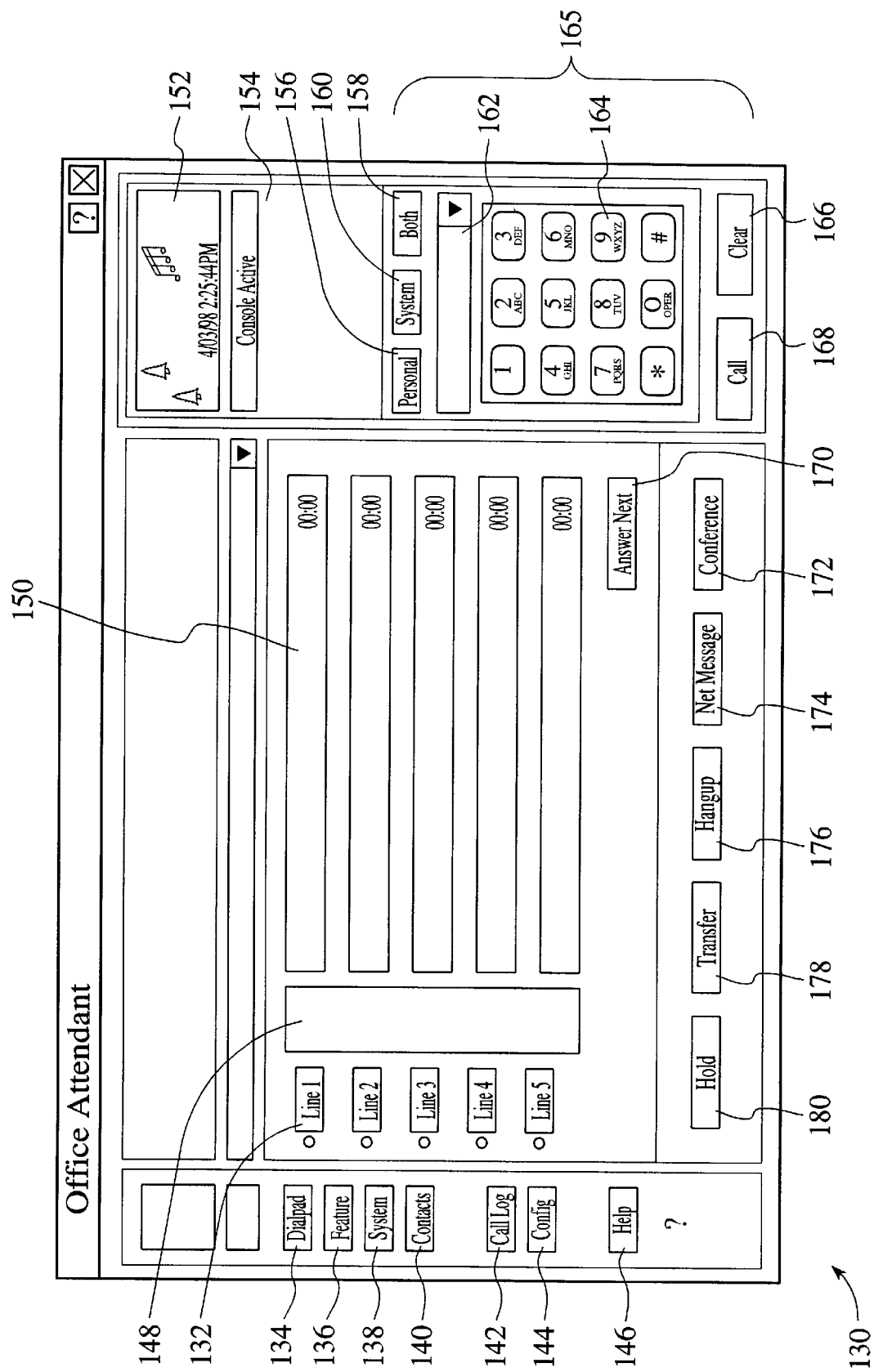
FIGS. 8A to 8D illustrate exemplary windows in accordance with preferred embodiments of office attendant-type programs in accordance with the present invention.

Referring now to FIGS. 8A to 8D, exemplary windows from illustrative preferred embodiments of office attendant-type programs in accordance with the present invention will now be described. As illustrated in FIG. 8A window 130 includes one or more line displays 132 (five are shown in FIG. 8A for illustrative purposes) for indicating various telephone lines available in the particular application of communications system 50. The number of telephone lines, of course, may be tailored for the particular application. Preferably positioned adjacent to line displays 132 is call/line status display 148 for displaying symbols adjacent to each line indicative of the status of the line, such as idle, phone ringing, active call in progress, call on hold, hold recall alert, etc. Status display 148 provides a ready visual indicator to the user of the office attendant-type program of the status of the various telephone lines that are being monitored. Also adjacent to the line displays (as illustrated adjacent to status display 148) are user identification displays 150, which serve to display the name and/or extension or telephone number of one or both parties to a call. In certain embodiments, caller ID type information may be obtained by communications system 50 from an appropriate interface card (see interface cards 82 of FIG. 3) and also displayed on displays 150. Displays 150 also may display a clock indicating the duration of a call on a particular line.

In preferred embodiments, window 130 also includes calling feature buttons or icons such as dialpad icon 134, feature icon 136, system icon 138 and/or contacts icon 140. Other icons may include call log icon 142 and/or configuration icon 144. Dialpad icon 134 preferably results in the display of a dialpad, such as dialpad window 165 in the lower left corner of window 130. Feature icon 136 preferably results in the display of a set of feature buttons as will be described in connection with FIG. 8B. System icon 138 preferably results in the display of a set of system buttons as will be described in connection with FIG. 8C. Contact icon 140 preferably results in the display of a list of contacts/contact folders as will be described in connection with FIG. 8D. Call log icon 142 preferably results in the display of one or more windows displaying log-type information for incoming or outgoing calls controlled by the office attendant type program. Call log information may be retained on the particular computer running the office attendant type program and/or centrally stored by communications system 50. Configuration icon 144 prompts one or more configuration windows, examples of which have been described elsewhere herein. Help icon 146 also may be provided in order to display help information to the user of the office attendant-type program.

In accordance with preferred embodiments of the present invention, hold icon 180 is provided to enable a caller to be readily put on hold by the office attendant type program user. Transfer icon 178 is provided to enable a caller to be readily transferred by the office attendant type program user (transfer operations are discussed in more detail in connection with FIGS. 9A through 9C). Hangup icon 176 is provided to enable a caller to be readily disconnected by the office attendant type program user. Net message icon 174 is provided to enable a net message to be sent by the office attendant type program user (net messages are discussed in more detail in connection with FIGS. 10A and 10B). Conference icon 172 is provided to enable conferences to be established by the office attendant type program user (conferences are discussed in more detail in connection with FIGS. 11A through 11E). Answer next icon 170 is provided to enable the office attendant type program user to sequentially answer calls, such as, for example, in a situation in which numerous calls have come in a short period of time, and the user wishes to sequentially access such calls.

Dialpad window 165, accessed in response to activation of dialpad icon 134, displays a visual keypad, much like a traditional telephony keypad with buttons 164, and also preferably includes other buttons such as call button 168 (for initiating calls), clear button 166 (for clearing number or information, such as subscriber information, displayed on display 162 (display 162 also may be used to input numeric or character information such as for a subscriber, and also may have a menu pull-down icon as illustrated to display a menu of, for example, subscriber information), personal button 156 (which may be used, for example, to make personal contact or PIM information available in display 162), system button 160 (which may be used, for example, to make system contact information available in display 162), or both button 158 (which may be used, for example, to make both personal contact or PIM information and system contact information available in display 162).

Figure 8B:
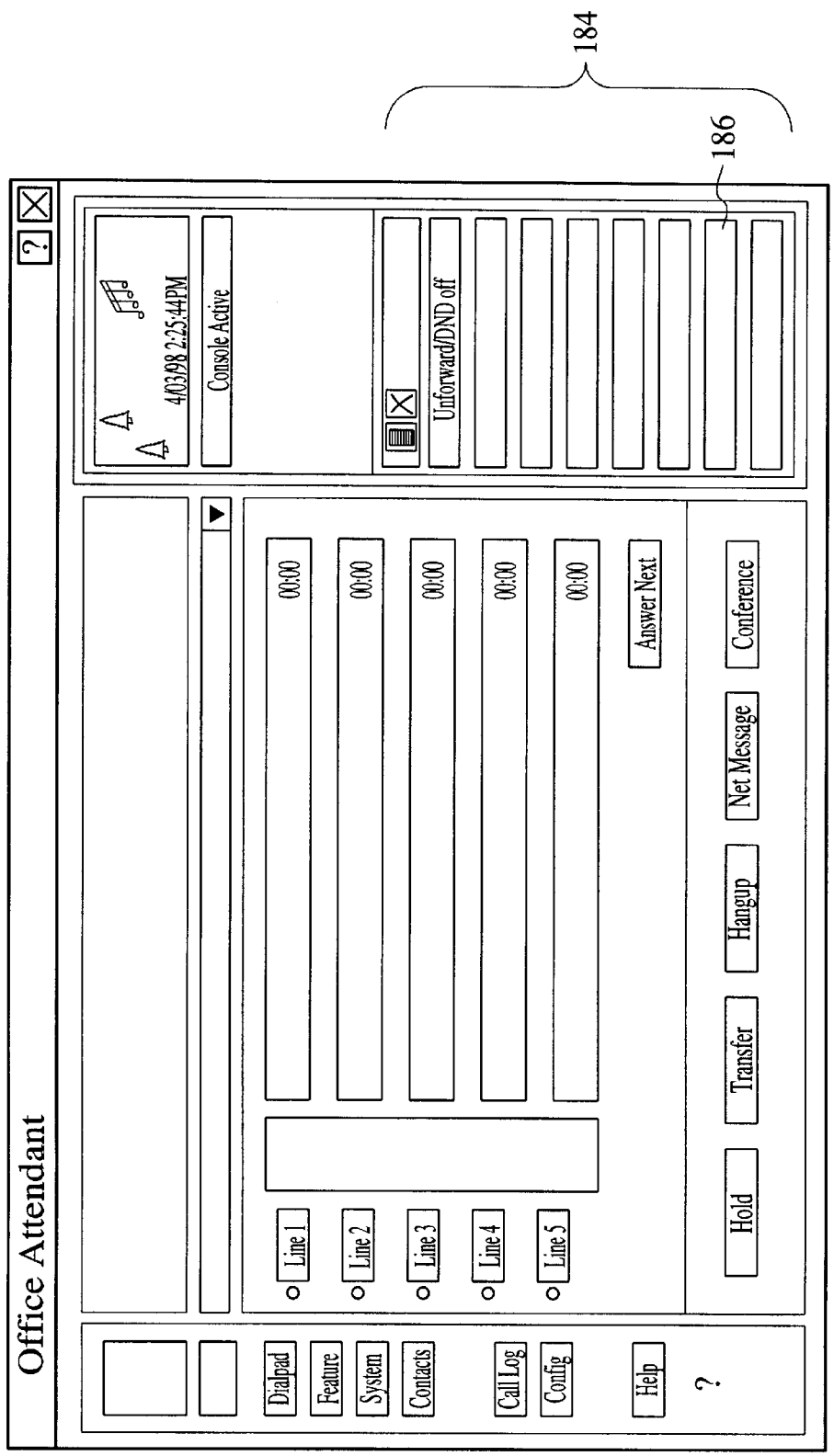

Referring now to FIG. 8B, window 182 is illustrated with feature box 184 shown, which may be displayed through the use of feature icon 136. Feature box 184 includes one or more configurable feature buttons 186. Such feature buttons enable a configurable environment for the office attendant type program user, by enabling particular tasks to be configured for particular feature buttons. As illustrative examples, such task/features may include dialing particular calls, forwarding calls to another extension, transferring calls to another extension, unforwarding calls, setting do not disturb for particular extensions, dialing international or special toll calls or the like, or other tasks that a particular user may find desirable to have accessible with a single or very few clicks of the computer mouse or pointer. The particular feature buttons preferably include textual information descriptive of the particular feature or task associated with the displayed button. In preferred embodiments, feature buttons may be added or deleted as desired by the particular user.

Figure 8C:
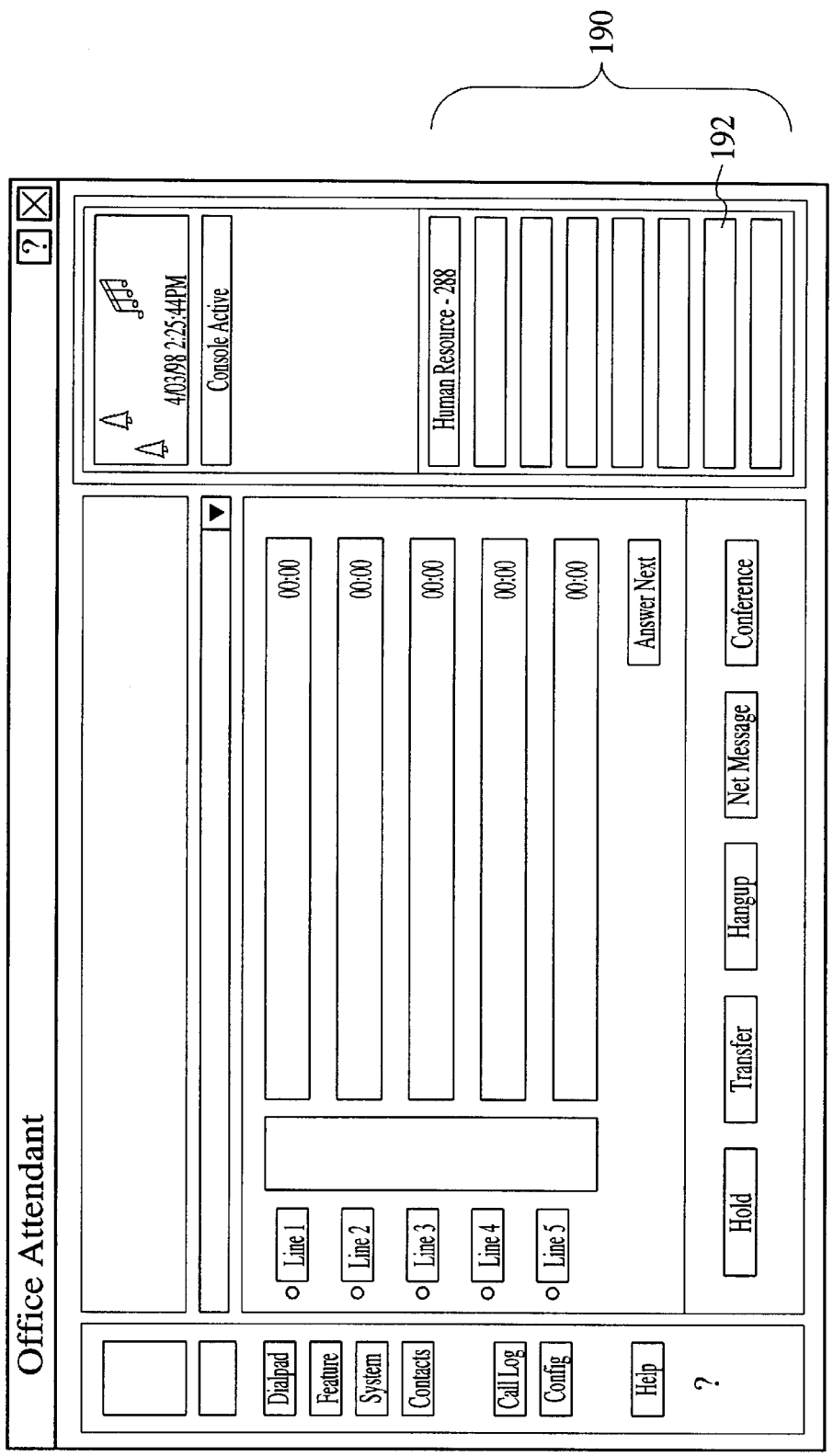

Referring now to FIG. 8C, window 188 is illustrated with system box 190 shown, which may be displayed through the use of system icon 138. In preferred embodiments, system box 190 includes a plurality of system buttons 192, which provide essential contacts, such as emergency numbers (e.g., police or fire or building security), the numbers particular to departments or officers in the particular company, branch office numbers, etc. With the use of system box 190, a user may have readily displayed the numbers of essential or important contacts, which may be connected with a single click of the computer mouse or pointer. The numbers or contacts associated with particular system buttons may be programmed by the user, but more preferably are programmed by the administrator of communications system 50 and downloaded in a manner similar to the subscriber information as previously described.

Figure 8D:
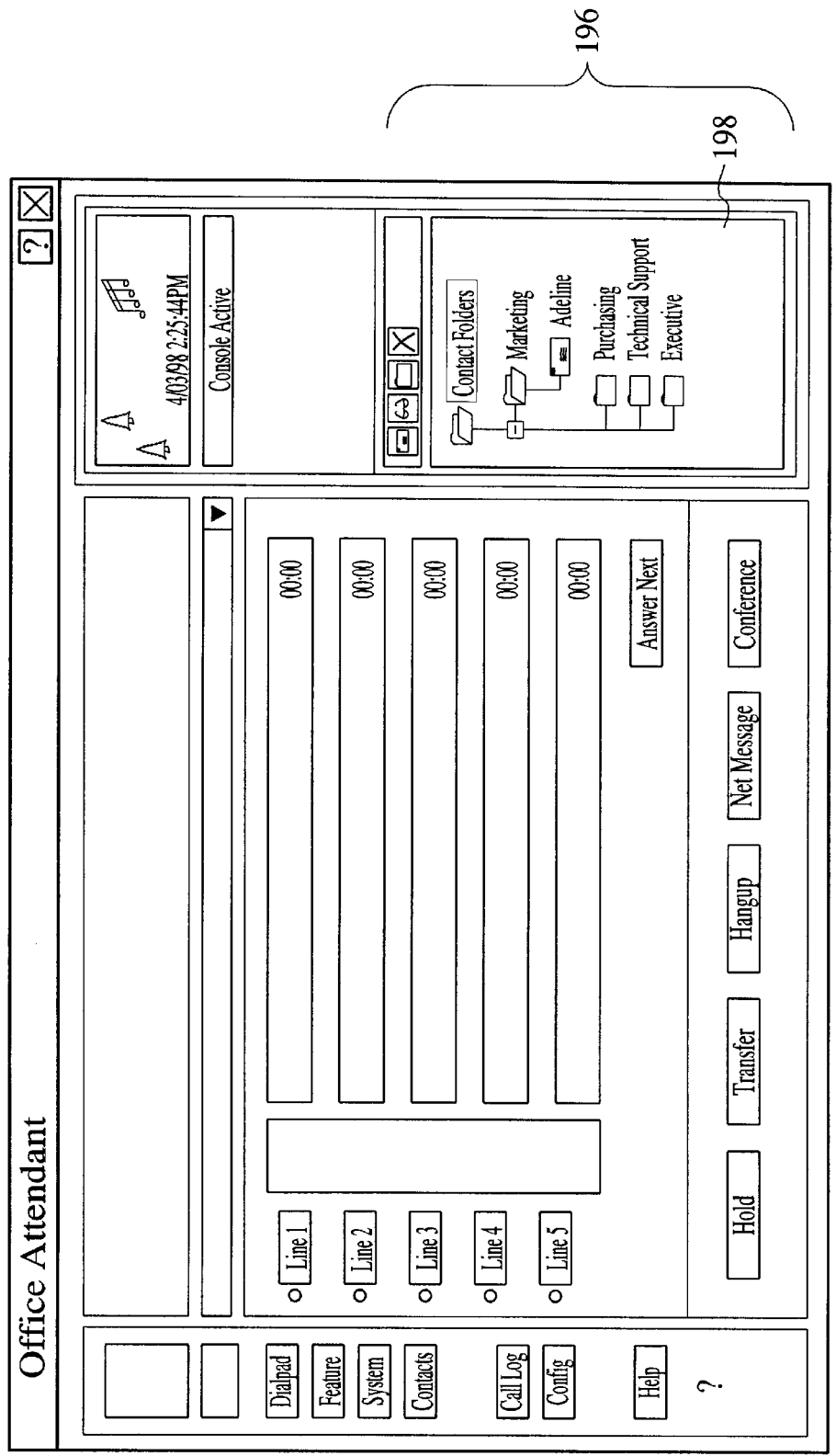

Referring now to FIG. 8D, window 194 is illustrated with contacts box 196 shown, which may be displayed through the use of contacts icon 140. Contact box 196 preferably includes a directory of contacts for the company of the user (illustrated generally as folder and contact tree 198), and also preferably contact or PIM-type information that may be obtained by importing from a PIM-type program or database resident in communications system 50 or on one or more of the computers coupled to communications system 50. Through the use of contacts icon 140 and contact box 196, contact information may be quickly provided to the office attendant type program user with a single or very few clicks of the computer mouse or pointer.

In preferred embodiments, calls may be directed to the computer running the office attendant type program because a main number has been directed to this computer (and its associated telephone or headset), or because calls have been forwarded to the office attendant type program, or because a called party is on the phone, has indicted the called extension is "do not disturb," etc. In such situations, the office attendant type program user may need to transfer calls to other extensions, either inside the office or outside the office.

Preferably, persons in the office have a computer running a program in companion with the office attendant-type program. In such preferred embodiments, the office attendant type program may cause one or more windows to appear on the computers of particular persons in the office, such as a person to whom a call is being directed. As an illustrative example, a call may come in through WAN services network 58 (see, e.g., FIG. 3) and be directed to a main telephone number, which may be designated to be forwarded to a telephone associated with a person running the office attendant type program on a particular computer 24, and may be so directed by way of TDM bus 78 and switch/multiplexer 74, under control of processor/system resources 70. The computer 24 running the office attendant type program may be used to transfer the incoming call to a particular extension, which may be readily accomplished by way of transfer icon 178 (see FIG. 8A).

Figure 9A:
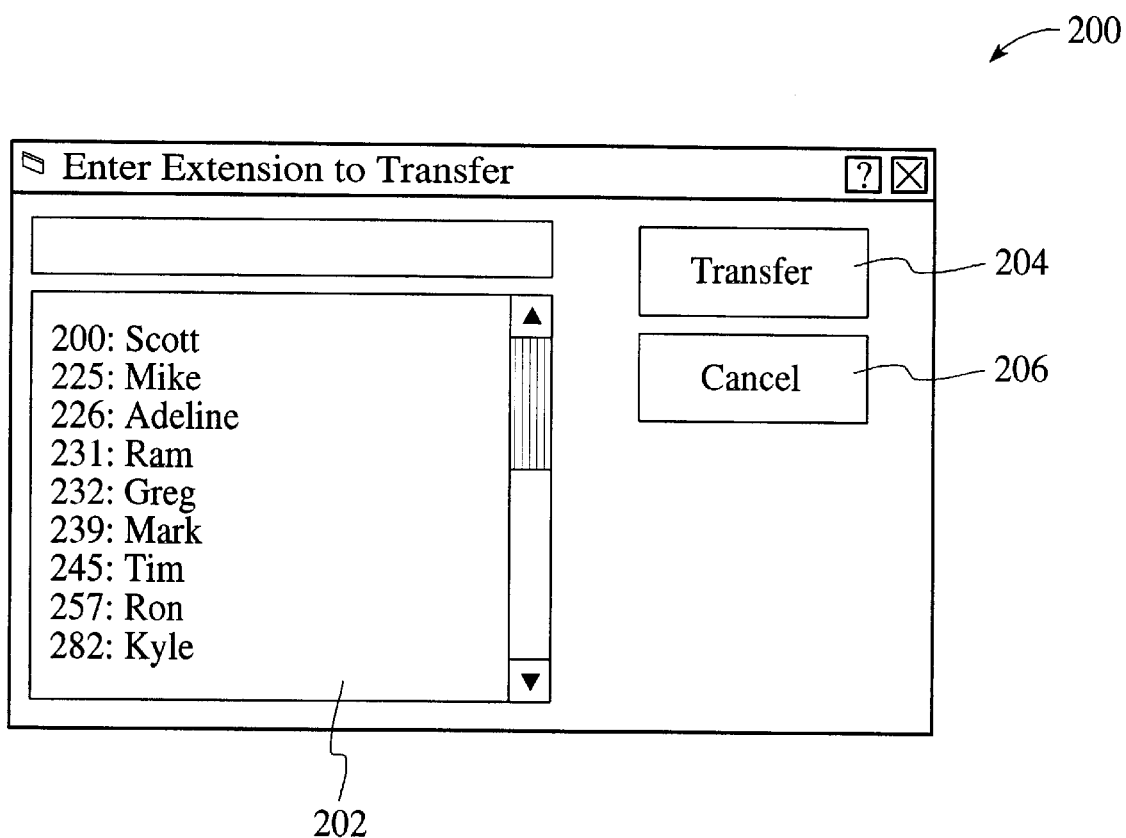
FIGS. 9A to 9C illustrate windows for illustrating additional features/functions in accordance with preferred embodiments of the present invention.

FIG. 9A illustrates window 200, which may provide a list of subscribers and extensions 202. By selecting a particular subscriber with a mouse or pointer, the transfer may be readily completed with a simple click of the mouse or pointer on transfer icon 204. Alternatively, the transfer operation may be cancelled by a click of the mouse or pointer on cancel icon 206. It should be noted that, because the current subscriber information has been downloaded by communications systems 50 (as described elsewhere herein), more reliable transfer of calls may be achieved in accordance with the present invention.

Figure 9B:
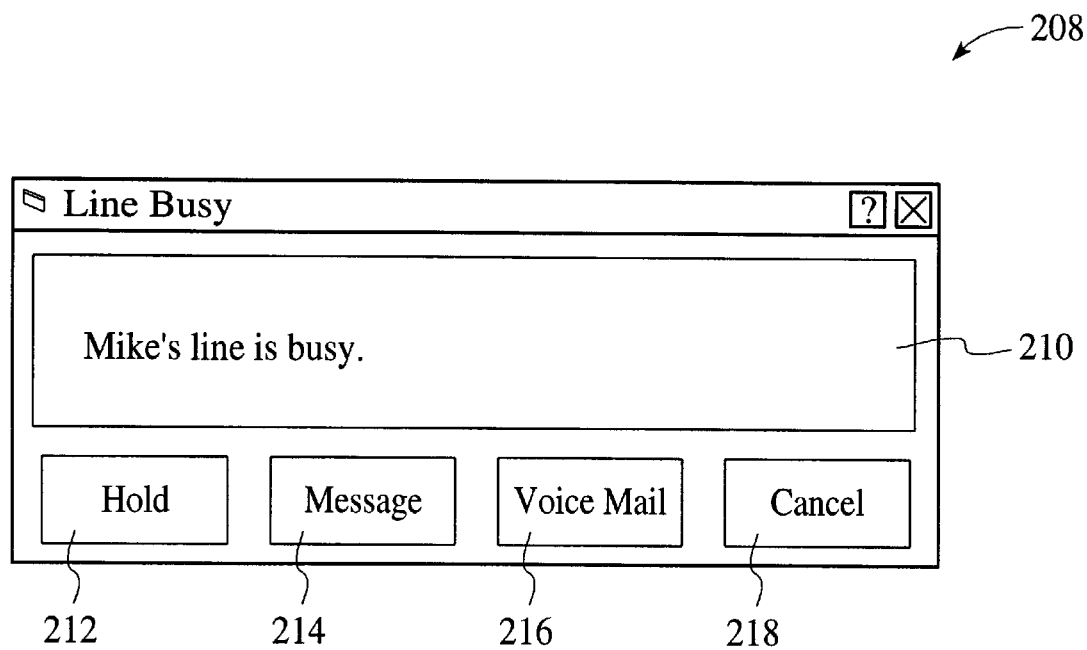

In accordance with preferred embodiments of the present invention, in the event of a failed transfer, for example in case the extension to which the call is being transferred is busy, a window preferably is automatically displayed on the computer running the office attendant type program. An exemplary window 208 is illustrated in FIG. 9B. As illustrated, display 210 may display a descriptive message, such as "line busy," "do not disturb," etc. Preferably, a number of icons also are simultaneously displayed to aid the office attendant type program user in processing this call. Hold icon 212 may be used to place the caller on hold. Message icon 214 may be used to initiate a net message to the party to whom the call is to be transferred. Voice mail icon 216 may be used to direct the call into the voice mail of the party to whom the call was to be transferred. Cancel icon 218 may be used to cancel the transfer operation. With such an automatically generated window 208, the office attendant type program user is presented with options to more quickly process such calls, again preferably with a single or very few clicks of the mouse or pointer.

In certain embodiments, activation of hold icon 212 automatically "parks" the call on the extension of the party to whom the call is to be transferred. In certain embodiments, particular subscribers may have the option to program their extension so that calls parked on their extension may or may not be automatically connected once the called party has completed its current call. In such embodiments, it may be desirable to have the called party informed that a call is being held. Preferably in such embodiments, the office attendant type program may be configured to automatically send a message (over a packet bus, as described earlier) to the computer of the party to whom the call is to be transferred, such as is illustrated by window 220 in FIG. 9C. In such embodiments, window 220 may contain message box 222, which may contain a message such as "call holding" or "call holding from Mike at extension 226," or "call holding; outside caller, number xxx," etc. What is important is that message box 222 display a message that a call is holding, with appropriate information identifying the caller displayed to the extent possible or desired. It should be noted that in certain embodiments caller ID information is displayed, and in some such embodiments a directory or library of names or other identifying information may be contained in communications system 50 and or one or more of the computers connected to the LAN so that names or other identifying information may be associated with the to caller ID information and displayed in message box 222. Preferably, the computer of the called party plays an audible tone or sound.

In such embodiments, the called party may decide to terminate his/her existing call and accept the call from the party being transferred, such as by clicking on accept icon 224. Alternatively, the called party may decide to have the call from the party being transferred wait, such as by clicking on wait icon 226. The particular user being called preferably has the option to configure his extension to accept parked calls or to not accept parked calls. The particular user also preferably has the option to select an allowed parking time before the call is returned to the user running the office attendant type program. Thus, a transferred call may be temporarily parked, with an appropriate message displayed on the computer of the called party, with the parked call either accepted by the called party clicking on accept icon 224, returned to the user running the office attendant type program or forwarded to voice mail after a parking time out time has elapsed, or the call held longer than the allowed parking time by the called party clicking on wait icon 226. In certain embodiments, clicking on wait icon 226 enables the call to be parked indefinitely, while in other embodiments a second, longer and preferably user configurable parking time is enabled (thus preventing a called from being held for an indefinite period of time). If a time out time is exceeded, preferably the call is returned to the user running the office attendant type program or forwarded to voice mail, and still preferably an audible tone or sound is periodically emanated from the computer of the called party while the call is parked, thereby providing a subtle reminder of the existence of the parked call. In certain embodiments, users have the ability to mute or lower the volume of the reminder sound, such as by way of an additional icon in window 220. In all preferred embodiments, users have the ability to configure and select the particular options described herein that the particular users may desire.

It should be noted that a window 208 may be displayed in response to a transferred call being returned to the user running the office attendant type program, or it or a similar window may be displayed in response to the user running the office attendant type program "looking ahead" to the status of the extension to which the call is to be transferred. What is important is that the user running the office attendant type program determine that the transfer may not be accomplished, and then optimally be provided with options for processing the call in an expedient manner, such as described elsewhere herein.

Figure 9C:
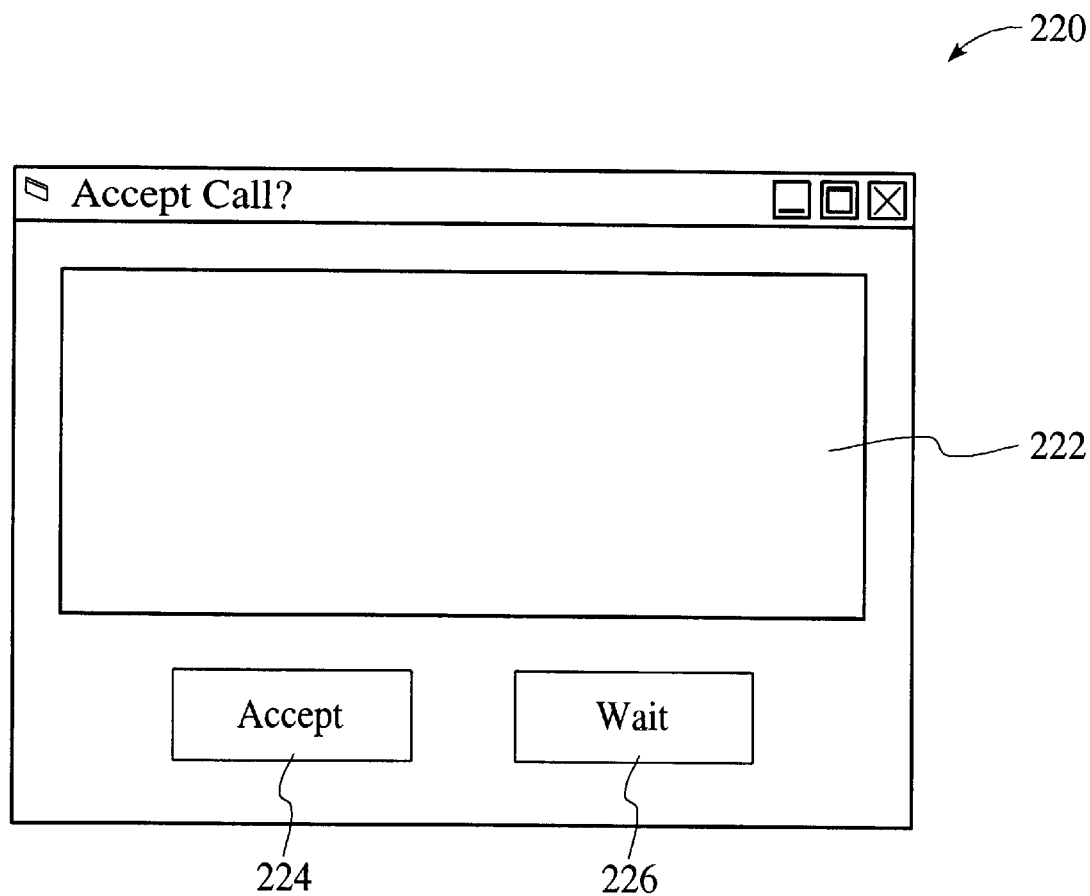

It should also be noted that, in the event of a particular user extension being dialed directly without going through the office attendant type program, a window such as window 220 of FIG. 9C may be displayed on the computer of the called party, either automatically for all calls, or only in the event that the called party has put his telephone on do not disturb, but has configured his extension to receive a message notification of calls, or in the event that the called party is on the line. In such embodiments, communications system 50 may generate such a window by a suitable message sent over by packet bus to the user's computer. In such embodiments, communications system 50 may simultaneously ring a user's extension and notify the user of the call with a net message, with the call being accepted, parked or forwarded to voice mail such as described earlier. Of course, in the event that a user previously configured his extension to be automatically forwarded to another extension or location or to voice mail or the like, then communications system 50 preferably takes the programmed action directly.

As an illustrative example, a user may configure his extension so as to route all calls to another extension or to a local or long distance telephone number. Such a user also may configure his extension so as to route all calls as voice over IP ("VoIP") calls. In the later situation, processor/system resources 70 and/or DSP 76 may process the incoming voice information (received through the appropriate station card 82 and via TDM bus 78, etc.) into appropriate IP packets, which may then be routed, for example, through an HDLC framer/deframer 73B, through switch/multiplexer 74, over TDM bus 78 and out over a designated IP connection via WAN services 58, etc.

Figure 10A:
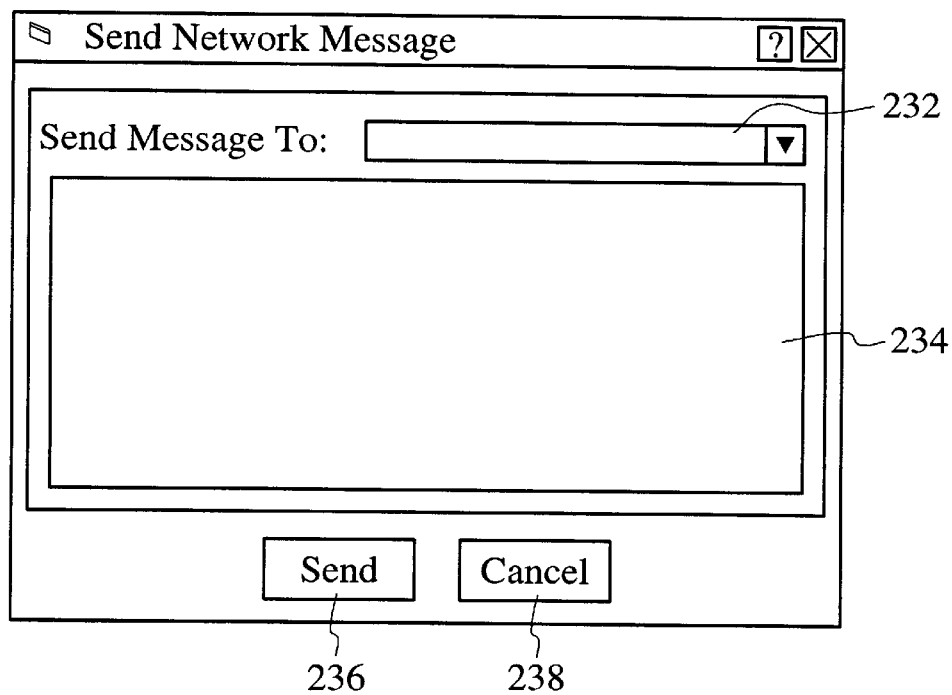
FIGS. 10A to 10B illustrate preferred embodiments of net message windows in accordance with preferred embodiments of the present invention.

As previously described in connection with FIGS. 8A and 9B, a user running the office attendant type program preferably is presented with icon 174 (FIG. 8A) and icon 214 (FIG. 9B) for generating net messages, such as to send a net message to a user to whom a call is to be transferred, or to otherwise send a net message to a particular user, etc. FIG. 10A illustrates window 230 as an exemplary net message window that may be generated in response to clicking icon 174 or 214. As illustrated, window 230 preferably includes box 232 to identify the recipient of the intended net message, which may be automatically selected by the office attendant type program in the event of a failed call transfer situation. Otherwise, the recipient may be selected by pull-down menu as illustrated, or by direct entry of a name or extension number, etc. In preferred embodiments, as letters of the name is typed, the office attendant type program automatically scrolls through the subscriber directory in order to more quickly arrive at the desired net message recipient.

Box 234 is provided in order for the office attendant type program user to type a desire net message. The net message may be sent by clicking on send icon 236 or cancelled by clicking on cancel icon 238. It should be noted that the net message recipient may be a user physically located in the same office and receive the net message by way of packet bus 80A or 80B (see FIG. 3), or, alternatively, the net message may be sent as internet or other message by way of TCP/IP through modem 75 or through the WAN services network 58 (e.g., a T1 connection) by passing through an HDLC framer 73B, such as was described with reference to FIG. 3. Thus, in the situation in which a particular user is "off-premises," calls may be forwarded off-premises (by appropriate programming of the particular user's extension, as described elsewhere herein), and net messages likewise may be forwarded off-premises.

Figure 10B:
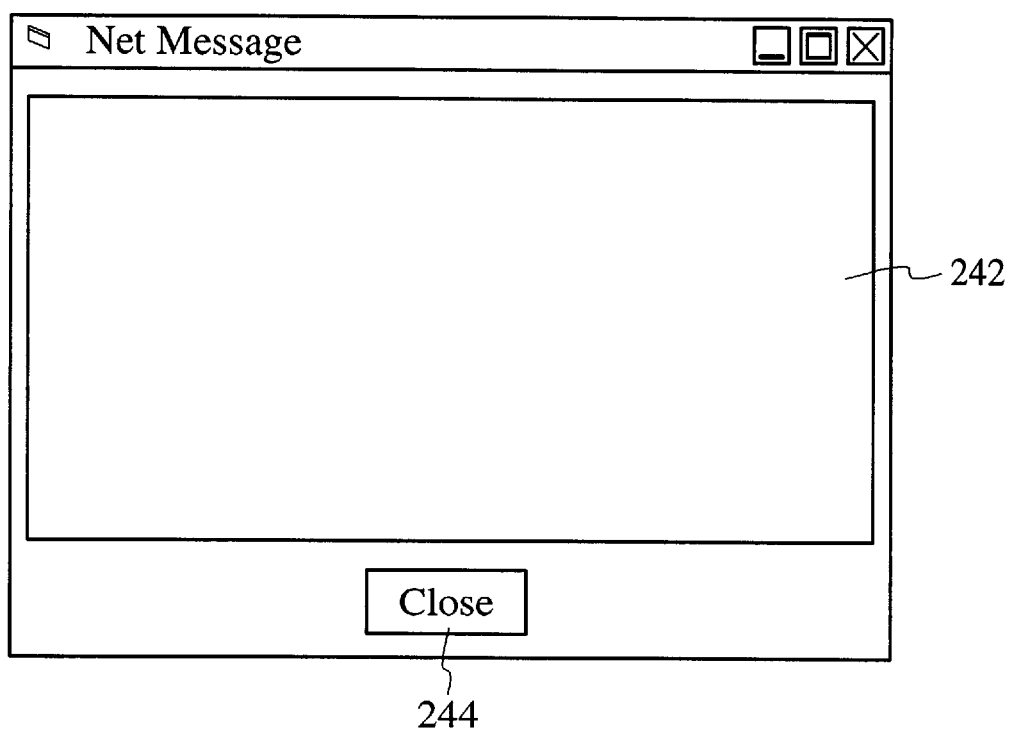

FIG. 10B illustrates net message window 240 that may appear on the computer of the recipient. The recipient is presented with the net message in window 242, and may close the net message by clicking icon 244. Alternatively, net messages may be stored for archival purposes or later viewing, and in alternative embodiments net messages also include a reply icon which may be clicked in order to bring up a window in which a reply message may be typed. In such embodiments, an office attendant type program user may inform the recipient, for example, of a particular caller, and the recipient may inform the office attendant type program user, for example, that the caller should be directed to a particular individual or department or processed in a particular way (directly to voice mail, call terminated, etc.). With such embodiments, packet bus or other messages may be readily exchanged in a manner to more readily facilitate telephony management, etc.

As illustrated in FIG. 8A, conference icon 172 may be utilized to initiate a conference call in accordance with certain preferred embodiments of the present invention. Certain conferencing preferred embodiments of the present invention will be described with reference to FIGS. 11A through 11E.

As indicated, conference icon 172 may be utilized to initiate a conference call in accordance with the present invention. Alternatively, in other preferred embodiments the conference call may be initiated by a click and drag operation. For example, an icon indicating a received call or the status of a received call (such as described earlier) may be clicked and dragged over the opened dialpad (see, e.g., FIG. 8A). The office attendant type program recognizes this click and drag operation as a request to open a suitable conference window, and the office attendant type program thereafter automatically opens the conference window.

Figure 11A:
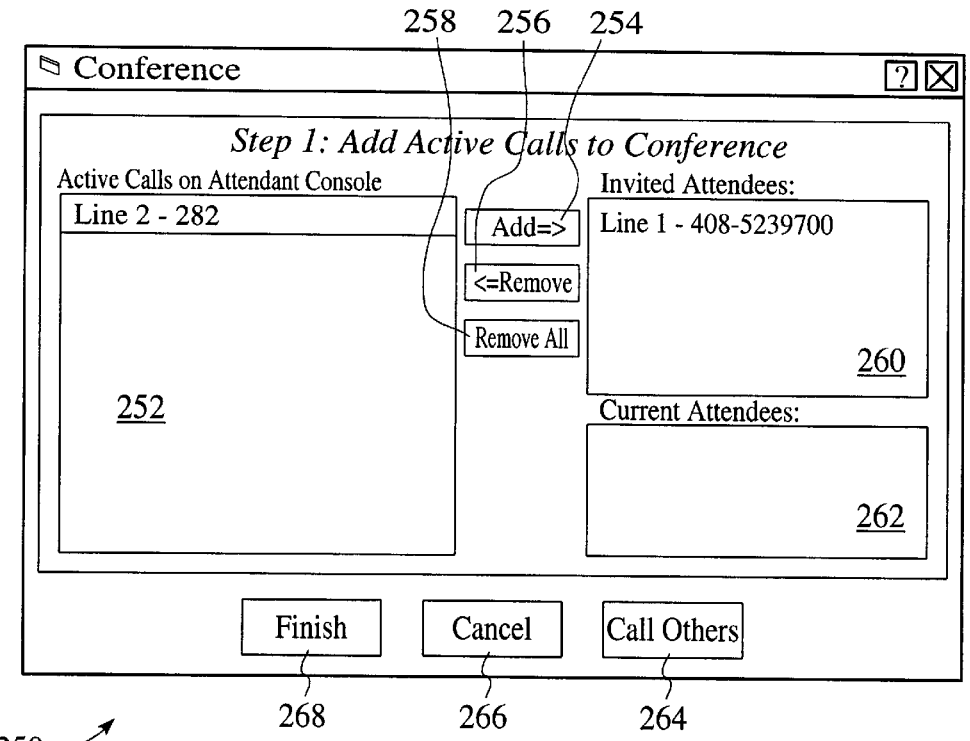
FIGS. 11A to 11E illustrate various embodiments of conference windows in accordance with preferred embodiments of the present invention.

FIG. 11A illustrates one embodiment of such a conference window 250. As illustrated, conference window may include box 252, which may serve to indicate what calls, if any, are presently displayed on the office attendant type program "console" (e.g., windows 150 of FIG. 8A). In the event that calls are present on the console, such calls may be added to the conference through the use of add icon 254. Attendees invited to join the conference may be displayed in window 260. Through the use of icon 256 one or more particular attendees may be selected with the pointer or mouse and removed from the conference call attendee list, and through the use of icon 258 all attendees may be removed from the conference call attendee list. Window 262 may serve to display attendees currently participating in the conference call in the event that window 250 is opened while a conference call is in progress. Icon 264 may be used to call other parties in order to invite such parties to participate in the conference call, and icon 266 may be used to cancel the add conference call attendees operation (i.e., close window 250). Icon 268 may be used to finish the add conference call attendee operation and preferably initiate or continue the conference call; in FIG. 11A icon 268 would be illustrated as not active given that multiple invited attendees are not present and no conference call is on-going (and thus the conference cannot be initiated or continued).

Figure 11B:
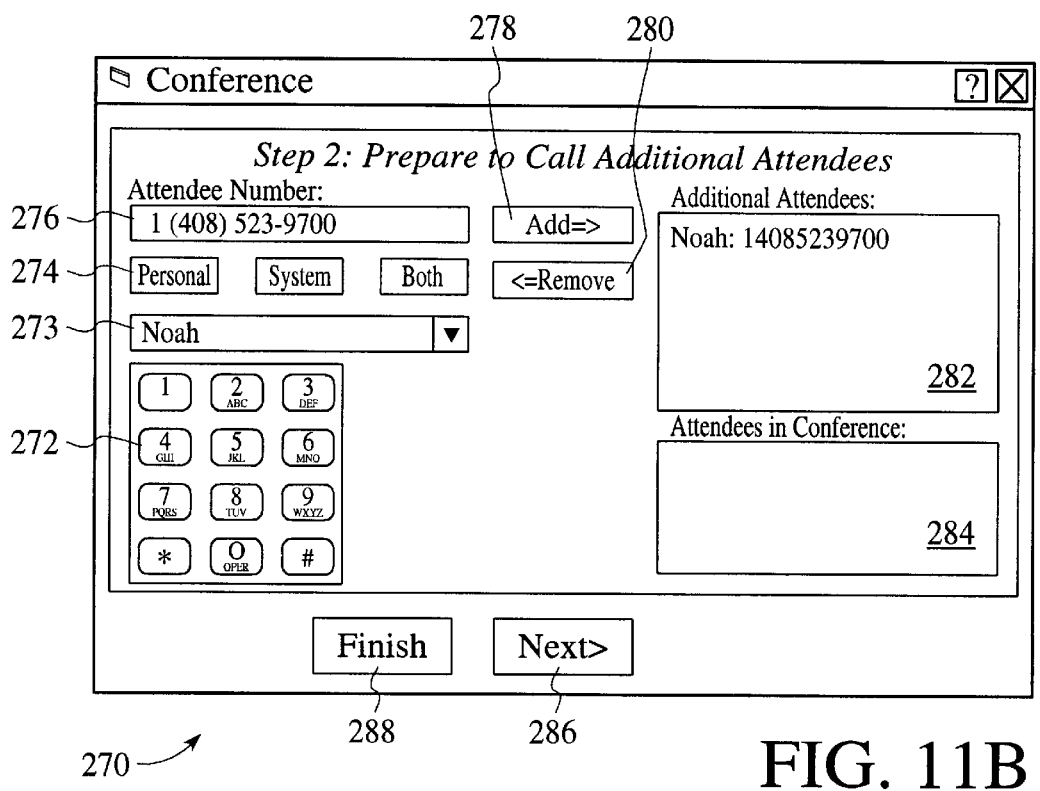

In the event that icon 264 is selected, a call others operation may be initiated. FIG. 11B illustrates one embodiment of window 270 for calling additional attendees. As illustrated, window 270 preferably includes dialpad 272, which may be utilized to dial the extension or telephone number of a party to be added to the conference, which may be a party either on premises or off premises. Window 274 may be used to access either personal or system contact information, or both personal and system contact information, such as previously described. The names of particular subscribers may be entered or displayed in window 273, and the extension or number of a particular party to be added to the conference may be entered or displayed in window 276. Additional attendees may be added with icon 278 or removed with icon 280, with the additional attendees identified in window 282, with attendees in the conference identified in window 284. The next icon 286 preferably may be used to proceed to a dialog box from which the additional attendees may be called to join the conference. Selecting the finish icon 288 preferably results in the conference commencing or continuing without proceeding to a call dialog box.

Figure 11C:
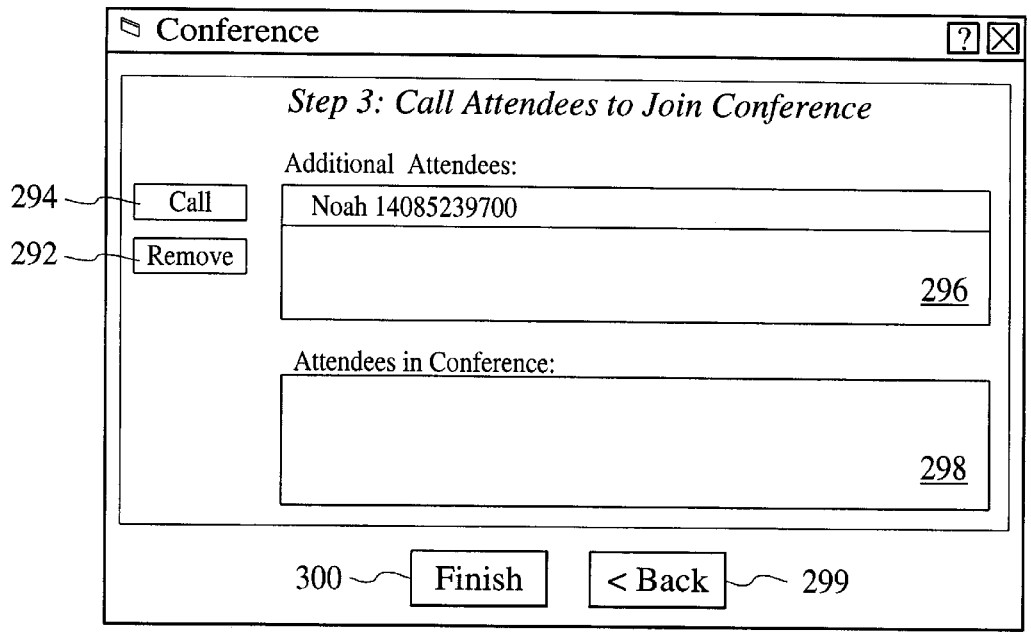

In the event that next icon 286 is selected, a call attendee dialog box preferably appears, with an exemplary dialog box illustrated in FIG. 11C. As illustrated, window 290 includes call icon 294, which may be used to initiate a call to a particular selected additional attendee (who may be selected with the mouse or pointer in a conventional manner). Remove icon 292 may be used to remove additional attendees from window 296. Preferably, each additional attendee is called and informed that they are being added to the conference call; if the additional attendee agrees to be added to the conference call, the call preferably is placed on hold; otherwise the caller may hang up or be processed in some other desired manner. Once all additional attendees have been contacted and placed on hold as desired, finish icon 300 may be selected to initiate or continue the conference with the additional attendees. Back icon 299 may be use to return to the window illustrated in FIG. 11B in order to add additional attendees, etc.

Figure 11D:
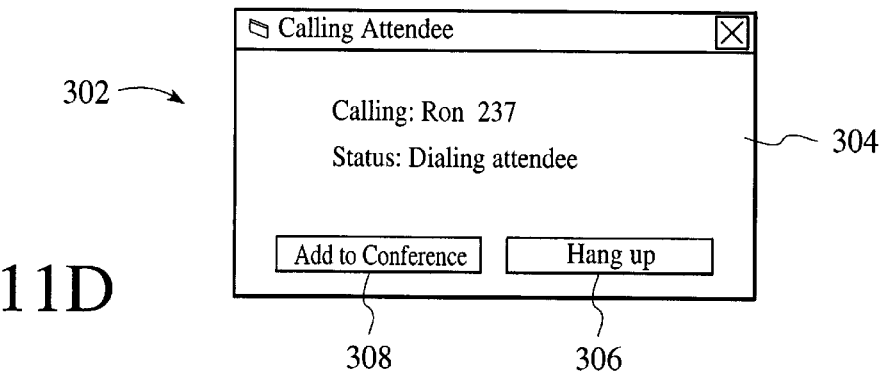

Preferably, as additional attendees are called, window 302 appears as illustrated in FIG. 11D. As illustrated, window 302 includes information display 304, which preferably displays the name and/or number of the additional attendee being called, as well as the status of the call. Icon 306 may be used to hang up or terminate the call, while icon 308 may be used to add the additional attendee to the conference call.

Figure 11E:
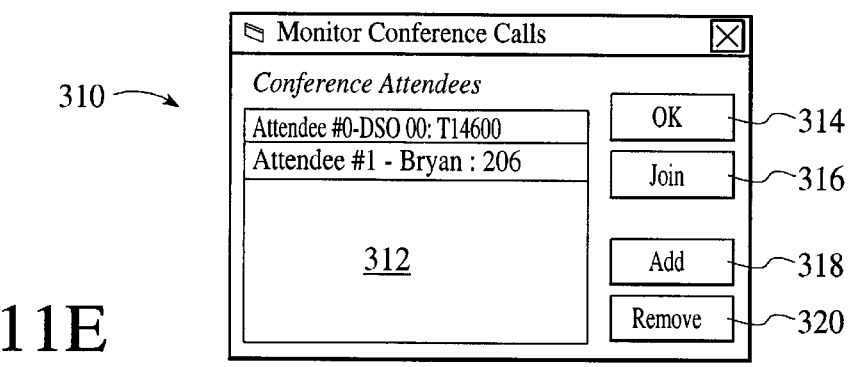

Still preferably, conference call monitor window 310 may be displayed by the office attendant type program, as illustrated in FIG. 11E. As illustrated, window 310 may include window 312 for displaying an identification of all attendees participating in the conference call. From window 310 additional parties may be added to, or removed from, the existing conference call. Icon 314 may be used to confirm that the existing list of conference participants is acceptable. Icon 316 may be used to allow the party running office attendant to join as a party to the conference call. Icon 318 may be used to add additional parties to the conference call, such as a call that is existing on the console as illustrated in FIG. 8A (as an example, a call is received by the office attendant program while the conference is in progress), or by adding an additional attendee. Such operations to add additional attendees preferably may be achieved as described earlier in connection with FIGS. 11A through 11D. Icon 320 may be used to remove attendees from the conference call.

What should be noted is that, in accordance with the present invention, easy to use and intuitive graphical interfaces are provided to initiate, maintain and monitor conference calls in accordance with preferred embodiments of the present invention. Such embodiments preferably are implemented utilizing communications system 50 as illustrated, for example, in FIG. 3, which provides a exceptionally desirable platform for managing voice and data communications while allowing a user to more optimally manage and/or participate in such conference calls.

Figure 12:
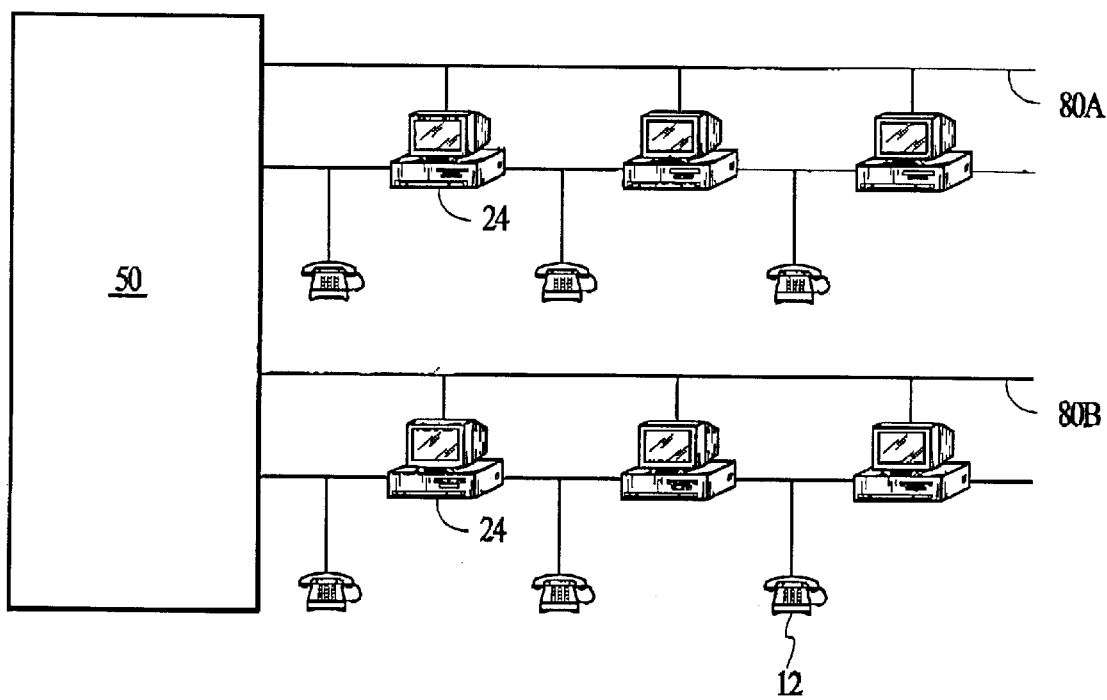
FIG. 12 illustrates another preferred embodiment of the present invention.

Still other features in accordance with preferred embodiments of the present invention will be described with reference to FIG. 12. As illustrated in FIG. 12, communications system 50 (which preferably may be implemented as described in connection with FIG. 3) is coupled to one, two or more packet buses (such as packet buses 80A and 80B), connected to which may be a plurality of computers 24. One or more computers 24 may run an office attendant-type program, or alternatively a companion program to the office attendant-type program, such as described elsewhere herein. As previously described, such computers running an office attendant-type program may be advantageously utilized to manage and control incoming and outgoing calls in the office. In accordance with the present invention, for example, a first computer 24 at a first physical location in the office (e.g., coupled to communications system 50 over a packet bus, for example) may be designated as the telephony control station for managing the incoming and outgoing calls. A second computer 24 at a second physical location in the office (e.g., coupled to communications system 50 over the same or a different packet bus, for example), may be designated as a secondary telephony control station. If the first telephony control station exceeds a designate call capacity (such as described earlier), or the first telephony control station goes off-line such as to due to a local failure or due to the user of the first telephony control station logging off, etc. (such as going to lunch, going home for the day, etc.), the second telephony control station is ready to immediately assume control of managing the incoming and outgoing calls of the office. In accordance with such embodiments, control of the telephony functions of the office may effectively be passed from computer to computer along the same packet bus or from a first computer connected to a first packet bus to a second computer connected to a second packet bus. Thus, telephony control may be efficiently transferred from computer to computer in a flexible and desirable manner, which may include computers at different locations within the office.

It also should be noted that an office attendant-type program also may be run from a location remote from communications system 50, such as on a computer coupled to WAN services network 58 of FIG. 3. In such embodiments, a remote computer coupled to communications system 50 over a WAN network connection may run the office attendant-type program and remotely control the telephony functions of the office, in a manner such as described previously herein. Thus, control of telephony functions may be effectively performed in the office or remotely from the office, with control passed from computer to computer in an efficient and desired manner.

Video Conferencing Type Applications

In accordance with preferred embodiments of the present invention, advanced video conferencing capability may be readily provided in a variety of office environments. Certain such preferred embodiments will be described with reference to FIGS. 13A through 13C. Such embodiments may also be more readily understood by also referencing previously described figures, such as FIG. 3, etc.

Figure 13A:
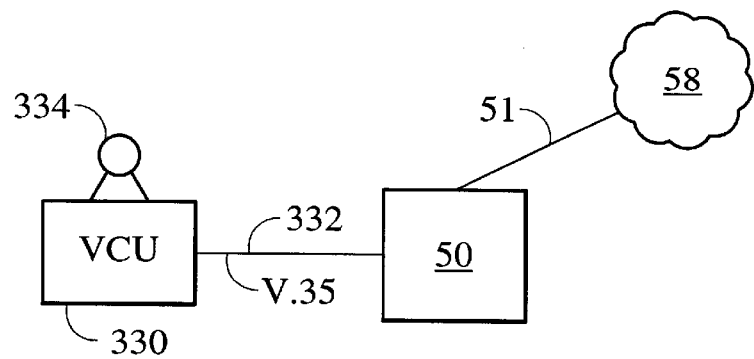
FIGS. 13A to 13C illustrates preferred embodiments of video conferencing in accordance with the present invention.

With reference to FIG. 13A, video conferencing in accordance with a first embodiment will be described. As illustrated in FIG. 13A, communications system 50 is coupled to video conferencing unit or VCU 330. VCU 330 may be a video conferencing system or a higher end computer or the like that preferably includes camera 334 and is coupled to communications system 50 over bus 332, which preferably is a high speed serial or other interface trunk, such as, for example, what is known as a V.35, V.36 or V.37 interface trunk. In such embodiments, cards 82 of communications system 50 include an appropriate interface card for the particular interface trunk and preferably enable a direct and compatible interface with VCU 330. In such embodiments, video information from camera 334, and audio information as appropriate from VCU 330, are coupled to communications system 50 over bus 332. Still preferably, the data stream from VCU 330 is a in a form compatible with transmission over, for example, a T-1 line. In such preferred embodiments, the data stream from VCU 330 is coupled to TDM bus 78 via station cards 82, and then coupled to switch/multiplexer 74, and then redirected via switch/multiplexer 74 to, for example, T-1 line 51 that is coupled to WAN services network 58 (of course, one or more additional compatible VCUs preferably are coupled to WAN services network 58 in order to complete the video conference). In such embodiments, video conferencing may be achieved efficiently with a data stream coupled from VCU 330 to communications system 50 to, for example, a T-1 line via TDM bus 78 and switch/multiplexer 74.

Figure 13B:
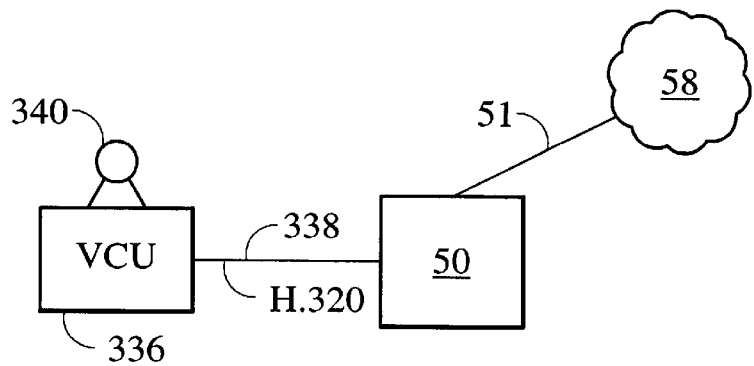

FIG. 13B illustrates VCU 336 with camera 340 (which may be as previously described) coupled to communications system 50 over bus 338, which in this embodiment is an ISDN or T-1 type interface that supports, for example, a H.320 video conferencing standard. In such embodiments, a data stream (e.g., video and audio) from VCU 336 is coupled to communications system 50, coupled via an appropriate ISDN/T-1 compliant station card 82 to TDM bus 78 and to switch/multiplexer 74. Thereafter, from switch/multiplexer 74 the data stream may be coupled via an appropriate station card 82 to outgoing T-1 line 51 to WAN services network 58.

Figure 13C:
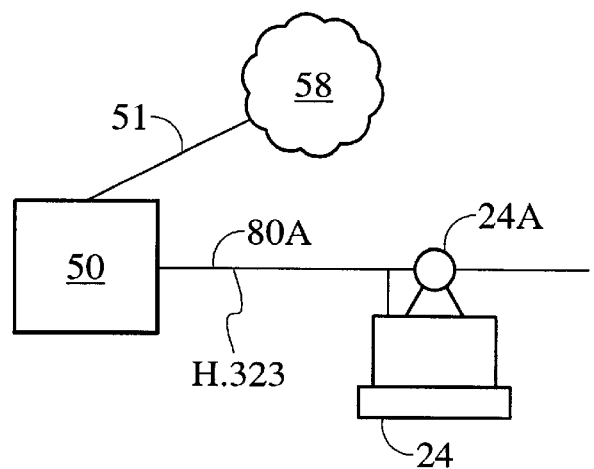

Yet another embodiment of video conferencing in accordance with the present invention is described with reference to FIG. 13C. As illustrated, computer 24 is coupled to communications system 50 over packet bus 80A (see, e.g., FIG. 3). Computer 24 includes camera 24A and preferably a microphone and speaker. Video and audio information preferably is coupled between communications system 50 and computer 24 through an appropriate packet standard, for example what is known as H.323. Referring again to FIG. 3, in such embodiments packetized video information is provided from computer 24 to communications system 50 over packet bus 80A. Processor/system resources 70 processes the packetized data stream (e.g., de-packetizes the data stream), which preferably now is in a suitable form/protocol (such as TCP/IP) for transmission to a remote computer running a compatible video conferencing program. As illustrative examples, the video data stream may be directed by processor/system resources 70 to fax modem 75 and coupled to a remote computer, or the video data stream may be directed by processor/system resources 70 to an HDLC framer/deframer 73B, to switch/multiplexer 74, to TDM bus 78, to an appropriate station card 82 and to WAN services network 58 via trunk 51 to which is coupled one or more remote computers for completing the video conference. It also should be understood that one or more such computers desiring to establish a video conference also may use an internet connection established with the aid of what is known as an ILS (or internet locator service) dynamic directory, a real time directory server component, which serves to aid "user to IP mapping" for establishing desired point-to-point connections for video conferencing.

It also should be noted that such video streams from computer 24 may be directed to one or more other computers on the same packet bus 80A (using the hub feature of communications system 50), or to one or more other computers on a different packet bus (using the router feature of communications system 50), such as previously described.

It should be noted that the documentation for particular video, telephony and other standards, such as T-1, ISDN, V.35, H.320, H.323, etc. are publicly available, and such standards documentation is hereby incorporated by reference.

As also described elsewhere herein, in preferred embodiments VoIP communications may be readily enabled. Referring again to FIG. 3, voice from a telephone 12 may be coupled via station cards 82 and TDM bus 78 to switch/multiplexer 74. From switch/multiplexer 74, the voice data stream may be directed to DSP 76, which directly or in conjunction with processor/system resources 70, produce appropriate IP packet data (in effect, DSP 76 and/or processor/system resources 70 serve as, for example, a TCP/IP processor). After IP packeting, the voice data may be directed to WAN services network 58 via an HDLC framer/deframer 73B (such as described elsewhere herein), or may be directed to one or more packet buses/LANs, also as previously described. It should be noted that, with DSP 76, which may be configured to provide substantial processing resources, voice data may be IP processed effectively with minimal or no consumption of the resources of computer/ system resources 70, thereby helping to prevent an undesirable loading of computer/systems resources 70.

It also should be noted that, with communications system 50 implemented such as illustrated in FIG. 3, data, voice and video streams may be converged over a common T-1 trunk. Thus, a user may more readily be able to efficiently use a T-1 type of WAN resource with an integrated system that intelligently manages and bridges voice, data and video data streams and processes.

While the various windows, buttons and icons illustrated herein are not limitative of any particular aspect of the present invention, such features and combinations of features have been determined to provide advantages to users of such an office attendant-type program, particularly when used with embodiments of the present invention as illustrated in FIG. 3 and the other drawings and related description.

In accordance with the foregoing description and embodiments, a variety of communications systems and data, voice and video processes may be desirably implemented. An exemplary communications system and the features of such an exemplary communications system will now be described.

Communications system 50 delivers comprehensive communications support including PBX voice capability, full LAN/WAN data connectivity, and a suite of communications applications in a unified platform designed for scalability, reliability, and ease of use. Communications system 50 integrates standards based communications hardware and software with switching technology in a single system to meet the needs of different size offices. Unlike other complex central site products that are difficult and expensive to manage, communications system 50 of the present invention is optimized for use by an office of 5 to 100 users.

Communications system 50 increases the efficiency of office communications and provides businesses a competitive edge by integrating the following voice, data, and communications functions into one remotely manageable platform: PBX; Voice mail; Automated attendant; Computer-telephony applications server; Channel bank; Router; CSU/DSU; LAN hub; Remote access server; and Modems.

Communications system 50 architecture allows the user to combine one or more of the above referenced components into a single, easy-to-use, easy-to-manage system. Because communications system 50 seamlessly interfaces with legacy voice and data equipment, the user can purchase only those capabilities that is needed to create a comprehensive communications solution suited to the user's business. As described earlier, an office attendant type program can be utilized to assist communication system 50 to perform all of the above mentioned tasks.

Communications system 50 supports today's mission-critical communications applications, while providing a natural migration path for new applications enabled by the convergence of voice and data. At the core of the platform are system resources designed for voice and data integration, including time division multiplexing 78 (TDM and switching, high-speed packet switching 74, a multiprotocol framing engine 72, LAN/WAN interfaces 82, and digital signal processors 76 (DSPs). These resources are complemented by software services as illustrated in FIGS. 7A to 11E, such as advanced call control, messaging services, a database management system, and routing services.

Based on an embedded Windows NT operating system, communications system 50 applications use standard application programming interfaces (APIs) such as NDIS, TAPI, COM, and WinSock. With these APIs and communications system 50 TAPI Service Provider (TSP), applications developed by independent software vendors, including advanced CTI applications, can be easily deployed on the system.

Communications system 50 system also eliminates the complexity inherent in today's multivendor piece-part alternatives. Instead of requiring installation and ongoing management of multiple boxes from multiple vendors that were not designed to work together, this integrated system delivers sophisticated voice and data solutions that are easy to install, administer, and use.

Communications system 50 is a purpose-built, dedicated platform architected to ensure high availability. Some features include the "always-on" software architecture with subsystem isolation, SNMP-based management, fault monitoring, life-line communications, and remote diagnostics and fix capabilities. Also, fault-tolerance options include redundant power supplies and redundant hard disk drives.

With communications system 50, the user can dramatically reduce the cost of acquiring, operating, and managing business communications. Communications system 50 delivers the cost reductions of integrated WAN services and eliminates the need for the additional resources and personnel required by today's multivendor communications alternatives. The unified management console and tools provide a cost-effective method to remotely manage the entire customer premise.

Communication system 50 includes many features and benefits such as being a fully integrated, adaptable, reliable, and high performance system, while being a system that is easy to install, manage and use. By utilizing a fully integrated system, communication system 50 includes, among other features, an integrated suite of applications, digital trunks 54, and a unified management console. An integrated suite of applications in communication system 50 provides an ideal platform for deploying future business-transforming Internet/voice applications while at the same time increasing productivity and customer satisfaction by cost-effectively deploying integrated voice and data applications.

Referring back to FIG. 2, digital trunks 54 lowers telecommunications costs by integrating voice and data traffic on the same access trunk. Digital trunks 54 also allows a user to cost-effectively deploy high-bandwidth trunks to the smallest of offices. Finally, communication system 50 significantly reduces cost of deployment and ongoing management associated with legacy technologies, and reduces training time by using a single graphical user interface.

A further benefit of communication system 50 of the present invention is its adaptability to communications needs of the user. Communications system 50 includes a modular architecture that allows an office to pay only for the communications interfaces and options the office presently requires and also provides the flexibility to add hardware interfaces or remotely load software applications as the office needs change.

Communication system 50 in the preferred embodiment is a standards based system. This ensures interoperability with existing communications infrastructure for seamless deployment and provides access to the latest third-party applications and technology. Communications system 50 is also adaptable to new technologies; thus, this protects an office's investment with an architecture designed to accommodate future technologies.

Another feature of communication system 50 of the present invention is its reliability. Some of communication system 50 features that allow it to be reliable are the following: complete integration and extensive testing for hardware and software; embedded Windows NT operating system; redundant, load-sharing power supplies; independent fault monitoring; life-line phone support, and RAID-1 disk mirroring. The benefits of these features are the following: virtually eliminates expensive downtime that results from incompatible hardware and applications; provides a single point of contact for fault isolation; ensures maximum application availability by isolating application subsystems; increases security by preventing unauthorized access; prevents interruption of service due to power supply failure; ensures maximum system availability by providing an independent watchdog service; keeps the user informed of system status through notification of system problems, no matter where the user is; ensures phone service, even during a power failure; and prevents downtime due to hard disk drive failure.

The multiple-bus architecture, application prioritization and isolation, and automatic route selection adds to the performance of communication system 50. These features ensures high-grade voice quality by keeping voice and data in their native environments, allows conversion between the voice and data environments to support services such as voice over IP (VoIP), maximizes investment by making community resources, such as DSPs and WAN/LAN interfaces, available to both voice and data applications, keeps mission-critical communications systems functioning under heavy load by ensuring they receive required system resources, provides flexibility in routing calls, and least-cost routing saves money by dynamically selecting trunks based on criteria selected.

Communication system 50 is easy to install, manage, and use. Some of the features making communication system 50 easy to install, manage, and use are its web-based management for remote configuration, diagnostics, and health monitoring, remote software upgrades, rapid installation, customizable management levels, and full SNMP instrumentation for voice and data. These features simplifies management tasks by using a single, consistent management interface for voice and data infrastructure, reduces personnel costs by leveraging centralized technical resources to manage remote offices, minimizes downtime and on-site visits through extensive tools for remote troubleshooting and diagnostics, ensures system integrity by flexibly addressing different access requirements for system administrators, enables a user to reduce support costs by distributing simple, repetitive tasks such as moves, adds, and changes to office personnel, leverages your existing SNMP infrastructure to manage both voice and data capabilities on the communication system 50, allows the user to save money by performing software upgrades from a central location, and saves valuable time and money because the system can be installed and configured quickly.

Next, the specifications for the communications system 50 in the preferred embodiment will now be described. As it will be apparent to one skilled in the art, it is important to note that a different configuration and/or additional or reduced number of components can be used with communication system 50 without altering the scope and spirit of the present invention.

In a preferred embodiment of communication system 50 of the present invention, a resource switch card (standard with every chassis) includes the following: 12 10Base-T Ethernet hub ports; 12 analog phone ports; 6 analog trunk ports (including 2 life-line ports); communications switch engine and other system resources; 2 internal 56 Kbps fax/modems (V.90 and K56); fault monitor;connectors: RJ-45 (Ethernet), 50-pin RJ-21x (phone), 3.5 mm phono (line-in, line-out), 15-pin VGA; and Indicators: System status; link and activity for each Ethernet port.The optional expansion interfaces of communication system 50 include the following components: (1) Analog trunk modules—4- and 8-port versions available; Loop start and ground start; REN: 0.65 B; Impedance: 600 ohms; Compliance: FCC Part 15 Class A, FCC Part 68, UL 1950, DOC, CSA; Connector: 50-pin RJ-21x; and Indicators: System status; (2) T1 trunk modules—1- and 2-port versions available; Line rate: FT1 and T1 (64 Kbps–1.544 Mbps); Framing: ESF, SF/D4; Line code: AMI, B8ZS; Integrated CSU/DSU; Compliance: FCC Part 15 Class A, FCC Part 68, UL, CSA, ANSI T1.101 (MTIE), ANSI T1.403-1995, AT&T TR62411; Connector: RJ-48C, dual bantam (monitor jack); and Indicators: System status; red and yellow alarms for each T1 port; (3) 10Base-T Ethernet hub cards—12- and 24-port versions available; Layer 3 segmentation option: Traffic is routed between cards; Full SNMP instrumentation; Compliance: FCC Part 15 Class A, FCC Part 68, UL, CSA, IEEE 802.3, ISO/IEC 8802-3; Connector: RJ-45; and Indicators: System status; link and activity for each Ethernet port, (4) Analog station cards— 12- and 24-port versions available; Supports standard and enhanced analog phones with features such as enhanced caller ID display and message-waiting lamp; Operating voltage: Onhook –48V, Offhook –24V; REN: 3 B; On-board ringing power supply; Audio frequency response: 300 to 3500 Hz; Compliance: FCC Part 15 Class A, FCC Part 68, UL, CSA; Connector: 50-pin RJ-21x; and Indicators: System status; (5) Fault-resilient options—Redundant hard drive for disk mirroring (RAID-1); and Redundant power supply.

The following table describes an interface summary according to the present invention.

| | Part Number | Phone Ports | Ethernet Ports | Analog CO POTS | T1 |
|---|---|---|---|---|---|
| Resource Switch Card | Standard | 12 | 12 | 6 | |
| Analog Station Card | IO-12AS-C | 12 | | | |
| | IO-24AS-C | 24 | | | |
| Ethernet Hub Card | IO-12EH-C | | 12 | | |
| | IO-24EH-C | | 24 | | |
| Analog Trunk Module | IO-4AT-M | | | 4 | |
| | IO-8AT-M | | | 8 | |
| T1 Trunk Module | IO-1T1-M | | | | 1 |
| | IO-2T1-M | | | | 2 |
| Chassis (maximum) | | 84 | 84 | 22 | 2 |

Next, the chassis specifications will be described for the preferred embodiment of the present invention.

The following are the physical specifications of communication system 50 of the present invention: (1) Height: 23.125 in (58.74 cm); (2) Width: 17.5 in (44.45 cm); (3) Depth: 18 in (45.72 cm): and (4) Weight: 88 lbs (40 kg), maximum configuration.

Next, the mounting options will now be described:

(1) Rack-mount (standard EIA 19-inch rack) and (2) Stand-alone. The power requirements are as follows: 95–132 VAC, 47–63 Hz, 5.0A; 190–264 VAC, 47–63 Hz, 2.5A; Inrush current (one power supply): 40A maximum (115 VAC), 80A maximum (230 VAC); and Optional second hot-swappable and load-sharing power supply.

The environmental ranges are as follows: Operating temperature: 32° to 104° F. (0° to 40° C.); humidity: 85% maximum relative humidity, noncondensing; and Operating altitude: Up to 10,000 ft (3,050 m) maximum.

Communications system 50 PBX and an office attendant type program CTI application provide sophisticated call control and handling The PBX capabilities will now be described. Communications system 50 PBX provides a full-featured, nonblocking digital PBX with sophisticated call control capabilities. These capabilities are delivered using standard analog telephones connected to existing phone wiring. In addition, communications system 50 supports advanced call control capabilities over IP-based networks, for applications based on the Microsoft Telephony Application Programming Interface (TAPI) standard. TAPI allows communication system 50 to optionally provide virtual digital telephones, delivering advanced call control features over inexpensive standard analog phones.

An office attendant type program computer-telephony application will now be described. Communications system 50's office attendant type program is an easy-to-use application that places powerful telecommunications capabilities directly on the desktop. It provides comprehensive call handling functionality for operators and administrators, making them more efficient through an intuitive graphical user interface (GUI).

Communications system 50's office attendant type application expedites routine tasks such as answering and transferring calls. It also simplifies more complex tasks such as setting up and managing conference calls. Office attendant type program leverages advanced Microsoft TAPI over TCP/IP technology that allows communications system 50 to replace the traditionally expensive, immobile, and hard-to-use attendant console.

Exemplary communications system 50 PBX and office attendant type program specifications are now shown below.

PBX features for call features include the following: Call forwarding, Off-premise call forwarding, Transfer on busy and no answer, Time-of-day call forwarding, Call hold, Call toggle, Call waiting, Consultation call, Consultation transfer, Blind transfer, Conference call, Call pickup, Public address system support, and do not disturb. The features for calling and called party identification are as follows: Support for enhanced caller ID phones, and Extension-to-extension identification.

The system features and management flexibility are the following: Class of Service profiles, Uniform dialing plan, Time-of-day dialing policy, Digit insertion, Automated route selection (ARS), least-cost routing, Trunk groups, Hunt groups for intelligent call distribution, including linear, circular, and ring all, Direct inward dial (DID), Message notification: lamp and stutter dial tone, Individual user profiles, Call detail recording , Phone set relocation, Music on hold, The following are the office attendant type program features:
System
Standard Windows application
Call control over IP
Software-based console that is easy to relocate
Drag-and-drop dialing and conferencing
Virtual line appearances
Interface indicators signal call status
Caller ID display
Calls in queue display
Company telephone directory
Lookup-as-you-type dialing
Personal call log
Account number entry
Personal information manager
Conference manager
System speed-dial buttons
Programmable feature buttons
Most recently used numbers list
Login security
CTI link test button
Context-sensitive help
Contact database importing
Call Handling
Dial pad
Hang up
Transfer with look-ahead
Hold
Answer next
Call forwarding
Do not disturb
Installation Requirements
66-MHz 486 PC with 16 MB of RAM (Pentium recommended)
Windows 95 or Windows NT 4.0

PBX and the office attendant type program application are an integral part of the communications system 50. Other Communications system 50 software components include the following:
Data Communications Services
Voice Mail and AutoAttendant applications
Remote Management System With Communications system 50, higher productivity with voice mail and automated attendant services can be achieved. Communications system 50 voice mail and auto attendant services help an office increase productivity by allowing people to share information without time or distance constraints. Customers can leave messages at any time of day or night, with the assurance that the messages will be delivered. Whether an office personnel is in the office or on the road, any office personnel can access messages instantly from any phone in the world.

In addition, communications system 50 voice mail services allow a user to access the user's voice mail messages via the user's favorite e-mail application. Communications system 50 voice mail application is built with full support for open industry standards—including IMAP4 e-mail application compatibility for remote voice mail retrieval, and WAV sound file format for ubiquitous message playback using the most popular operating systems.

Communications system 50 auto attendant application economically processes inbound calls 24 hours a day—answering each call, providing customized instructions based on the time of day or day of week, and routing callers to the person best able to help them. Callers can use the intelligent call distribution feature to reach a particular person or department, without requiring an operator or direct inward dial (DID) services. For companies that use DID, the auto attendant is ideally suited for assisting a live operator by handling common requests for information such as directions and mailing addresses.

The following are exemplary communications system 50 voice mail and auto attendant Specifications
Voice Mail Features
System
Up to six concurrent voice mail sessions
Approximately 67 hours of storage
No additional hardware required
Interruptible prompts
Password protection
Message Handling New message retrieval
Save messages
Listen to deleted messages before you hang up
Hear message time stamp and duration
Forward message
Reply to message
Skip message
Go to end of message
Backup and forward 5 seconds
Pause/resume listening
Pause/resume recording
Versatile Message Notification
Stutter dial tone
Lamp indication
IMAP4 e-mail retrieval
Auto Attendant Features
Customizable Greetings
Time, day-of-week, and holiday scheduling
Automated call routing (individual extensions and hunt groups for departmental routing)
Audio-text mailboxes
Dial by name
Multilevel menus
Single-digit menus The voice mail and auto attendant applications are an integral part of communications system 50. Other communications system 50 software components include PBX services
office attendant type program computer-telephony application
Data Communications Services
Remote Management System Communications system 50 delivers comprehensive communications support—multiprotocol router, full LAN/WAN connectivity, PBX voice capability, and a suite of communications applications—in a unified platform designed for scalability, reliability, and ease of use.

Communications system 50 data communications services provide built-in services for local area networks, connecting branch offices to headquarters, and providing remote,access and Internet connectivity to its employees. In addition, the data communication services allow offices to create virtual private networks (VPNs) to save money on remote access and interoffice connectivity. Further, an office can save significant money by integrating both voice and data traffic over the same T1 access circuit. The built-in multiplexer passes data traffic to the data communications services for processing; the remaining voice traffic is passed directly to the PBX.

Communications system 50 multiprotocol router is based on Microsoft's NT Routing and Remote Access Server (RRAS). An office using communications system 50 may extend the base RRAS elements with value-added services such as frame relay and versatile WAN interfaces, including analog dial-up and integrated digital T1 circuits. Multiprotocol routing (MPR) capabilities provide full-featured, standards-based LAN and WAN routing optimized for small and branch offices. Standards-based features include IP routing (RIP, RIPv2, OSPFv2)
IPX routing (RIP, SAP, IPXWAN)
Packet filtering
Frame relay (RFC 1490, Cisco)
Point-to-point protocol (PPP), Multilink PPP
Dial-on-demand routing
Classless Inter-Domain Routing (CIDR)
PPP authentication protocols (CHAP, PAP)
DHCP relay agent
Compression of TCP/IP headers for low-speed serial links
Path MTU discovery
PPP Internet Protocol Control Protocol (IPCP)
Compression Control Protocol
ICMP router discovery messages Communications system 50 data communications services include remote access services, allowing a business to extend its networks through phone lines—and keep up with an increasingly mobile work environment. Network managers can use the remote access server capabilities for out-of-band management access, which is especially useful for initial installation and troubleshooting from remote locations. Furthermore, mobile and work-at-home users can seamlessly and securely access the user's corporate network. They can work, print, and run applications remotely using such features as Comprehensive dial-up networking support for all mainstream remote clients
Authentication
RADIUS client support
Token card support
PPP and Multilink PPP
Microsoft Point-to-Point Compression
Restartable file copy
Idle disconnect Virtual private networks lets a user use IP packet networks, such as the Internet, to provide secure connections between remote users and their corporate networks, without the expense of a dedicated private network. Communications system 50 offers a flexible and comprehensive solution, based on the Point-to-Point Tunneling Protocol (PPTP), for creating VPNs.

With PPTP, a user can dial into a local Internet service provider and access the network as easily and securely as if they were at their desks. PPTP technology offers significant advantages such as Full interoperability with Windows 95, Windows 98, Windows NT Workstation, and many other VPN products
PPTP Client-to-Network
PPTP Network-to-Network for interoffice connectivity
Data encryption (RSA RC4)
Compatibility with IP, IPX, and NetBEUI.

Data communications services include powerful management software that enables administrators to centralize ongoing network maintenance, diagnostics, and troubleshooting; and easily accomplish remote changes such as setting up a brand new office or making changes to an existing one. Features include Full SNMP instrumentation
MEBs implemented for data and voice services
Performance and capacity monitoring
Display of interface status in real time
Ping
Trace route
NetStat
WAN protocol trace capability Data communications services are an integral part of communications system 50. Other communications system 50 software components include:

PBX services
Communications system 50 computer-telephony application
Voice mail and auto attendant applications
Remote Management System Ongoing management costs make up the majority of operating expenses of a communications infrastructure. This is especially true for remote offices, where technical expertise is rare and trained personnel frequently make on-site visits to perform routine tasks such as moves, adds, and changes. Adding to the problem is the fact that most communications infrastructures consist of multiple boxes from multiple vendors, requiring a variety of specialized personnel to operate and maintain the many components.

Communications system 50 Remote Management System addresses these cost-of-ownership issues by providing integrated remote management capabilities for both voice and data services. Designed for remote management and fault monitoring, the Remote Management System provides a cost-effective method for managing the entire customer premise remotely. Companies with multiple offices or plans to expand can realize significant cost savings by leveraging their expensive technical resources, no matter where they are located. Furthermore, the centralized management capabilities of communications system 50 present a unique managed network service opportunity for both voice and data service providers.

The Remote Management System consists of the following components:

(1) Remote Management Console

This component provides a unified Web interface for managing all aspects of communications system 50. Based on HTML, Java, and push technologies, the Remote Management Console provides a consistent interface that is easy to learn and use.

(2) SNMP

Both the voice and data aspects of communications system 50 have been SNMP instrumented, including key application services such as voice mail and PBX.

(3) Call Detail Recording

A complete record of all voice and data calls placed or received by communications system 50, this information can be used to analyze call patterns and trunk utilization, and to generate call reports.

(4) Independent Fault Monitor

A feature typically found only on large central-site systems, the independent fault monitor supervises system operation, and detects and reports faults to the system administrator.

(5) Trace Manager

A complete log of all system activity, the trace manager provides useful information such as real-time call progress, WAN protocol traces, frame relay management information, and voice mail activity to facilitate troubleshooting.

Below are the specifications for an exemplary communications system 50 Remote Management System.

System
Rapid installation: less than 30 minutes
Remote software upgrades
Minimal technical expertise required
Robust, low-maintenance platform
Architected for high availability
Self-diagnostics to ease management burden
Remote management via digital trunks and over embedded 56 Kbps modems
Centralized password facility
Remote Management Console
Web-based console that manages all voice and data services
Management of a system in a network over any TCP/IP connection
Multiple administrative levels (customizable)
Password protection
Support for remote moves, adds, and changes
Monitoring and diagnostic utilities
Chassis view that provides an at-a-glance view of system status, including LED states
Graphical user interface that is easy to learn and use
Extensive online help
Runs on Windows 95 and Windows NT, using Internet Explorer 4.0 or Netscape 4.
SNMP
Full SNMP instrumentation for voice and data
Support of standard enterprise network management stations such as HP OpenView and Sun NetManager
SNMP standards: SNMP (RFC 1157), Structure and Identification of Management Information (RFC 1155), Concise MIB Definitions (RFC 1212), MIB-II MIB (RFC 1213), Traps (RFC 1215)
Standard MIBs: Frame Relay DTE (RFC 1315), T1/E1 Interfaces (RFC 1406), Repeater (RFC 2108), Microsoft HTTP, Microsoft LAN Manager, Microsoft RIPv2, Microsoft OSPFv2
Private MIBs: T1 extensions, station module, voice mail
Call Detail Recording (CDR)
Complete record of all voice and data calls placed or received
Standard file format for import into CDR applications
Remote analysis of CDR information without a dedicated workstation
Independent Fault Monitor
Embedded processor that provides an independent watchdog service for the overall system
System event log
Dedicated modem for remote access
Pager notification of system faults
System status: fan, power supply, operating system
System reset
Trace Manager
Display of all system activity
Graphically based
Enabled on a per-service basis
Multiple trace levels
Events color-coded for readability The communications system 50 Remote Management System is an integral part of the communications system 50. Other communications system 50 software components include
PBX services
Communications system 50 computer-telephony application
Data Communications Services
Voice Mail and AutoAttendant applications Together, these software components combine to provide a powerful, easy-to-use communications solution that may be optimized for a remote or small office.

Figure 14:
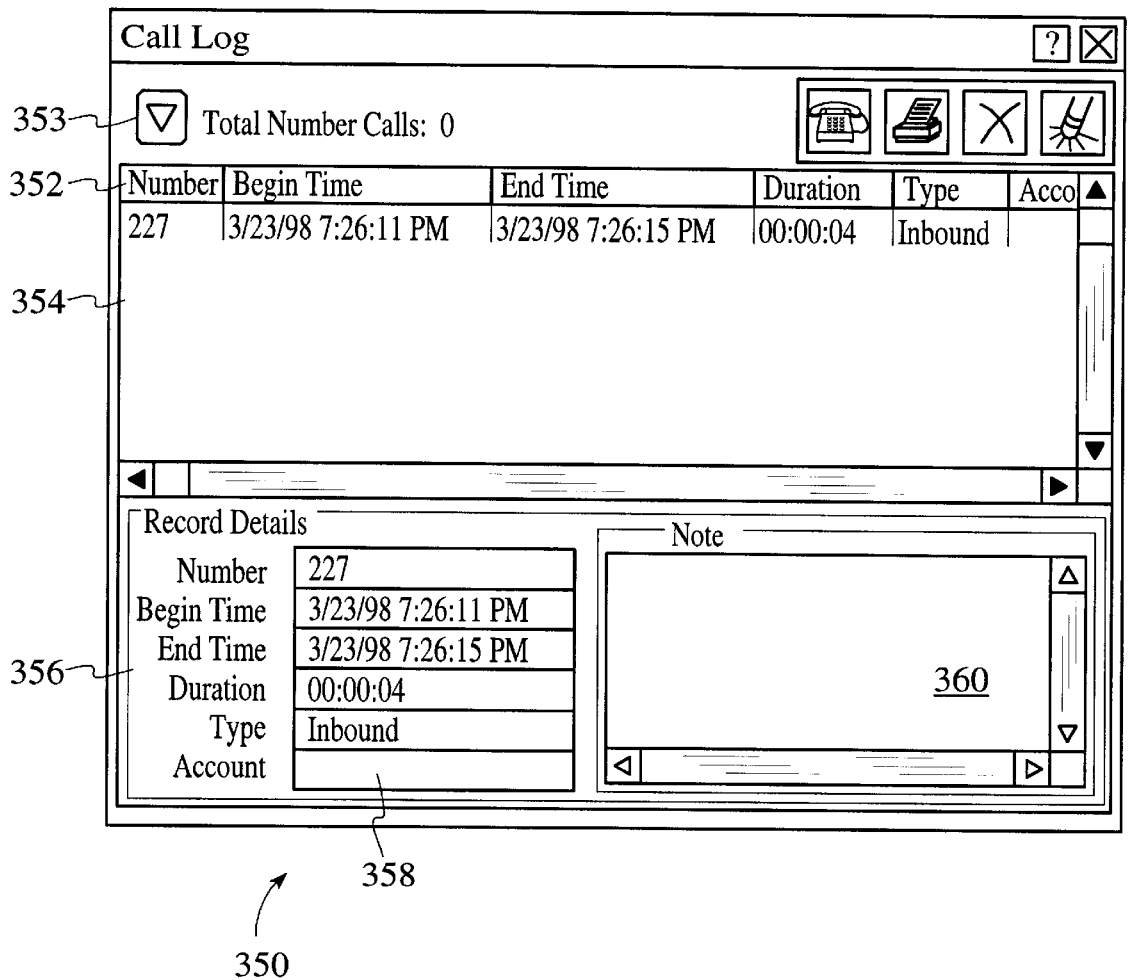
FIG. 14 illustrates additional preferred embodiments of the present invention utilizing advanced call logging features.

Referring now to FIG. 14, additional preferred embodiments utilizing advanced call logging features will now be described. As illustrated in FIG. 14, call logging window 350 may be opened by a user of an office attendant-type program running on a computer in accordance with the present invention (see, e.g., FIG. 8A, call log icon 142). In alternative embodiments, call logging window 350 may be automatically opened upon receipt of an incoming call, or upon initiation of an outgoing call. Window 350 preferably includes display windows 352 and 354, which preferably displays information for calls in the log, such as a call log identification number, begin call time, end call time, duration of call, type of call (either inbound or outbound), account information, etc. In other embodiments, other information desired to be included in a call log record is included in such a window. Window 354 is illustrated with only one call displayed, although it should be understood that a plurality of calls may be displayed in window 354, and in fact the call log can include numerous calls that cannot be displayed simultaneously in window 354. A scroll button or buttons (such as scroll icon 353) preferably are provided to scroll up and/or down the logged calls.

Preferably, window 356 is provided to display details of a particular call, which may be selected from a plurality of logged calls in window 354 by a click of a mouse or pointer. Window 356 preferably includes details of the particular logged call, and also preferably includes account field or window 358 and note window 360. It should be noted that account field window 358 in preferred embodiments may be desirably utilized for purposes of tracking calls by account, and for desirably collecting such logged call information from a plurality of computers and generating reports based on such information. Window 360 may be utilized to display notes entered by the user prior to, during or after the call, and/or may display previously entered information. In certain embodiments, window 360 may display information received from communications systems 50 over a packet bus, or from another computer on the packet bus, such as account status information, payment information, ordering information, etc. In such embodiments, such as based on the account information, particular information corresponding to this account may be desirably retrieved and made available to the user calling the a particular account, etc.

In certain embodiments, upon receipt of an incoming call or upon initiation of an outgoing call, a window such as window 350 automatically appears (this may be by way of the office attendant-type program for a user who is managing incoming and outgoing calls of the office, or by way of a companion program for a user is not managing incoming and outgoing calls of the office). In preferred embodiments, the user is prompted by a brief message displayed on the screen and/or an audio message played on the user's computer to enter the account number in window/field 358. In still other embodiments, the user must insert an account number in window/field 358 in order to complete the incoming or outgoing call. In such embodiments, processor/system resources 70 and/or the user's computer promptly reads any account number information provided by the user and any accepts or validates the account number (e.g., compares the entered account number to a stored list of valid account numbers, and determines if there is a match). In the event that an invalid account number is detected, a suitable message window and/or audio alert indicating that the account number entered is invalid, unrecognized, etc., preferably is provided to the user. In the event that a valid account number is detected, then the call is completed.

In alternate embodiments, the user is prompted by a brief message displayed on the screen (such as in a suitable window) or audibly, and the call completed but only for a predetermined time. This would enable the call to be completed without account authorization and/or validation, but would require that the account information be promptly input in a predetermined time interval.

In still alternate embodiments, communications system 50 (and/or another computer coupled to communications system 50 via a packet bus, etc.), periodically polls the computers utilizing a program with call logging such as previously described retrieves the call log information. With automated call log polling, a central resource such as communications system 50 (and/or another computer) may periodically, and preferably automatically, collect call logging information over the packet bus (again, see, e.g., FIG. 3), which may be then made available to a suitable application running on communications system 50 and/or another computer, and compiled, processed, analyzed, printed, etc. In accordance with such embodiments, incoming and outgoing calls may be desirably logged and associated with account information, with such logged information desirably collected from a plurality of computers and made available to a central resource for further processing and/or use.

Referring now to FIGS. 15 through 17H, various aspects of remote administration/configuration and remote diagnostics of a system such as communications system 50 in accordance with certain preferred embodiments of the present invention will now be described.

FIG. 15 illustrates a window from a remote administration/configuration application/applet (preferably what is known as a Java applet, etc.) that preferably utilizes a desirable browser-type application interface. With a browser type interface, a person desiring to remotely configure or administer communications system 50 desirably uses a browser and preferably establishes an IP or similar connection with communications system 50. In preferred embodiments, the IP-type connection may be established via WAN connection (via WAN network services 58; see, e.g., FIG. 3), via a LAN connection, via a serial port connection (via, for example, a serial port to processor/system resources 70), via a modem connection (via modem 75 of FIG. 3), etc.

What is important to note is that administration/configuration of communications system 50 may be remotely performed via an IP or similar connection, preferably with a browser-type application, and preferably using the HyperText Transfer Protocol ("HTFP") or similar protocol. In such preferred embodiments, HTFP commands may be used to remotely administer, configure and diagnose communications system 50 in a desirable and flexible manner. It should also be noted that the use of HTIP commands in such a manner to administer, configure, etc., WAN resources (e.g., T-1 cards or resources), PBX and telephony resources (e.g., station cards, voice mail), and LAN resources (e.g., ethernet or other network cards/resources) enables remote control and monitoring of communications system 50 in a flexible and desirable manner. In particular, if a security arrangement known as a "firewall" is implemented in conjunction with communications system 50, the use of such HTIP commands to configure a WAN service (for example) may be more readily accomplished in that most firewall systems utilize ports that allow HTTP communications/traffic, which thereby reduces conflicts with the firewall security system. In effect, remote processing may be accomplished by HTTP "tunneling" into communications system 50 with an IP-type connection, etc.

It also should be noted that password/user identification security arrangements are preferably utilized in such embodiments in order to maintain security over the configuration and operation of communications system 50. Encryption techniques also may be utilized in order to improve such security if desired for the particular application.

Referring again to FIG. 15, various icons are illustrated for remote access by a user desiring to remotely administer/configure communications system 50. By clicking appropriate icons, various system administration/configuration functions may be implemented. As illustrated, general administration functions may include or relate to: log off, diagnostics, help, chassis view (described in greater detail later), general settings, software versions (enabling a viewing of a registry of software modules and releases, etc., installed on the particular communication system 50), call detail report, restart/reboot, password administration, SNMP configuration, system backup/restore, disk array configuration, access permissions, SNMP alarms, software upgrade, date and time, etc. As illustrated, PBX and voice mail administration functions may include or relate to:

extension configuration, auto attendant and voice mail, first digit table, hunt groups, station ports, local TAPI configuration, CTI speed dial numbers, etc. As illustrated, data administration functions may include or relate to: IP network settings, IPX configuration, RRAS routing (routing and remote access service), network services and adapters, etc. As illustrated, trunk administration functions may include or relate to: trunk groups, T-1 trunks, trunk access profiles, analog trunks, frame relay, etc.

What is important to note is that, in such preferred embodiments, various icons are presented so that a remote person may conveniently select via an appropriate and intuitive icon an applet to achieve the desired function or operation, and which may conveniently be used to configure and administration the communications system and configure PBX, voice mail, LAN and IP network connections, trunk groups, T-1 trunks, frame relay, etc. In accordance with such embodiments, a single user interface, remotely viewable, may be used to access and administer, etc., voice, data, LAN, WAN services and applications, etc.

FIGS. 16A through 16F will be used to further describe various aspects of such remote administration/configuration in accordance with preferred embodiments of the present invention.

Figure 16A:
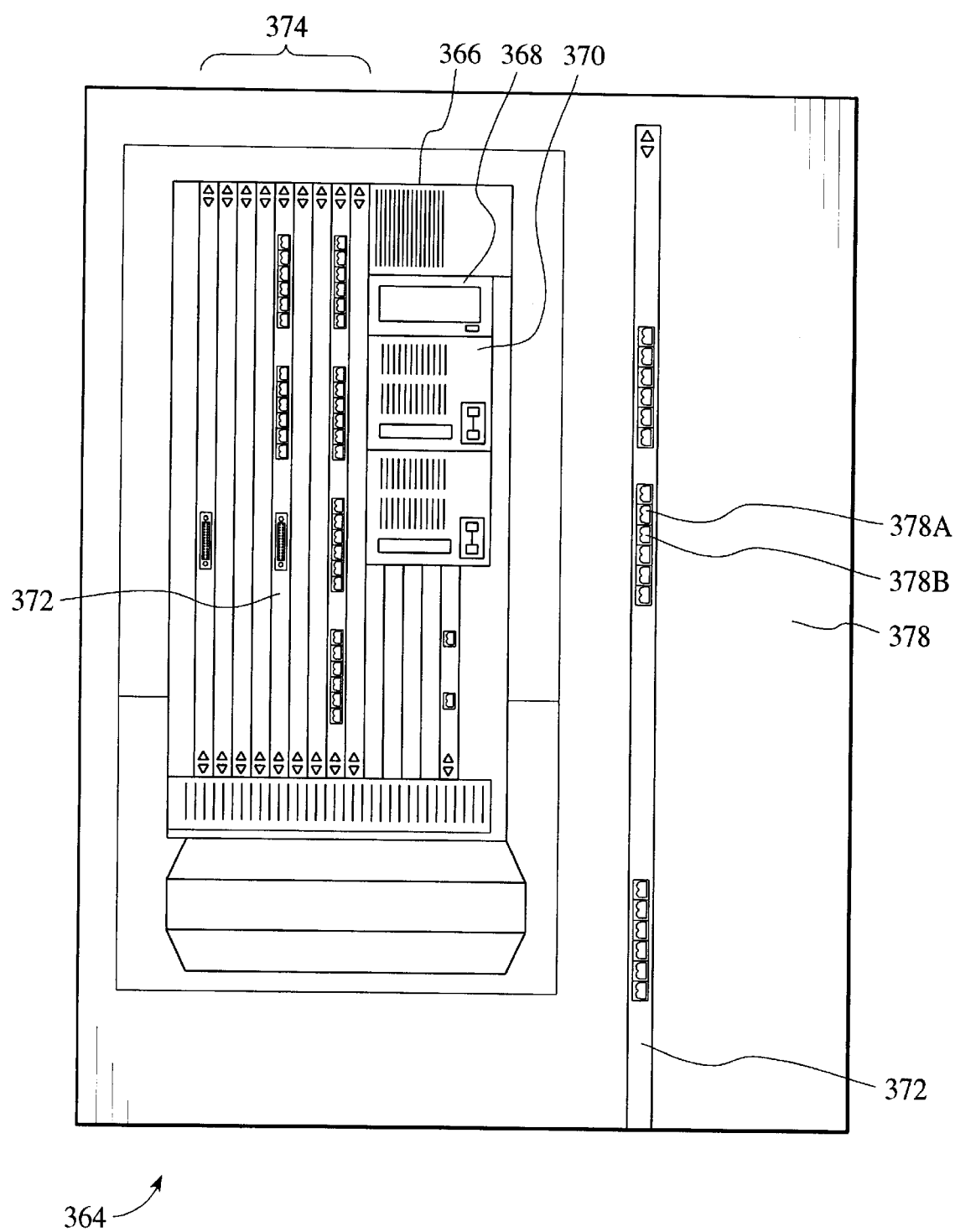
FIG. 16A illustrates a preferred exemplary embodiment of a chassis view window in accordance with preferred embodiments of the present invention.

FIG. 16A illustrates a preferred exemplary embodiment of "chassis view" window 364, which, for example, may be displayed in response to selecting of the chassis view icon of FIG. 15. Window 364 preferably includes a visual representation of chassis 366 of communications system 50, and preferably includes a visual representation of various station cards, resource cards, power supplies, drives, etc. Such a visual representation may include station/resource cards 374, including a particular card 372 indicated with a pointer arrow, power supply(ies) 370, drive 368, etc. What is important is that an intuitive visual representation of the overall system be desirably displayed in a manner to facilitate an understanding of the configuration of the particular communications system 50 that is being remotely monitored, administered, configured, etc.

In preferred embodiments, pointing to a particular card or resource results in an enlarged visual representation of that card or resource, as illustrated by the pointer being directed to card 372, resulting in an enlarged representation of card 372 appearing adjacent to the chassis view. In the illustrated example, card 372 includes network connection ports in circle 378, and as examples shows empty port 378A and occupied port 378B. Thus, in accordance with such embodiments, an enlarged view of a card or resource may be visually displayed and remotely viewed, and a visual representation of whether particular ports or resources are utilized (such as, for example, by having an ethernet or other network cable attached) also may conveniently be provided.

In accordance with preferred embodiments, various functions and/or operations are provided for remote administration/configuration, such as previously described. Windows to provide such functions and operations preferably are displayed in a manner to intuitively lead the remote person through the desired operation, etc. Such windows may be accessed by selecting an appropriate icon such as are illustrated in FIG. 15 (the icons of FIG. 15 are ® 1998, Vertical Networks, Inc. (assignee of the present application)), or they may be accessed by way of clicking on a particular station or resource card in the chassis view of FIG. 16A. Various remote administration/configuration windows will now be further described.

Referring to FIG. 16B, window 380 is provided for configuration of T-1 channels of a particular communications system 50. As previously described, window 380 may be presented in response to clicking on the T-1 trunks icon of FIG. 15, or alternatively window 380 may be presented in response to clicking on a T-1 resource/station card of the chassis view of FIG. 16A. As illustrated, with a point and click operation on window 380, the remote person may enable/disable T-1 channels, set or reset signaling (e.g., wink start, ground start, etc.), configure trunk groups (e.g., WAN data which may be used to direct or clear channel data trunk traffic to an RRAS interface, thereby enabling the LAN to transmit/receive data to/from the WAN), voice analog (e.g., to direct incoming analog voice trunk traffic to a default destination), voice digital (e.g., to direct incoming digital voice traffic to a default destination), DID analog (e.g., to direct incoming direct inward dial analog voice trunk traffic to a default destination), DID digital (e.g., to direct incoming DID digital trunk traffic to a default destination), and modem (e.g., to direct either T-1 trunks or analog trunks to one or more modems included as part of communications system 50).

In accordance with such embodiments, T-1 trunks may be configured in an intuitive point and click manner, thereby facilitating remote administration and configuration of such resources. As a particular example, multiple T-1 channels may be selected in FIG. 16B as a block with the mouse or pointer, and such block-selected T-1 channels may then be simultaneously configured (e.g., configure to be enabled/disabled, configure signaling, configure trunk groups, etc.). With such a click and block select operation, multiple T-1 channels may be configured in a group.

Figure 16C:
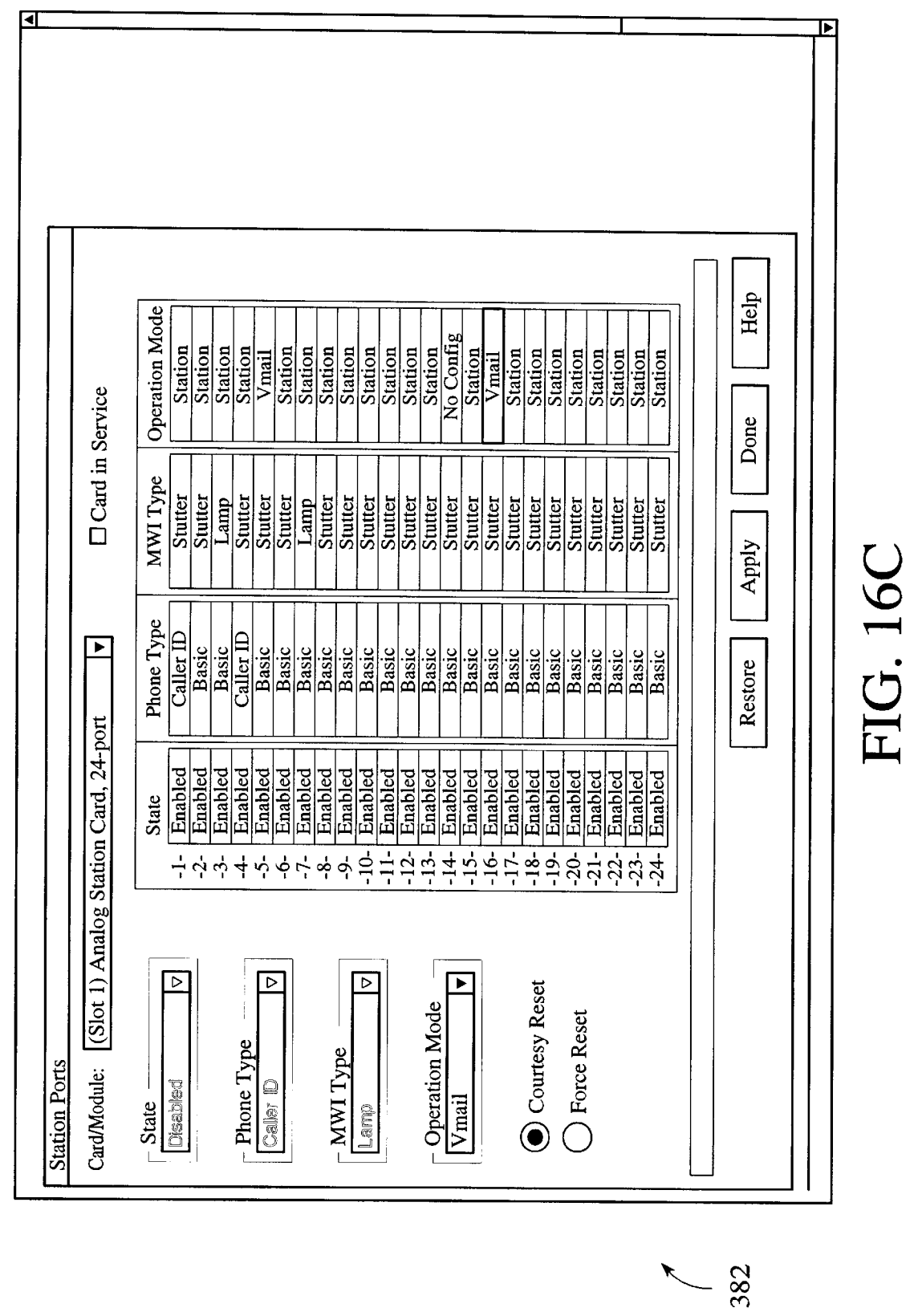

As illustrated in FIG. 16C, window 382 may be presented in order to configure station ports of a station card (again, either by icon selection or selecting a station card in chassis view, etc.). Also as illustrated, the state of particular stations (e.g., enabled or disabled), phone type (e.g., caller ID, basic, etc.), mail waiting indicator (MWD) (e.g., stutter the dial tone, light a lamp on the phone, etc.), operation mode (e.g., operate as a station, direct to voice mail, etc.). As described earlier with respect to FIG. 16B, with intuitive point and click type operations, various station cards may be selected (including multiple stations that may be selected as a block, etc.) and configured remotely and in an intuitive manner.

Figure 16D:
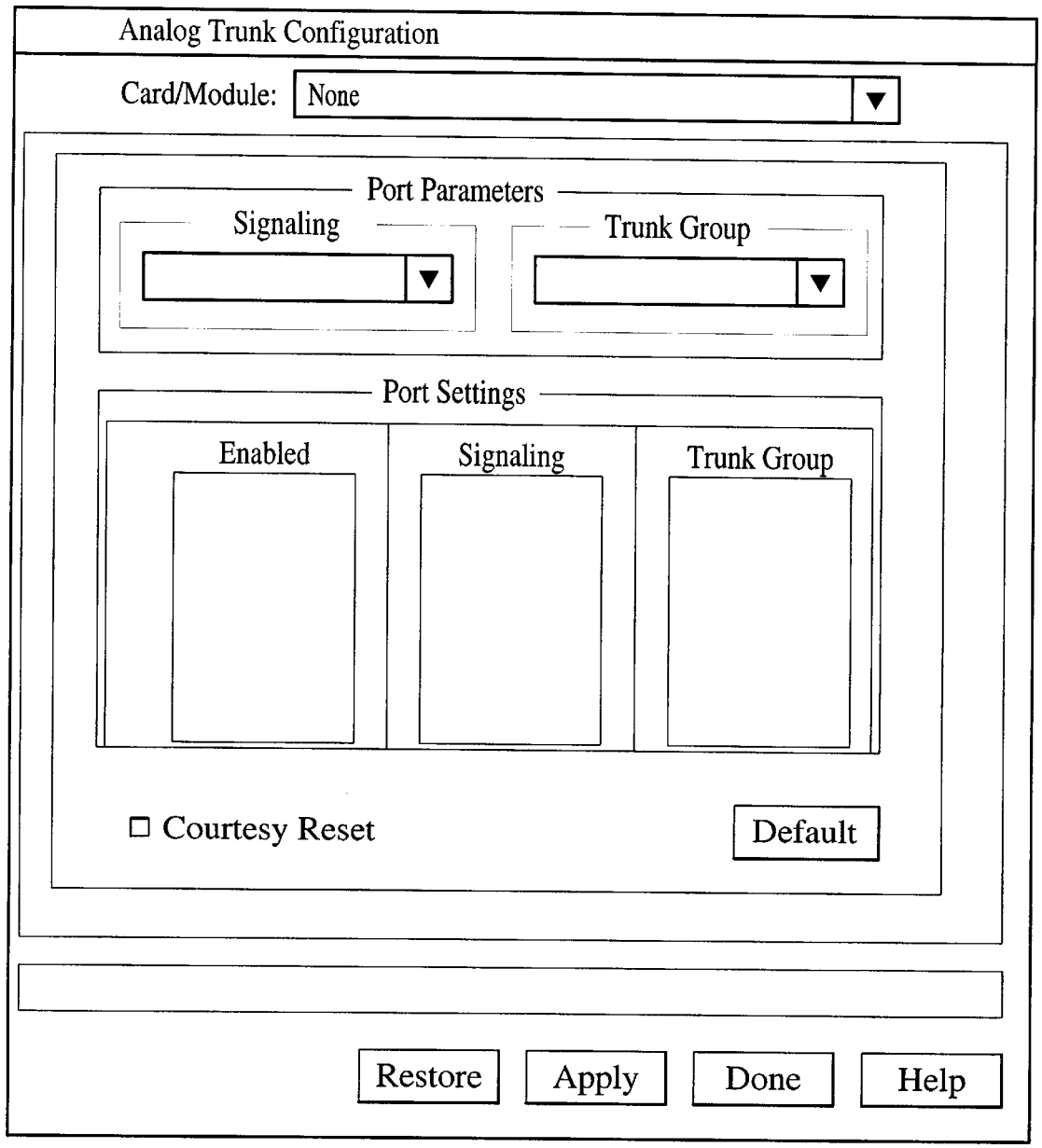
FIG. 16D illustrates a window for configuration of analog trunks in accordance with preferred embodiments of the present invention.
Figure 16F:
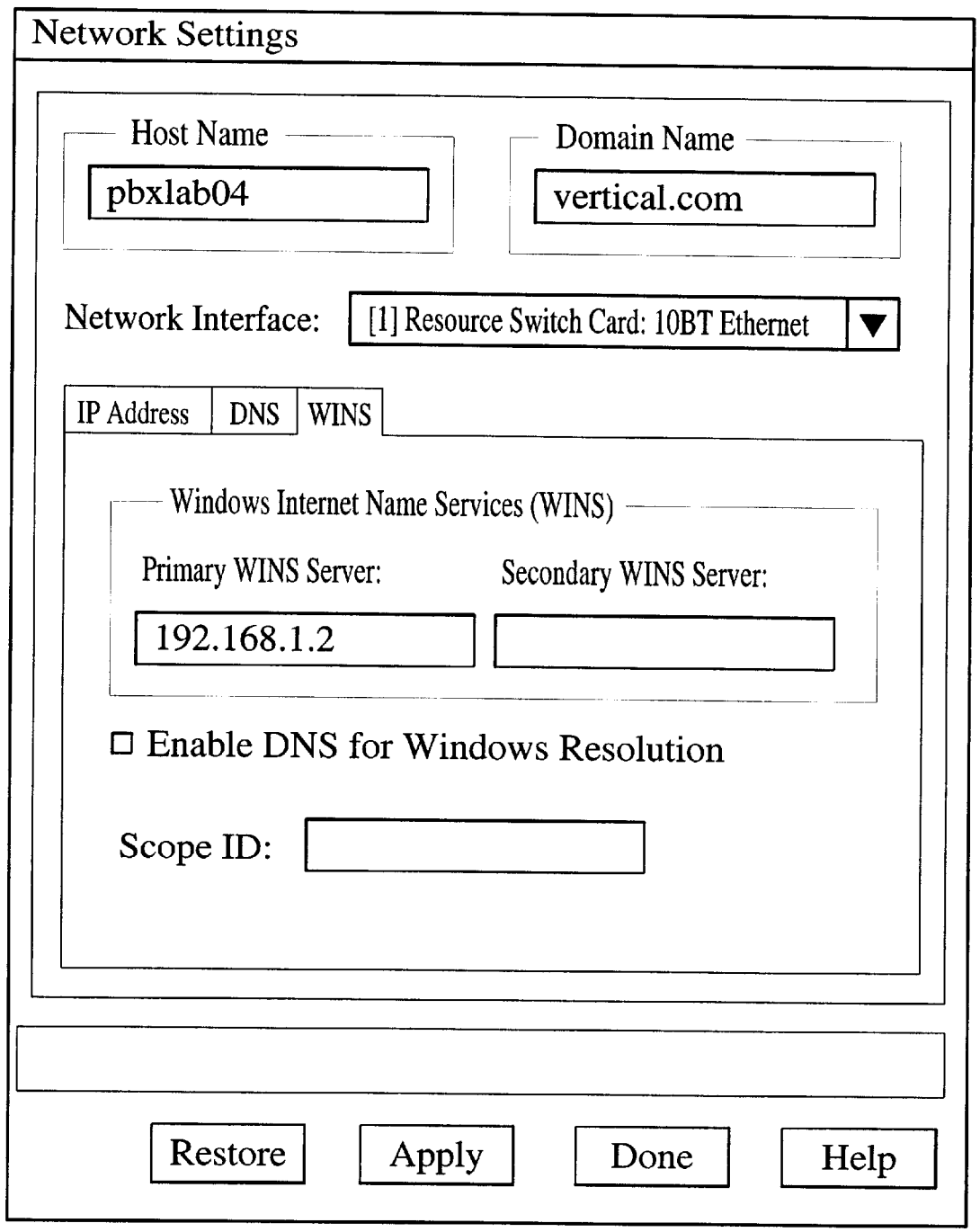
FIG. 16F illustrates a window for configuration of network settings in accordance with preferred embodiments of the present invention.

FIG. 16D illustrates window 384, which may be used to configure analog trunks in accordance with preferred embodiments of the present invention. FIG. 16E illustrates window 386, which may be used to configure frame relay type WAN resources in accordance with preferred embodiments of the present invention. FIG. 16F illustrates window 388, which may be used to configure network (e.g., IP network) settings in accordance with preferred embodiments of the present invention.

As will be appreciated from these illustrative examples, various administration/configuration operations may be carried out remotely, preferably using an intuitive browser-type interface, and preferably using HTTP type commands in an applet environment such as with Java, in a desirable and much improved manner.

As illustrated in FIGS. 17A through 17H, such remote processing concepts are extended to remote diagnostic operations in accordance with yet other preferred embodiments of the present invention.

Figure 17A:
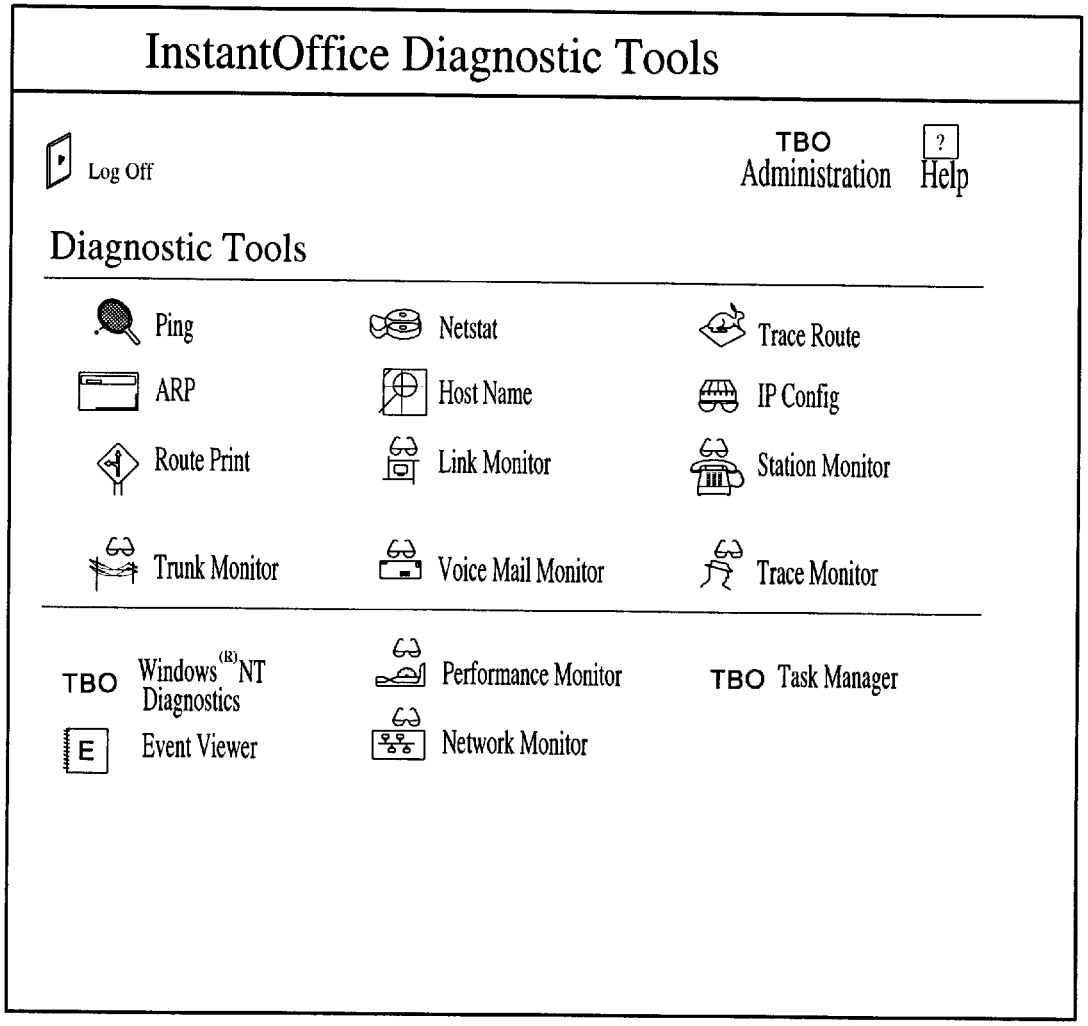
FIG. 17A illustrates various icons that may be presented to a remote user to perform remote diagnostics on the communication system in accordance with preferred embodiments of the present invention.

As illustrated in FIG. 17A, various icons may be presented in order for a remote user to perform remote diagnostics on communications system 50. Such icons may be used to present, for example, various "DOS prompt" type commands (e.g., Ping, ARP, route print, net stat, host name, trace route and IP config). Icons also may be presented for more advanced diagnostic-type operations, such as trunk monitor, link monitor, voice mail monitor, station monitor and trace monitor. Various of these diagnostic operations will now be more fully described.

As illustrated in FIG. 17B, window 390 may be presented in order to provide a trunk monitoring function. As illustrated, window 390 may be used to readily provide information regarding the slot, board, port, state, and called and calling party information of various trunks.

As illustrated in FIG. 17C, window 392 may be presented in order to provide a link monitoring function. As illustrated, window 392 may be used to readily provide information regarding links that may be established within communications system 50, such as which cards are connected to which port, etc. As illustrated in FIG. 17D, window 394 may be presented in order to provide a station monitoring function. As illustrated, window 394 may be used to readily provide information regarding the status of various stations/extension in communications system 50. As will be appreciated, such windows may be used to readily present desired status and other diagnostic type information to a remote person.

Figure 17E:
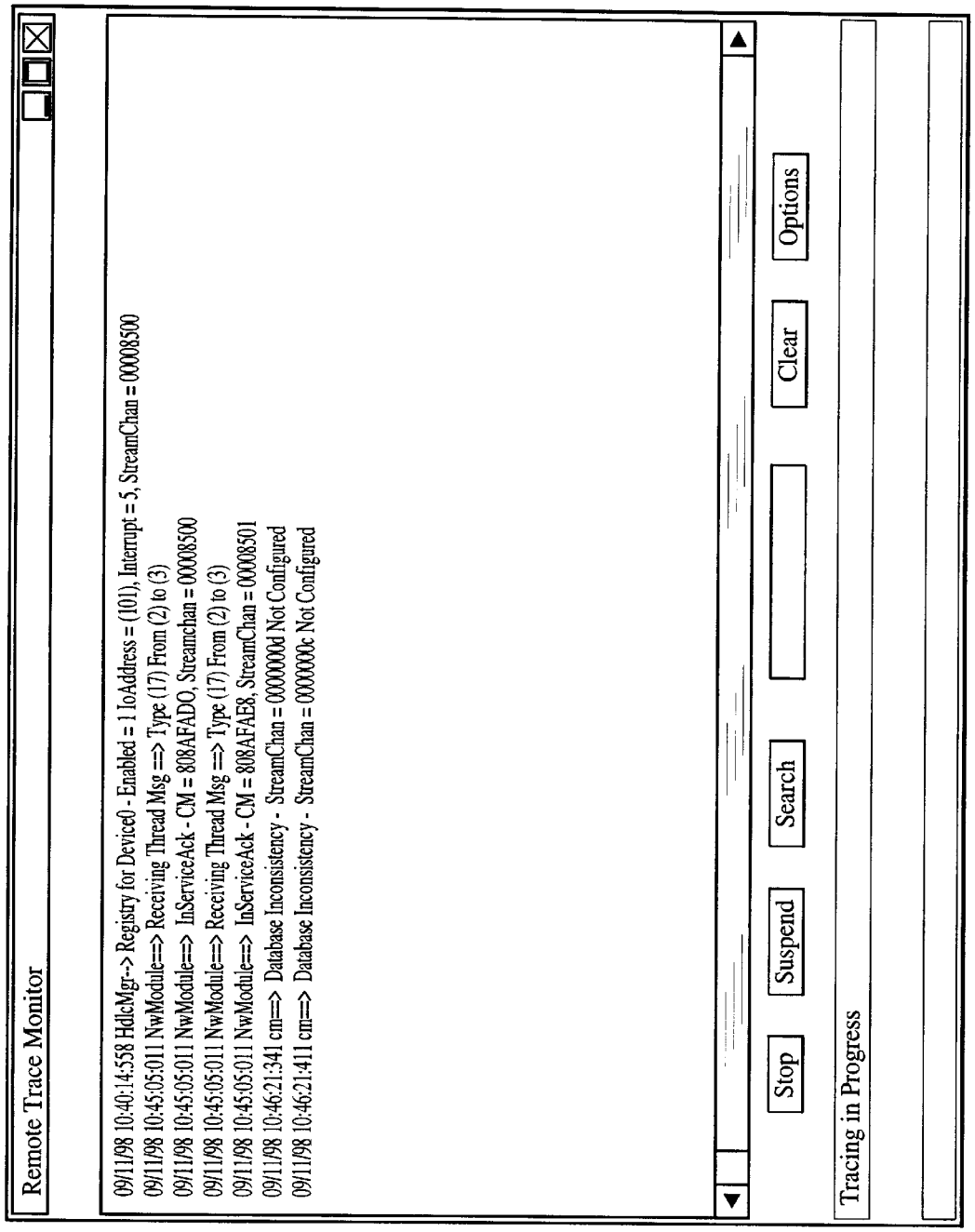
FIG. 17E illustrates a window for displaying trace information from various software components, drivers, etc. in communications systems in accordance with preferred embodiments of the present invention.
Figure 17F:
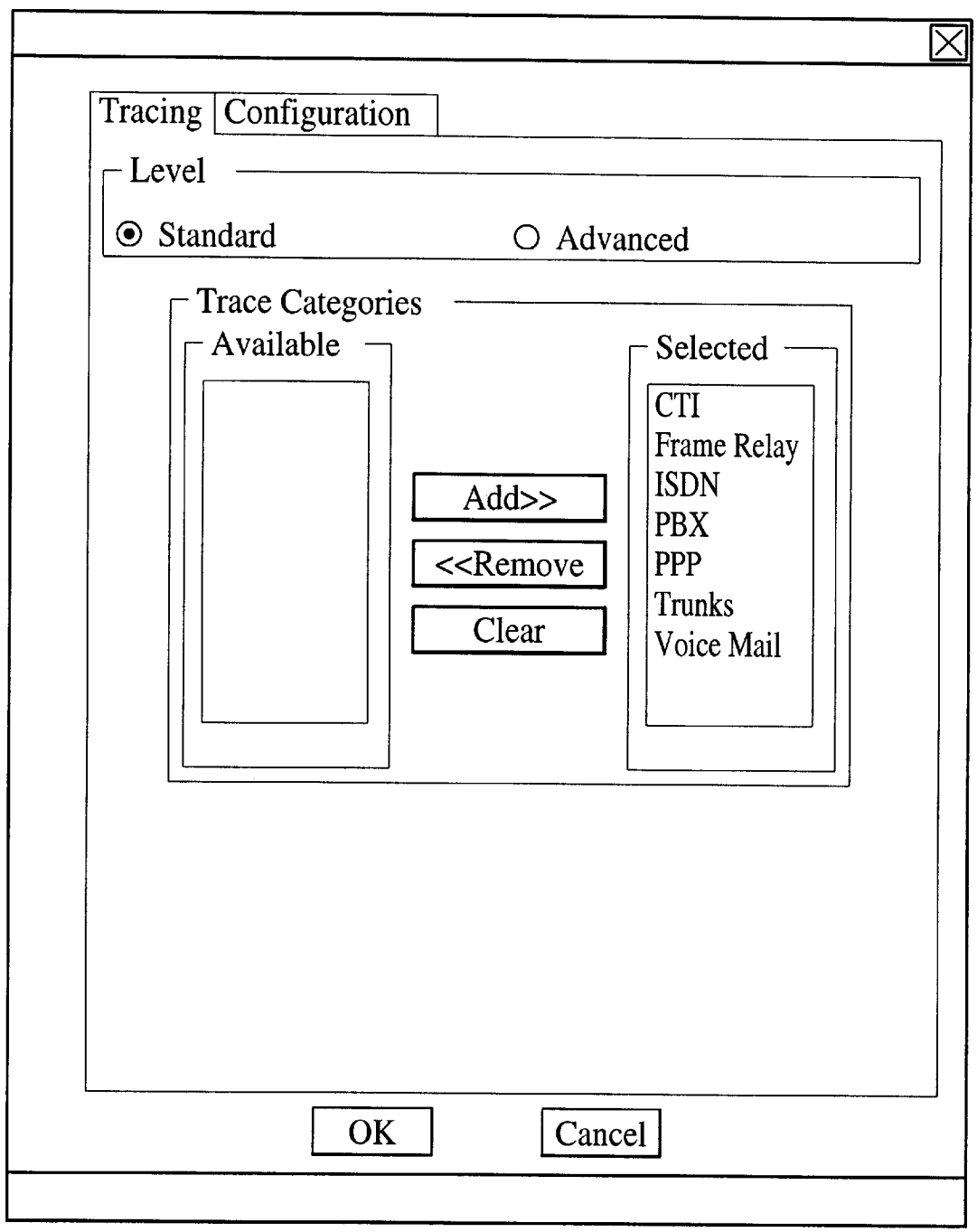
FIG. 17F illustrates a window for providing a first level of tracing information in accordance with preferred embodiments of the present invention.
Figure 17G:
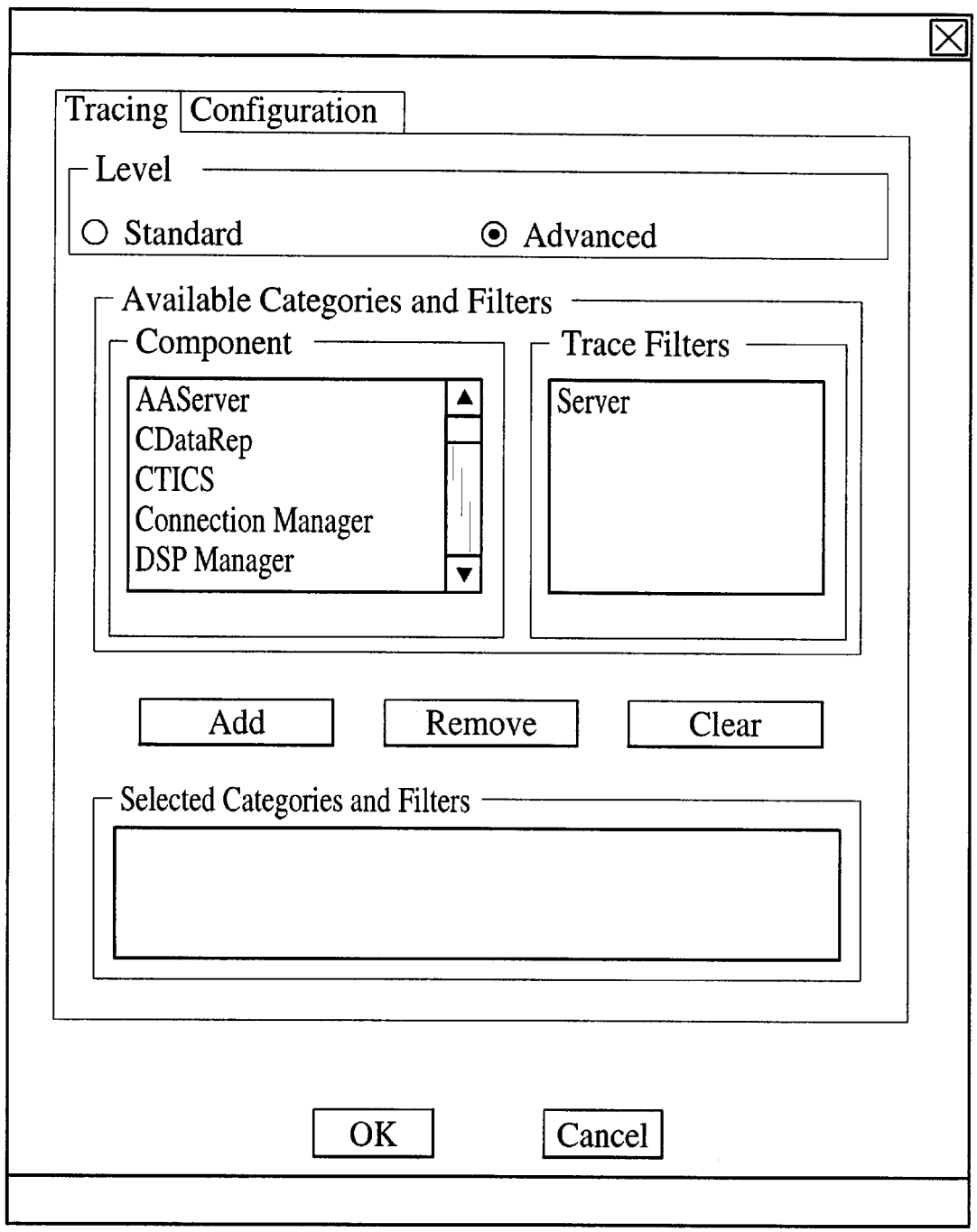
FIG. 17G illustrates a window for providing a second, higher level of tracing information in accordance with preferred embodiments of the present invention.
Figure 17H:
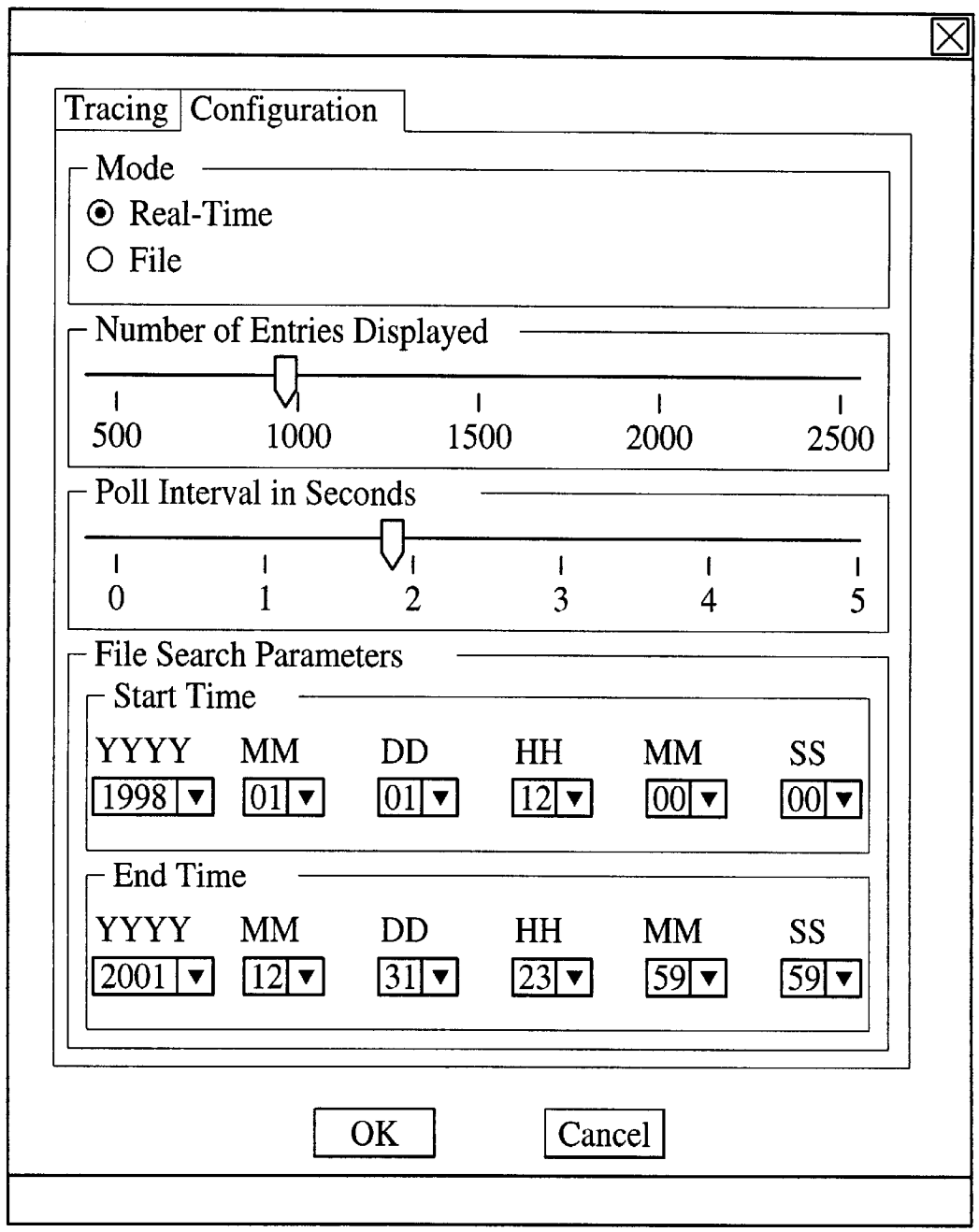
FIG. 17H illustrates a window for selecting certain timing and mode information in accordance with preferred embodiments of the present invention.

In accordance with preferred embodiments, advanced remote trace monitoring also may be provided. FIG. 17E illustrates window 396, which may be used to display trace information from various software components, drivers, etc. in communications system 50. The level and type of trace information that is remotely provided may be desired controlled in accordance with preferred embodiments of the present invention. FIG. 17F illustrates window 397, in which a first level of tracing information (e.g., "standard") that may be provided is selected. As illustrated, the remote user may select various components to have trace information provided in the trace monitor window. FIG. 17G illustrates window 398, in which a second, higher level of tracing information (e.g., "advanced") that may be provided is selected. As illustrated, the remote user may select various software components, such as those related to automated attendant, voice mail, connection manager, DSP manager, T-1 drivers, LAN drivers, frame relay drivers, etc., and may also select various trace filters to more precisely control the trace information that is provided. FIG. 17H illustrates window 399, in which certain timing and mode information may be selected. As illustrated, window 399 may be used to provide that tracing information is presented in real time or stored to a file, with control preferably provided for the number of entries that are displayed, poll interval, etc. For trace entries stored in a file, start and end time search parameters also may be selected.

In accordance with such embodiments, the remote user may configure tracing in desirable and flexible manner. Through the use of trace filters, various software components and drivers in effect may be told what trace information to provide, which information is preferably provided to a central storage location in communications system 50 and made available in real time or by file access to such a remote user.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A communication system coupled to a wide area communication network comprising a plurality of network resources, the communication system controlling voice and data communications in an office and comprising:
   a host processor;
   at least a first packet bus adapted for transferring packetized data and coupled to the host processor;
   at least one time division multiplex (TDM) bus selectively coupled to the first packet bus and the host processor and the wide area communication network;
   a buffer and framer unit coupled between the host processor and the TDM bus, the buffer and framer unit including a plurality of circuits for processing data in accordance with communication protocols;
   a plurality of computing devices coupled to the first packet bus for initiating or receiving data communications in the office; and
   a plurality of telephony devices coupled to the TDM bus for initiating or receiving voice communications in the office;
   wherein the host processor comprises hardware and software selectively allocating resources within the communication system, wherein the host processor determines a communication path from one or more communication paths in the communication system for each of the voice and data communications in the office based on available network resources, type of communication, and/or usage patterns in the office, wherein voice communications that stay in a circuit-switched form in the communication system occur over the TDM bus and the wide area communication network.

2. The communication system of claim 1, wherein at least a first computing device coupled to the first packet bus comprises communication system management software controlling voice and data communications in the communication system, wherein the first computing device under control of the communication management software issues and receives control information to and from the host processor, wherein the first computing device controls voice and data communications in the communication system.

3. The communication system of claim 1, wherein the host processor controls the provision of addresses for a domain naming service (DNS).

4. The communication system of claim 1, wherein the host processor controls Windows Internet Name Service (WINS) functions, including name registrations.

5. The communication system of claim 1, wherein the host processor controls a single point of entry firewall between the communication network and the communication system.

6. The communication system of claim 5, wherein the firewall comprises a packet filter for monitoring transactions at the network protocol level.

7. The communication system of claim 5, wherein the firewall comprises an application firewall for monitoring transactions including file transfer protocol (FTP) or electronic mail transactions.

8. The communication system of claim 5, wherein the firewall comprises a proxy server for monitoring World Wide Web (WWW) transactions over the communication network.

9. The communication system of claim 1, wherein the host processor controls communications based on a dynamic host configuration protocol (DHCP).

10. The communication system of claim 1, wherein the host processor comprises a file server for computing devices coupled to the communication system.

11. The communication system of claim 1, wherein the host processor controls electronic mail transactions for computing devices coupled to the communication system.

12. The communication system of claim 1, wherein the host processor controls wide area network (WAN) services of the communication network for the communication system.

* * * * *